US012791844B2

(12) United States Patent
Ono et al.

(10) Patent No.: US 12,791,844 B2
(45) Date of Patent: Nov. 10, 2026

(54) VARIABLE MAGNIFICATION OPTICAL SYSTEM, OPTICAL APPARATUS, AND METHOD FOR MANUFACTURING VARIABLE MAGNIFICATION OPTICAL SYSTEM

(71) Applicant: NIKON CORPORATION, Tokyo (JP)

(72) Inventors: Takuro Ono, Tokyo (JP); Kosuke Machida, Tokyo (JP); Ayumu Makida, Tokyo (JP); Keisuke Tsubonoya, Tokyo (JP)

(73) Assignee: Nikon Corporation, Tokyo (JP)

( * ) Notice: Subject to any disclaimer, the term of this patent is extended or adjusted under 35 U.S.C. 154(b) by 201 days.

(21) Appl. No.: 18/290,303

(22) PCT Filed: Mar. 2, 2022

(86) PCT No.: PCT/JP2022/008965
§ 371 (c)(1),
(2) Date: Nov. 12, 2023

(87) PCT Pub. No.: WO2022/259649
PCT Pub. Date: Dec. 15, 2022

(65) Prior Publication Data

US 2024/0264418 A1 Aug. 8, 2024

(30) Foreign Application Priority Data

Jun. 9, 2021 (JP) ................................ 2021-096938

(51) Int. Cl.
*G02B 15/14* (2006.01)
*G02B 15/16* (2006.01)

(52) U.S. Cl.
CPC ......... *G02B 15/1461* (2019.08); *G02B 15/16* (2013.01)

(58) Field of Classification Search
CPC .................................................. G02B 15/1461
(Continued)

(56) References Cited

U.S. PATENT DOCUMENTS

2013/0093940 A1 4/2013 Matsumura
2014/0009832 A1 * 1/2014 Sugita .................. G02B 27/646 359/557

(Continued)

FOREIGN PATENT DOCUMENTS

JP 2013-101316 A 5/2013
JP 2015-145913 A 8/2015

(Continued)

OTHER PUBLICATIONS

Office Action issued Aug. 19, 2025, in Japanese Patent Application No. 2025-040386.

(Continued)

*Primary Examiner* — Darryl J Collins
(74) *Attorney, Agent, or Firm* — Potomac Law Group, PLLC

(57) ABSTRACT

A variable magnification optical system including a plurality of lens groups, which is six or more lens groups and comprises a first lens group having positive refractive power and a rear group disposed closer to an image side than the first lens group, is configured so that at varying magnification the distances between the lens groups are varied, the first lens group consists of two or fewer lenses, and both the following conditional expressions are satisfied:

$$8.00 < f1/D1 < 27.00$$

$$1.00 < M1/D1 < 12.00$$

(Continued)

where f1 is the focal length of the first lens group, D1 is the thickness of the first lens group on an optical axis, and M1 is the amount of movement of the first lens group at varying magnification from a wide-angle end state to a telephoto end state.

36 Claims, 46 Drawing Sheets

(58) Field of Classification Search
USPC .................................. 359/676–679, 683–685
See application file for complete search history.

(56) References Cited

U.S. PATENT DOCUMENTS

| | | | |
|---|---|---|---|
| 2015/0219882 A1 | 8/2015 | Mogi | |
| 2015/0219883 A1 | 8/2015 | Mogi | |
| 2015/0350558 A1 | 12/2015 | Uchida et al. | |
| 2016/0054550 A1 | 2/2016 | Bito et al. | |
| 2016/0195703 A1 | 7/2016 | Tashiro | |
| 2016/0223800 A1 | 8/2016 | Ikegaya | |
| 2016/0252712 A1 | 9/2016 | Uchida et al. | |
| 2017/0192212 A1 | 7/2017 | Yamamoto | |
| 2018/0348481 A1 | 12/2018 | Iwamoto | |
| 2018/0372993 A1 | 12/2018 | Katayose | |
| 2019/0064491 A1* | 2/2019 | Sugita | G02B 15/1461 |
| 2019/0196143 A1 | 6/2019 | Okada | |
| 2019/0196160 A1* | 6/2019 | Ikegaya | G02B 15/1451 |
| 2020/0192060 A1* | 6/2020 | Sawamoto | G02B 13/24 |
| 2020/0278520 A1* | 9/2020 | Umeda | G02B 15/145121 |
| 2020/0319436 A1 | 10/2020 | Hatada | |
| 2020/0371325 A1 | 11/2020 | Tanaka | |
| 2021/0003831 A1* | 1/2021 | Hagiwara | G02B 15/1461 |
| 2022/0019065 A1 | 1/2022 | Saito | |

FOREIGN PATENT DOCUMENTS

| | | |
|---|---|---|
| JP | 2015-145914 A | 8/2015 |
| JP | 2016-045491 A | 4/2016 |
| JP | 2016-126226 A | 7/2016 |
| JP | 2016-142979 A | 8/2016 |
| JP | 2016-212248 A | 12/2016 |
| JP | 2018-205434 A | 12/2018 |
| JP | 2019-008012 A | 1/2019 |
| JP | 2019-028258 A | 2/2019 |
| JP | 2019-113609 A | 7/2019 |
| JP | 2020-027156 A | 2/2020 |
| JP | 2020-170102 A | 10/2020 |
| JP | 2020-190680 A | 11/2020 |
| JP | 2021-009217 A | 1/2021 |
| JP | 2021-067760 A | 4/2021 |
| JP | 2021-081660 A | 5/2021 |
| JP | 2022-018006 A | 1/2022 |
| WO | 2014/129187 A1 | 8/2014 |
| WO | 2015/146067 A1 | 10/2015 |
| WO | 2016/017727 A1 | 2/2016 |
| WO | 2019/049371 A1 | 3/2019 |

OTHER PUBLICATIONS

Decision of Dismissal of Amendment issued Dec. 17, 2024, in Japanese Patent Application No. 2023-527506.
Decision of Refusal issued Dec. 17, 2024, in Japanese Patent Application No. 2023-527506.
Office Action issued Jul. 16, 2024, in Japanese Patent Application No. 2023-527506.
International Search Report for International Patent Application No. PCT/JP2022/008965, Apr. 5, 2022.
Office Action issued Nov. 11, 2025, in Japanese Patent Application No. 2025-040386.
Office Action issued Mar. 31, 2026, in Chinese Patent Application No. 202280028138.5.
Office Action issued Apr. 28, 2026, in Japanese Patent Application No. 2025-040386.
Office Action issued Aug. 25, 2026, in Chinese Patent Application No. 202280028138.5.

* cited by examiner

VARIABLE MAGNIFICATION OPTICAL SYSTEM, OPTICAL APPARATUS, AND METHOD FOR MANUFACTURING VARIABLE MAGNIFICATION OPTICAL SYSTEM

TECHNICAL FIELD

The present disclosure relates to a variable magnification optical system, an optical apparatus, and a method for manufacturing a variable magnification optical system.

BACKGROUND ART

Variable magnification optical systems used in optical apparatuses, such as cameras for photographs, electronic still cameras, and video cameras, have been proposed (see, e.g., PTL 1).

CITATION LIST

Patent Literature

PTL 1

Japanese Unexamined Patent Publication No. 2020-170102

SUMMARY OF INVENTION

A variable magnification optical system of the present disclosure includes a plurality of lens groups; the plurality of lens groups is six or more lens groups and comprises a first lens group having positive refractive power and a rear group disposed closer to an image side than the first lens group; at varying magnification the distances between the lens groups are varied; the first lens group consists of two or fewer lenses; both the following conditional expressions are satisfied:

$$8.00 < f1/D1 < 27.00$$

$$1.00 < M1/D1 < 12.00$$

where f1 is the focal length of the first lens group,

D1 is the thickness of the first lens group on an optical axis, and

M1 is the amount of movement of the first lens group at varying magnification from a wide-angle end state to a telephoto end state.

A method for manufacturing a variable magnification optical system of the present disclosure is a method for manufacturing a variable magnification optical system including a plurality of lens groups; the plurality of lens groups is six or more lens groups and comprises a first lens group having positive refractive power and a rear group disposed closer to an image side than the first lens group; the method includes arranging so that at varying magnification the distances between the lens groups are varied, the first lens group consists of two or fewer lenses, and both the following conditional expressions are satisfied:

$$8.00 < f1/D1 < 27.00$$

$$1.00 < M1/D1 < 12.00$$

where f1 is the focal length of the first lens group,

D1 is the thickness of the first lens group on an optical axis, and

M1 is the amount of movement of the first lens group at varying magnification from a wide-angle end state to a telephoto end state.

DESCRIPTION OF EMBODIMENTS

Figure 1:
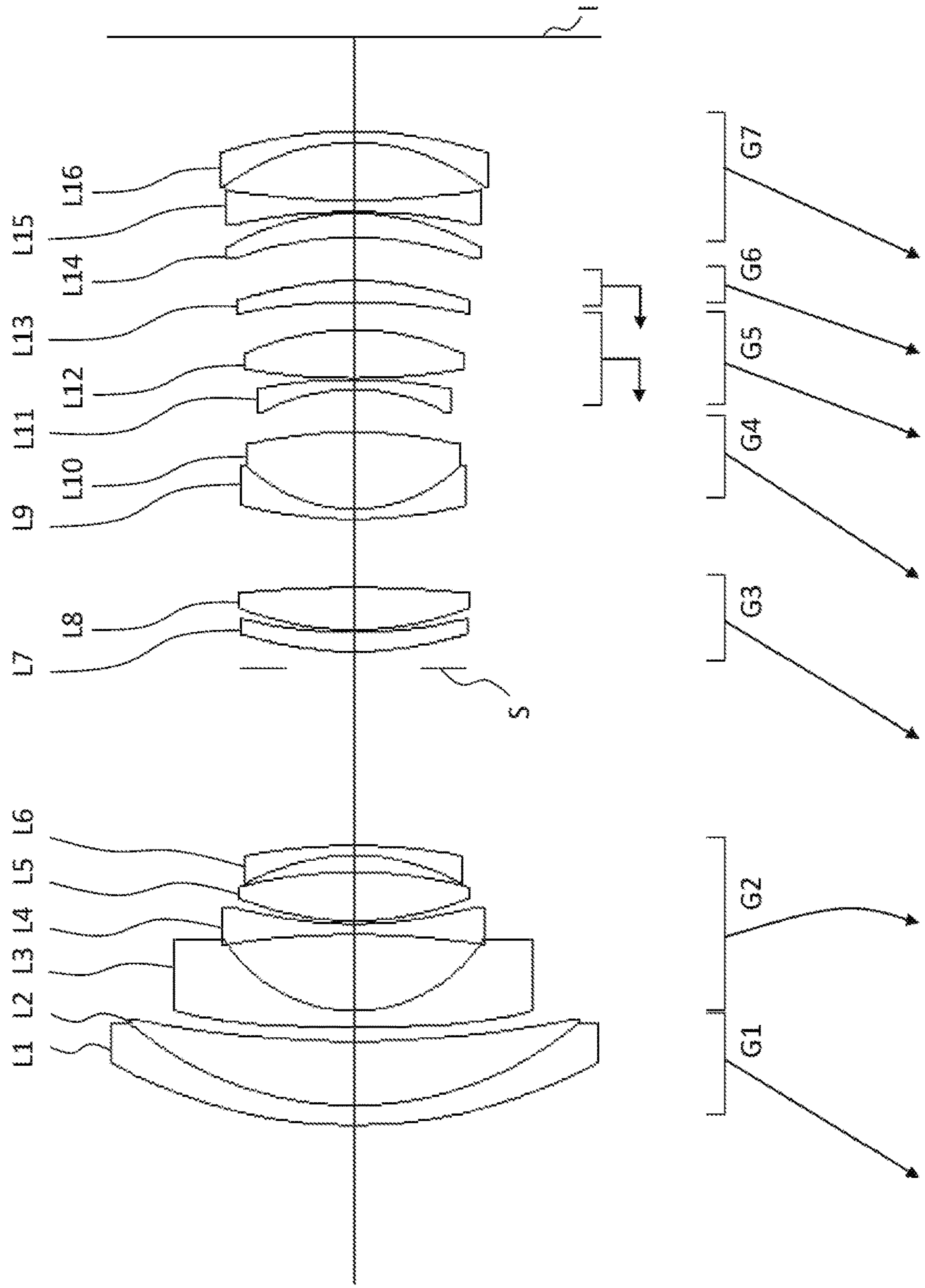
FIG. 1 is a cross-sectional view of a variable magnification optical system of a first example focusing on an object at infinity in the wide-angle end state.

The following describes a variable magnification optical system, an optical apparatus, and a method for manufacturing a variable magnification optical system of an embodiment of the present application.

A variable magnification optical system of the present embodiment includes a plurality of lens groups; the plurality of lens groups is six or more lens groups and comprises a first lens group having positive refractive power and a rear group disposed closer to an image side than the first lens group; at varying magnification the distances between the lens groups are varied; the first lens group consists of two or fewer lenses; both the following conditional expressions are satisfied:

$$8.00 < f1/D1 < 27.00 \quad (1)$$

$$1.00 < M1/D1 < 12.00 \quad (2)$$

where f1 is the focal length of the first lens group,

D1 is the thickness of the first lens group on an optical axis, and

M1 is the amount of movement of the first lens group at varying magnification from a wide-angle end state to a telephoto end state.

The variable magnification optical system of the present embodiment can be reduced in weight by including two or fewer lenses in the first lens group.

Conditional expression (1) restricts the ratio of the focal length of the first lens group to the thickness of the first lens group on an optical axis. The variable magnification optical system of the present embodiment, which satisfies conditional expression (1), can appropriately reduce variations in aberrations including spherical aberration at varying magnification.

If the value of conditional expression (1) is greater than the upper limit in the variable magnification optical system of the present embodiment, the first lens group will be too thin on the optical axis, making it difficult to appropriately reduce variations in aberrations including spherical aberration at varying magnification.

The effect of the present embodiment can be ensured by setting the upper limit of conditional expression (1) to 27.00 in the variable magnification optical system of the present embodiment. To further ensure the effect of the present embodiment, the upper limit of conditional expression (1) is preferably set to 26.50, 26.25, 26.10, 25.00, 22.50, 20.00, 17.50, or 15.00, more preferably to 14.00.

If the value of conditional expression (1) is less than the lower limit in the variable magnification optical system of the present embodiment, the first lens group will have too strong refractive power, making it difficult to appropriately reduce variations in aberrations including spherical aberration at varying magnification.

The effect of the present embodiment can be ensured by setting the lower limit of conditional expression (1) to 8.00 in the variable magnification optical system of the present embodiment. To further ensure the effect of the present embodiment, the lower limit of conditional expression (1) is preferably set to 8.20, 8.40, 8.50, 8.75, 9.00, 9.10, or 9.20, more preferably to 9.30.

Conditional expression (2) restricts the ratio of the amount of movement of the first lens group at varying magnification from a wide-angle end state to a telephoto end state to the thickness of the first lens group on an optical axis. The variable magnification optical system of the present embodiment, which satisfies conditional expression (2), can appropriately reduce variations in aberrations including spherical aberration at varying magnification.

If the value of conditional expression (2) is greater than the upper limit in the variable magnification optical system of the present embodiment, the first lens group will be too thin on the optical axis, making it difficult to appropriately reduce variations in aberrations including spherical aberration at varying magnification.

The effect of the present embodiment can be ensured by setting the upper limit of conditional expression (2) to 12.00 in the variable magnification optical system of the present embodiment. To further ensure the effect of the present embodiment, the upper limit of conditional expression (2) is preferably set to 11.75, 11.50, 11.25, 11.00, 10.90, or 10.80, more preferably to 10.70.

If the value of conditional expression (2) is less than the lower limit in the variable magnification optical system of the present embodiment, the amount of movement of the first lens group will be too large, making it difficult to appropriately reduce variations in aberrations including spherical aberration at varying magnification.

The effect of the present embodiment can be ensured by setting the lower limit of conditional expression (2) to 1.00 in the variable magnification optical system of the present embodiment. To further ensure the effect of the present embodiment, the lower limit of conditional expression (2) is preferably set to 1.25, 1.50, 1.75, 2.00, 2.25, or 2.50, more preferably to 2.60.

A variable magnification optical system satisfying both conditional expressions (1) and (2) can appropriately reduce variations in aberrations including spherical aberration at varying magnification.

In the variable magnification optical system of the present embodiment, the rear group preferably includes a first negative lens group having negative refractive power, and the following conditional expression is preferably satisfied:

$$1.00 < f1/(-fN1) < 8.00 \tag{3}$$

where fN1 is the focal length of the first negative lens group.

Conditional expression (3) restricts the ratio of the focal length of the first lens group to that of the first negative lens group. The variable magnification optical system of the present embodiment, which satisfies conditional expression (3), can appropriately reduce variations in aberrations including spherical aberration at varying magnification.

If the value of conditional expression (3) is greater than the upper limit in the variable magnification optical system of the present embodiment, the first negative lens group will have too strong refractive power, making it difficult to appropriately reduce variations in aberrations including spherical aberration at varying magnification.

The effect of the present embodiment can be ensured by setting the upper limit of conditional expression (3) to 8.00 in the variable magnification optical system of the present embodiment. To further ensure the effect of the present embodiment, the upper limit of conditional expression (3) is preferably set to 7.75, 7.50, 7.25, 7.00, 6.85, or 6.75, more preferably to 6.65.

If the value of conditional expression (3) is less than the lower limit in the variable magnification optical system of the present embodiment, the first lens group will have too strong refractive power, making it difficult to appropriately reduce variations in aberrations including spherical aberration at varying magnification.

The effect of the present embodiment can be ensured by setting the lower limit of conditional expression (3) to 1.00 in the variable magnification optical system of the present embodiment. To further ensure the effect of the present embodiment, the lower limit of conditional expression (3) is preferably set to 1.25, 1.50, 1.75, 2.00, 2.25, 2.50, 2.75, 3.00, or 3.25, more preferably to 3.50.

In the variable magnification optical system of the present embodiment, the rear group preferably includes a first negative lens group having negative refractive power, and a second negative lens group having negative refractive power and disposed closer to the image side than the first negative lens group, and the following expression is preferably satisfied:

$$0.10 < f1/(-fN2) < 5.00 \tag{4}$$

where fN2 is the focal length of the second negative lens group.

Conditional expression (4) restricts the ratio of the focal length of the first lens group to that of the second negative lens group. The variable magnification optical system of the present embodiment, which satisfies conditional expression (4), can appropriately reduce variations in aberrations including spherical aberration at varying magnification.

If the value of conditional expression (4) is greater than the upper limit in the variable magnification optical system of the present embodiment, the second negative lens group will have too strong refractive power, making it difficult to appropriately reduce variations in aberrations including spherical aberration at varying magnification.

The effect of the present embodiment can be ensured by setting the upper limit of conditional expression (4) to 5.00 in the variable magnification optical system of the present embodiment. To further ensure the effect of the present embodiment, the upper limit of conditional expression (4) is preferably set to 4.85, 4.75, 4.60, 4.50, or 4.25, more preferably to 4.00.

If the value of conditional expression (4) is less than the lower limit in the variable magnification optical system of the present embodiment, the first lens group will have too strong refractive power, making it difficult to appropriately reduce variations in aberrations including spherical aberration at varying magnification.

The effect of the present embodiment can be ensured by setting the lower limit of conditional expression (4) to 0.10 in the variable magnification optical system of the present embodiment. To further ensure the effect of the present embodiment, the lower limit of conditional expression (4) is preferably set to 0.11, 0.12, 0.25, 0.30, 0.50, 0.75, 1.00, 1.25, or 1.75, more preferably to 2.00.

In the variable magnification optical system of the present embodiment, the rear group preferably includes a first negative lens group having negative refractive power, and a second negative lens group having negative refractive power and disposed closer to the image side than the first negative lens group, and the following expression is preferably satisfied:

$$0.01 < fN1/fN2 < 1.00 \quad (5)$$

where fN1 is the focal length of the first negative lens group, and fN2 is the focal length of the second negative lens group.

Conditional expression (5) restricts the ratio of the focal length of the first negative lens group to that of the second negative lens group. The variable magnification optical system of the present embodiment, which satisfies conditional expression (5), can appropriately reduce variations in aberrations including spherical aberration at varying magnification.

If the value of conditional expression (5) is greater than the upper limit in the variable magnification optical system of the present embodiment, the second negative lens group will have too strong refractive power, making it difficult to appropriately reduce variations in aberrations including spherical aberration at varying magnification.

The effect of the present embodiment can be ensured by setting the upper limit of conditional expression (5) to 1.00 in the variable magnification optical system of the present embodiment. To further ensure the effect of the present embodiment, the upper limit of conditional expression (5) is preferably set to 0.95, 0.90, 0.85, 0.80, 0.75, or 0.70, more preferably to 0.65.

If the value of conditional expression (5) is less than the lower limit in the variable magnification optical system of the present embodiment, the first negative lens group will have too strong refractive power, making it difficult to appropriately reduce variations in aberrations including spherical aberration at varying magnification.

The effect of the present embodiment can be ensured by setting the lower limit of conditional expression (5) to 0.01 in the variable magnification optical system of the present embodiment. To further ensure the effect of the present embodiment, the lower limit of conditional expression (5) is preferably set to 0.02, 0.05, 0.10, 0.15, 0.20, or 0.25, more preferably to 0.30.

In the variable magnification optical system of the present embodiment, the first negative lens group is preferably a lens group disposed closest to an object side of lens groups having negative refractive power in the rear group.

The variable magnification optical system of the present embodiment having such a configuration can appropriately reduce variations in aberrations including spherical aberration at varying magnification.

In the variable magnification optical system of the present embodiment, the rear group preferably includes a first positive lens group having positive refractive power, and the following conditional expression is preferably satisfied:

$$0.75 < f1/fP1 < 5.00 \quad (6)$$

where fP1 is the focal length of the first positive lens group.

Conditional expression (6) restricts the ratio of the focal length of the first lens group to that of the first positive lens group. The variable magnification optical system of the present embodiment, which satisfies conditional expression (6), can appropriately reduce variations in aberrations including spherical aberration at varying magnification.

If the value of conditional expression (6) is greater than the upper limit in the variable magnification optical system of the present embodiment, the first positive lens group will have too strong refractive power, making it difficult to appropriately reduce variations in aberrations including spherical aberration at varying magnification.

The effect of the present embodiment can be ensured by setting the upper limit of conditional expression (6) to 5.00 in the variable magnification optical system of the present embodiment. To further ensure the effect of the present embodiment, the upper limit of conditional expression (6) is preferably set to 4.90, 4.80, 4.75, 4.70, 4.60, or 4.50, more preferably to 4.45.

If the value of conditional expression (6) is less than the lower limit in the variable magnification optical system of the present embodiment, the first lens group will have too strong refractive power, making it difficult to appropriately reduce variations in aberrations including spherical aberration at varying magnification.

The effect of the present embodiment can be ensured by setting the lower limit of conditional expression (6) to 0.75 in the variable magnification optical system of the present embodiment. To further ensure the effect of the present embodiment, the lower limit of conditional expression (6) is preferably set to 0.80, 0.85, 0.90, 0.95, 1.00, 1.05, 1.10, or 1.15, more preferably to 1.20.

In the variable magnification optical system of the present embodiment, the rear group preferably includes a first positive lens group having positive refractive power, and a first negative lens group having negative refractive power and disposed closer to the image side than the first positive lens group, and the following conditional expression is preferably satisfied:

$$0.75 < fP1/(-fN1) < 4.50 \quad (7)$$

where fP1 is the focal length of the first positive lens group, and fN1 is the focal length of the first negative lens group.

Conditional expression (7) restricts the ratio of the focal length of the first positive lens group to that of the first negative lens group. The variable magnification optical system of the present embodiment, which satisfies conditional expression (7), can appropriately reduce variations in aberrations including spherical aberration at varying magnification.

If the value of conditional expression (7) is greater than the upper limit in the variable magnification optical system of the present embodiment, the first negative lens group will have too strong refractive power, making it difficult to appropriately reduce variations in aberrations including spherical aberration at varying magnification.

The effect of the present embodiment can be ensured by setting the upper limit of conditional expression (7) to 4.50 in the variable magnification optical system of the present embodiment. To further ensure the effect of the present embodiment, the upper limit of conditional expression (7) is preferably set to 4.35, 4.25, 4.10, 4.00, or 3.90, more preferably to 3.85.

If the value of conditional expression (7) is less than the lower limit in the variable magnification optical system of the present embodiment, the first positive lens group will have too strong refractive power, making it difficult to appropriately reduce variations in aberrations including spherical aberration at varying magnification.

The effect of the present embodiment can be ensured by setting the lower limit of conditional expression (7) to 0.75 in the variable magnification optical system of the present embodiment. To further ensure the effect of the present embodiment, the lower limit of conditional expression (7) is preferably set to 0.85, 0.95, 1.00, 1.10, 1.20, 1.50, or 1.70, more preferably to 2.00.

In the variable magnification optical system of the present embodiment, the rear group preferably includes a first positive lens group having positive refractive power, and a first negative lens group having negative refractive power and disposed closer to the image side than the first positive lens group, and the following conditional expression is preferably satisfied:

$$1.00 < MP1/MN1 < 20.00 \quad (8)$$

where

MP1 is the amount of movement of the first positive lens group at varying magnification from the wide-angle end state to the telephoto end state, and MN1 is the amount of movement of the first negative lens group at varying magnification from the wide-angle end state to the telephoto end state.

Conditional expression (8) restricts the ratio of the amount of movement of the first positive lens group at varying magnification to that of the first negative lens group at varying magnification. The variable magnification optical system of the present embodiment, which satisfies conditional expression (8), can appropriately reduce variations in aberrations including spherical aberration at varying magnification.

If the value of conditional expression (8) is greater than the upper limit in the variable magnification optical system of the present embodiment, the amount of movement of the first negative lens group will be too small, making it difficult to appropriately reduce variations in aberrations including spherical aberration at varying magnification.

The effect of the present embodiment can be ensured by setting the upper limit of conditional expression (8) to 20.00 in the variable magnification optical system of the present embodiment. To further ensure the effect of the present embodiment, the upper limit of conditional expression (8) is preferably set to 18.00, 15.00, 12.25, 10.00, 9.00, 7.50, 6.00, 5.50, 5.00, 4.50, or 4.00, more preferably to 3.50.

If the value of conditional expression (8) is less than the lower limit in the variable magnification optical system of the present embodiment, the amount of movement of the first positive lens group will be too small, making it difficult to appropriately reduce variations in aberrations including spherical aberration at varying magnification.

The effect of the present embodiment can be ensured by setting the lower limit of conditional expression (8) to 1.00 in the variable magnification optical system of the present embodiment. To further ensure the effect of the present embodiment, the lower limit of conditional expression (8) is preferably set to 1.10, 1.25, 1.40, 1.50, 1.60, or 1.75, more preferably to 1.90.

In the variable magnification optical system of the present embodiment, the rear group preferably includes a first positive lens group having positive refractive power, and a second positive lens group having positive refractive power and disposed closer to the image side than the first positive lens group.

The variable magnification optical system of the present embodiment having such a configuration can appropriately reduce variations in aberrations including spherical aberration at varying magnification.

The variable magnification optical system of the present embodiment preferably satisfies the following conditional expression:

$$0.25 < fP1/fP2 < 3.50 \quad (9)$$

where fP1 is the focal length of the first positive lens group, and fP2 is the focal length of the second positive lens group.

Conditional expression (9) restricts the ratio of the focal length of the first positive lens group to that of the second positive lens group. The variable magnification optical system of the present embodiment, which satisfies conditional expression (9), can appropriately reduce variations in aberrations including spherical aberration at varying magnification.

If the value of conditional expression (9) is greater than the upper limit in the variable magnification optical system of the present embodiment, the second positive lens group will have too strong refractive power, making it difficult to appropriately reduce variations in aberrations including spherical aberration at varying magnification.

The effect of the present embodiment can be ensured by setting the upper limit of conditional expression (9) to 3.50 in the variable magnification optical system of the present embodiment. To further ensure the effect of the present embodiment, the upper limit of conditional expression (9) is preferably set to 3.45, 3.40, 3.35, 3.30, or 3.25, more preferably to 3.20.

If the value of conditional expression (9) is less than the lower limit in the variable magnification optical system of the present embodiment, the first positive lens group will have too strong refractive power, making it difficult to appropriately reduce variations in aberrations including spherical aberration at varying magnification.

The effect of the present embodiment can be ensured by setting the lower limit of conditional expression (9) to 0.25 in the variable magnification optical system of the present embodiment. To further ensure the effect of the present embodiment, the lower limit of conditional expression (9) is preferably set to 0.28, 0.30, 0.35, 0.45, 0.50, or 0.60, more preferably to 0.75.

In the variable magnification optical system of the present embodiment, the first positive lens group is preferably a lens group disposed closest to an object side of lens groups having positive refractive power in the rear group.

The variable magnification optical system of the present embodiment having such a configuration can appropriately reduce variations in aberrations including spherical aberration at varying magnification.

In the variable magnification optical system of the present embodiment, the rear group preferably includes a positive focusing group having positive refractive power and configured to move along the optical axis at focusing, and the following conditional expression is preferably satisfied:

$$0.75 < f1/fFP < 4.50 \quad (10)$$

where fFP is the focal length of the positive focusing group.

Conditional expression (10) restricts the ratio of the focal length of the first lens group to that of the positive focusing group. The variable magnification optical system of the present embodiment, which satisfies conditional expression (10), can appropriately reduce variations in aberrations including spherical aberration at focusing and at varying magnification.

If the value of conditional expression (10) is greater than the upper limit in the variable magnification optical system of the present embodiment, the positive focusing group will have too strong refractive power, making it difficult to appropriately reduce variations in aberrations including spherical aberration at focusing.

The effect of the present embodiment can be ensured by setting the upper limit of conditional expression (10) to 4.50 in the variable magnification optical system of the present embodiment. To further ensure the effect of the present embodiment, the upper limit of conditional expression (10) is preferably set to 4.25, 4.15, 4.00, 3.50, 3.25, 3.00, 2.75, 2.60, or 2.25, more preferably to 2.00.

If the value of conditional expression (10) is less than the lower limit in the variable magnification optical system of the present embodiment, the first lens group will have too strong refractive power, making it difficult to appropriately reduce variations in aberrations including spherical aberration at varying magnification.

The effect of the present embodiment can be ensured by setting the lower limit of conditional expression (10) to 0.75 in the variable magnification optical system of the present embodiment. To further ensure the effect of the present embodiment, the lower limit of conditional expression (10) is preferably set to 0.80, 0.90, or 0.95, more preferably to 1.00.

In the variable magnification optical system of the present embodiment, the rear group preferably includes a positive focusing group having positive refractive power and configured to move along the optical axis at focusing, and the following conditional expression is preferably satisfied:

$$-3.50 < fFP/fRPw < -0.50 \quad (11)$$

where fFP is the focal length of the positive focusing group, and fRPw is a combined focal length in the wide-angle end state of one or more lens groups disposed closer to the image side than the positive focusing group.

Conditional expression (11) restricts the ratio of the focal length of the positive focusing group to a combined focal length in the wide-angle end state of the lens groups disposed closer to the image side than the positive focusing group. The variable magnification optical system of the present embodiment, which satisfies conditional expression (11), can appropriately reduce aberrations including coma aberration in the wide-angle end state and appropriately reduce variations in aberrations including spherical aberration at focusing.

If the value of conditional expression (11) is greater than the upper limit in the variable magnification optical system of the present embodiment, the lens groups disposed closer to the image side than the positive focusing group will have too strong refractive power in the wide-angle end state, making it difficult to appropriately reduce aberrations including coma aberration in the wide-angle end state.

The effect of the present embodiment can be ensured by setting the upper limit of conditional expression (11) to −0.50 in the variable magnification optical system of the present embodiment. To further ensure the effect of the present embodiment, the upper limit of conditional expression (11) is preferably set to −0.55, −0.60, or −0.65, more preferably to −0.70.

If the value of conditional expression (11) is less than the lower limit in the variable magnification optical system of the present embodiment, the positive focusing group will have too strong refractive power, making it difficult to appropriately reduce variations in aberrations including spherical aberration at focusing.

The effect of the present embodiment can be ensured by setting the lower limit of conditional expression (11) to −3.50 in the variable magnification optical system of the present embodiment. To further ensure the effect of the present embodiment, the lower limit of conditional expression (11) is preferably set to −3.40, −3.30, −3.25, or −3.20, more preferably to −3.15.

In the variable magnification optical system of the present embodiment, the rear group preferably includes a negative focusing group having negative refractive power and configured to move along the optical axis at focusing, and the following conditional expression is preferably satisfied:

$$0.10 < f1/(-fFN) < 4.00 \quad (12)$$

where fFN is the focal length of the negative focusing group.

Conditional expression (12) restricts the ratio of the focal length of the first lens group to that of the negative focusing group. The variable magnification optical system of the present embodiment, which satisfies conditional expression (12), can appropriately reduce variations in aberrations including spherical aberration at focusing and at varying magnification.

If the value of conditional expression (12) is greater than the upper limit in the variable magnification optical system of the present embodiment, the negative focusing group will have too strong refractive power, making it difficult to appropriately reduce variations in aberrations including spherical aberration at focusing.

The effect of the present embodiment can be ensured by setting the upper limit of conditional expression (12) to 4.00 in the variable magnification optical system of the present embodiment. To further ensure the effect of the present embodiment, the upper limit of conditional expression (12) is preferably set to 3.90, 3.80, 3.55, or 3.25, more preferably to 3.00.

If the value of conditional expression (12) is less than the lower limit in the variable magnification optical system of the present embodiment, the first lens group will have too strong refractive power, making it difficult to appropriately reduce variations in aberrations including spherical aberration at varying magnification.

The effect of the present embodiment can be ensured by setting the lower limit of conditional expression (12) to 0.10 in the variable magnification optical system of the present embodiment. To further ensure the effect of the present embodiment, the lower limit of conditional expression (12) is preferably set to 0.12, 0.25, 0.50, 0.75, or 1.00, more preferably to 1.25.

In the variable magnification optical system of the present embodiment, the rear group preferably includes a negative focusing group having negative refractive power and configured to move along the optical axis at focusing, and the following conditional expression is preferably satisfied:

$$-25.00 < (-fFN)/fRNw < 1.00 \tag{13}$$

where fFN is the focal length of the negative focusing group, and fRNw is a combined focal length in the wide-angle end state of one or more lens groups disposed closer to the image side than the negative focusing group.

Conditional expression (13) restricts the ratio of the focal length of the negative focusing group to the focal length in the wide-angle end state of the lens groups disposed closer to the image side than the negative focusing group. The variable magnification optical system of the present embodiment, which satisfies conditional expression (13), can appropriately reduce aberrations including coma aberration in the wide-angle end state and appropriately reduce variations in aberrations including spherical aberration at focusing.

If the value of conditional expression (13) is greater than the upper limit in the variable magnification optical system of the present embodiment, the lens groups disposed closer to the image side than the negative focusing group will have too strong refractive power in the wide-angle end state, making it difficult to appropriately reduce aberrations including coma aberration in the wide-angle end state.

The effect of the present embodiment can be ensured by setting the upper limit of conditional expression (13) to 1.00 in the variable magnification optical system of the present embodiment. To further ensure the effect of the present embodiment, the upper limit of conditional expression (13) is preferably set to 0.90, 0.80, 0.75, 0.70, 0.65, 0.60, or 0.55, more preferably to 0.50.

If the value of conditional expression (13) is less than the lower limit in the variable magnification optical system of the present embodiment, the negative focusing group will have too strong refractive power, making it difficult to appropriately reduce variations in aberrations including spherical aberration at focusing.

The effect of the present embodiment can be ensured by setting the lower limit of conditional expression (13) to −25.00 in the variable magnification optical system of the present embodiment. To further ensure the effect of the present embodiment, the lower limit of conditional expression (13) is preferably set to −24.00, −20.00, −17.50, −15.00, −12.25, −10.00, −7.50, −5.00, or −2.50, more preferably to −1.50.

In the variable magnification optical system of the present embodiment, a final lens group disposed closest to the image side of lens groups in the rear group preferably has negative refractive power, and the following conditional expression is preferably satisfied:

$$0.10 < f1/(-fR) < 5.00 \tag{14}$$

where fR is the focal length of the final lens group.

Conditional expression (14) restricts the ratio of the focal length of the first lens group to that of the final lens group. The variable magnification optical system of the present embodiment, which satisfies conditional expression (14), can appropriately reduce variations in aberrations including spherical aberration at varying magnification.

If the value of conditional expression (14) is greater than the upper limit in the variable magnification optical system of the present embodiment, the final lens group will have too strong refractive power, making it difficult to appropriately reduce variations in aberrations including coma aberration at varying magnification.

The effect of the present embodiment can be ensured by setting the upper limit of conditional expression (14) to 5.00 in the variable magnification optical system of the present embodiment. To further ensure the effect of the present embodiment, the upper limit of conditional expression (14) is preferably set to 4.95, 4.90, 4.85, 4.50, 4.25, or 4.00, more preferably to 3.75.

If the value of conditional expression (14) is less than the lower limit in the variable magnification optical system of the present embodiment, the first lens group will have too strong refractive power, making it difficult to appropriately reduce variations in aberrations including spherical aberration at varying magnification.

The effect of the present embodiment can be ensured by setting the lower limit of conditional expression (14) to 0.10 in the variable magnification optical system of the present embodiment. To further ensure the effect of the present embodiment, the lower limit of conditional expression (14) is preferably set to 0.25, 0.40, 0.50, 0.60, or 0.70, more preferably to 0.75.

In the variable magnification optical system of the present embodiment, a final lens group disposed closest to the image side of lens groups in the rear group preferably has positive refractive power, and the following conditional expression is preferably satisfied:

$$0.10 < f1/fR < 1.50 \tag{15}$$

where fR is the focal length of the final lens group.

Conditional expression (15) restricts the ratio of the focal length of the first lens group to that of the final lens group. The variable magnification optical system of the present embodiment, which satisfies conditional expression (15), can appropriately reduce variations in aberrations including spherical aberration at varying magnification.

If the value of conditional expression (15) is greater than the upper limit in the variable magnification optical system of the present embodiment, the final lens group will have too strong refractive power, making it difficult to appropriately reduce variations in aberrations including coma aberration at varying magnification.

The effect of the present embodiment can be ensured by setting the upper limit of conditional expression (15) to 1.50 in the variable magnification optical system of the present embodiment. To further ensure the effect of the present embodiment, the upper limit of conditional expression (15) is preferably set to 1.40, 1.30, 1.25, 1.20, 1.15, or 1.10, more preferably to 1.05.

If the value of conditional expression (15) is less than the lower limit in the variable magnification optical system of the present embodiment, the first lens group will have too strong refractive power, making it difficult to appropriately reduce variations in aberrations including spherical aberration at varying magnification.

The effect of the present embodiment can be ensured by setting the lower limit of conditional expression (15) to 0.10 in the variable magnification optical system of the present embodiment. To further ensure the effect of the present embodiment, the lower limit of conditional expression (15) is preferably set to 0.15, 0.20, 0.25, or 0.30, more preferably to 0.35.

In the variable magnification optical system of the present embodiment, the first lens group preferably includes at least one lens satisfying both the following conditional expressions:

$$1.45 < nd1 < 2.10 \qquad (16)$$

$$20.00 < \nu d1 < 75.00 \qquad (17)$$

where

- $nd1$ is the refractive index for d-line of the lens in the first lens group, and
- $\kappa d1$ is the Abbe number for d-line of the lens in the first lens group.

Conditional expression (16) restricts the refractive index for d-line of the lens in the first lens group, and conditional expression (17) the Abbe number for d-line of the lens in the first lens group. The variable magnification optical system of the present embodiment can favorably correct chromatic aberration and aberrations including spherical aberration in the telephoto end state by including at least one lens satisfying both conditional expressions (16) and (17) in the first lens group.

If the value of conditional expression (16) is greater than the upper limit in the variable magnification optical system of the present embodiment, the final lens group will have too strong refractive power, making it difficult to appropriately reduce variations in aberrations including coma aberration at varying magnification.

The effect of the present embodiment can be ensured by setting the upper limit of conditional expression (16) to 2.10 in the variable magnification optical system of the present embodiment. To further ensure the effect of the present embodiment, the upper limit of conditional expression (16) is preferably set to 2.05 or 2.00, more preferably to 1.98.

If the value of conditional expression (16) is less than the lower limit in the variable magnification optical system of the present embodiment, the lens in the first lens group will have too weak refractive power, making it difficult to favorably correct aberrations including spherical aberration in the telephoto end state.

The effect of the present embodiment can be ensured by setting the lower limit of conditional expression (16) to 1.45 in the variable magnification optical system of the present embodiment.

To further ensure the effect of the present embodiment, the lower limit of conditional expression (16) is preferably set to 1.48, 1.50, 1.53, or 1.55, more preferably to 1.57.

If the value of conditional expression (17) is greater than the upper limit in the variable magnification optical system of the present embodiment, the dispersion of the lens in the first lens group will be too small, making it difficult to favorably correct chromatic aberration in the telephoto end state.

The effect of the present embodiment can be ensured by setting the upper limit of conditional expression (17) to 75.00 in the variable magnification optical system of the present embodiment. To further ensure the effect of the present embodiment, the upper limit of conditional expression (17) is preferably set to 74.00, 72.50, 71.00, or 70.00, more preferably to 68.50.

If the value of conditional expression (17) is less than the lower limit in the variable magnification optical system of the present embodiment, the dispersion of the lens in the first lens group will be too small, making it difficult to favorably correct chromatic aberration in the telephoto end state.

The effect of the present embodiment can be ensured by setting the lower limit of conditional expression (17) to 20.00 in the variable magnification optical system of the present embodiment. To further ensure the effect of the present embodiment, the lower limit of conditional expression (17) is preferably set to 21.00 or 22.50, more preferably to 23.00.

In the variable magnification optical system of the present embodiment, the lens disposed closest to the image side preferably satisfies the following conditional expression:

$$-12.00 < (r2 - r1)/(r2 + r1) < 2.00 \qquad (18)$$

where

- $r1$ is the radius of curvature of an object-side lens surface of the lens disposed closest to the image side, and
- $r2$ is the radius of curvature of an image-side lens surface of the lens disposed closest to the image side.

Conditional expression (18) restricts the shape factor of the lens disposed closest to the image side. The variable magnification optical system of the present embodiment, which satisfies conditional expression (18), can appropriately reduce variations in aberrations including coma aberration at varying magnification.

If the value of conditional expression (18) is greater than the upper limit in the variable magnification optical system of the present embodiment, the lens disposed closest to the image side will not be able to correct coma aberration appropriately, making it difficult to appropriately reduce variations in aberrations including coma aberration at varying magnification.

The effect of the present embodiment can be ensured by setting the upper limit of conditional expression (18) to 2.00 in the variable magnification optical system of the present embodiment. To further ensure the effect of the present embodiment, the upper limit of conditional expression (18) is preferably set to 1.90 or 1.80, more preferably to 1.75.

If the value of conditional expression (18) is less than the lower limit in the variable magnification optical system of the present embodiment, the lens disposed closest to the image side will not be able to correct coma aberration appropriately, making it difficult to appropriately reduce variations in aberrations including coma aberration at varying magnification.

The effect of the present embodiment can be ensured by setting the lower limit of conditional expression (18) to −12.00 in the variable magnification optical system of the present embodiment. To further ensure the effect of the present embodiment, the lower limit of conditional expression (18) is preferably set to −11.75, −11.50, −11.25, −10.00, −7.50, or −5.00, more preferably to −3.00.

In the variable magnification optical system of the present embodiment, the rear group preferably includes a negative focusing group having negative refractive power and configured to move along the optical axis at focusing, and the following conditional expression is preferably satisfied:

$$0.75 < fN/fFN < 30.00 \quad (19)$$

where fN is the focal length of a lens group having the weakest refractive power of lens groups having negative refractive power in the rear group, and fFN is the focal length of the negative focusing group.

Conditional expression (19) restricts the ratio of the focal length of a lens group having the weakest refractive power of lens groups having negative refractive power in the rear group to the focal length of the negative focusing group. The variable magnification optical system of the present embodiment, which satisfies conditional expression (19), can appropriately reduce variations in aberrations including spherical aberration at focusing and at varying magnification. If the value of conditional expression (19) is greater than the upper limit in the variable magnification optical system of the present embodiment, the negative focusing group will have too strong refractive power, making it difficult to appropriately reduce variations in aberrations including spherical aberration at focusing.

The effect of the present embodiment can be ensured by setting the upper limit of conditional expression (19) to 30.00 in the variable magnification optical system of the present embodiment. To further ensure the effect of the present embodiment, the upper limit of conditional expression (19) is preferably set to 28.00, 27.00, 25.00, 20.00, 17.50, 15.00, 12.25, 10.00, 7.50, or 5.00, more preferably to 3.50.

If the value of conditional expression (19) is less than the lower limit in the variable magnification optical system of the present embodiment, the refractive power of the lens group having the weakest refractive power of lens groups having negative refractive power in the rear group will be too strong, making it difficult to appropriately reduce variations in aberrations including spherical aberration at varying magnification.

The effect of the present embodiment can be ensured by setting the lower limit of conditional expression (19) to 0.75 in the variable magnification optical system of the present embodiment. To further ensure the effect of the present embodiment, the lower limit of conditional expression (19) is preferably set to 0.80, 0.85, or 0.90, more preferably to 0.95.

The variable magnification optical system of the present embodiment preferably satisfies the following conditional expression:

$$Fnot < 7.00 \quad (20)$$

where

Fnot is the f-number of the variable magnification optical system in the telephoto end state.

Conditional expression (20) restricts the f-number of the variable magnification optical system in the telephoto end state. The variable magnification optical system of the present embodiment, which satisfies conditional expression (20), can take in a large amount of light.

The effect of the present embodiment can be ensured by setting the upper limit of conditional expression (20) to 7.00 in the variable magnification optical system of the present embodiment. To further ensure the effect of the present embodiment, the upper limit of conditional expression (20) is preferably set to 6.90, 6.80, 6.70, 6.60, 6.00, or 5.00, more preferably to 4.50.

In the variable magnification optical system of the present embodiment, a lens group that is second closest to the image side of lens groups in the rear group preferably moves along the optical axis at focusing.

The variable magnification optical system of the present embodiment having such a configuration can appropriately reduce variations in aberrations including spherical aberration at focusing.

The variable magnification optical system of the present embodiment preferably satisfies the following conditional expression:

$$0.10 < Bfw/fw < 0.95 \quad (21)$$

where

Bfw is the back focus of the variable magnification optical system in the wide-angle end state, and fw is the focal length of the variable magnification optical system in the wide-angle end state.

Conditional expression (21) restricts the ratio of the back focus of the variable magnification optical system in the wide-angle end state to the focal length of the variable magnification optical system in the wide-angle end state. The variable magnification optical system of the present embodiment, which satisfies conditional expression (21), can be avoided upsizing and favorably correct aberrations including coma aberration in the wide-angle end state.

If the value of conditional expression (21) is greater than the upper limit in the variable magnification optical system of the present embodiment, the back focus will be too long, making it difficult to avoid the optical system upsizing.

The effect of the present embodiment can be ensured by setting the upper limit of conditional expression (21) to 0.95 in the variable magnification optical system of the present embodiment. To further ensure the effect of the present embodiment, the upper limit of conditional expression (21) is preferably set to 0.90, 0.85, or 0.80, more preferably to 0.75.

If the value of conditional expression (21) is less than the lower limit in the variable magnification optical system of the present embodiment, the position of an exit pupil will be too close to an image plane, making it difficult to favorably correct aberrations including coma aberration in the wide-angle end state.

The effect of the present embodiment can be ensured by setting the lower limit of conditional expression (21) to 0.10 in the variable magnification optical system of the present embodiment. To further ensure the effect of the present embodiment, the lower limit of conditional expression (21) is preferably set to 0.15, 0.20, 0.25, 0.30, or 0.35, more preferably to 0.40.

In the variable magnification optical system of the present embodiment, the first lens group preferably moves toward an object side at varying magnification from the wide-angle end state to the telephoto end state.

The variable magnification optical system of the present embodiment having such a configuration can be downsized and appropriately reduce variations in aberrations including spherical aberration at varying magnification.

In the variable magnification optical system of the present embodiment, the first lens group preferably consists of, in order from an object side, a negative lens and a positive lens.

The variable magnification optical system of the present embodiment having such a configuration can be reduced in weight and favorably correct aberrations including spherical aberration in the telephoto end state.

In the variable magnification optical system of the present embodiment, the first lens group preferably consists of a positive lens.

The variable magnification optical system of the present embodiment having such a configuration can be reduced in weight and favorably correct aberrations including spherical aberration in the telephoto end state.

In the variable magnification optical system of the present embodiment, the rear group preferably includes a first focusing group and a second focusing group that move along the optical axis at focusing.

The variable magnification optical system of the present embodiment having such a configuration can appropriately reduce variations in aberrations including spherical aberration at focusing.

The variable magnification optical system of the present embodiment preferably satisfies the following conditional expression:

$$0.20 < |fF1|/|fF2| < 30.00 \quad (22)$$

where fF1 is the focal length of the first focusing group, and fF2 is the focal length of the second focusing group.

Conditional expression (22) restricts the ratio of the focal length of the first focusing group to that of the second focusing group. The variable magnification optical system of the present embodiment, which satisfies conditional expression (22), can appropriately reduce variations in aberrations including spherical aberration at focusing.

If the value of conditional expression (22) is greater than the upper limit in the variable magnification optical system of the present embodiment, the second focusing group will have too strong refractive power, making it difficult to appropriately reduce variations in aberrations including spherical aberration at focusing.

The effect of the present embodiment can be ensured by setting the upper limit of conditional expression (22) to 30.00 in the variable magnification optical system of the present embodiment. To further ensure the effect of the present embodiment, the upper limit of conditional expression (22) is preferably set to 27.00, 25.00, 10.00, 2.00, 1.95, 1.90, 1.85, or 1.80, more preferably to 1.75.

If the value of conditional expression (22) is less than the lower limit in the variable magnification optical system of the present embodiment, the first focusing group will have too strong refractive power, making it difficult to appropriately reduce variations in aberrations including spherical aberration at varying magnification.

The effect of the present embodiment can be ensured by setting the lower limit of conditional expression (22) to 0.20 in the variable magnification optical system of the present embodiment. To further ensure the effect of the present embodiment, the lower limit of conditional expression (22) is preferably set to 0.25, 0.30, 0.35, 0.40, or 0.45, more preferably to 0.50.

In the variable magnification optical system of the present embodiment, at least one positive lens in the rear group preferably satisfies the following first conditional expression for dispersion:

$$\nu dP1 < 45.00 \quad (23)$$

where

κdP1 is the Abbe number for d-line of the positive lens in the rear group.

First conditional expression (23) for dispersion restricts the Abbe number for d-line of the positive lens in the rear group. The variable magnification optical system of the present embodiment can correct chromatic aberration favorably by including a positive lens satisfying first conditional expression (23) for dispersion in the rear group.

The effect of the present embodiment can be ensured by setting the upper limit of first conditional expression (23) for dispersion to 45.00 in the variable magnification optical system of the present embodiment. To further ensure the effect of the present embodiment, the upper limit of first conditional expression (23) for dispersion is preferably set to 43.00, 40.00, 35.00, or 30.00, more preferably to 28.50.

In the variable magnification optical system of the present embodiment, the positive lens satisfying first conditional expression (23) for dispersion is preferably included in a negative lens group having negative refractive power of lens groups in the rear group.

The variable magnification optical system of the present embodiment having such a configuration can correct chromatic aberration more favorably.

In the variable magnification optical system of the present embodiment, at least one negative lens in the rear group preferably satisfies the following second conditional expression for dispersion:

$$60.00 < \nu dN \quad (24)$$

where

κdN is the Abbe number for d-line of the negative lens in the rear group.

Second conditional expression (24) for dispersion restricts the Abbe number for d-line of the negative lens in the rear group. The variable magnification optical system of the present embodiment can correct chromatic aberration favorably by including a negative lens satisfying second conditional expression (24) for dispersion.

The effect of the present embodiment can be ensured by setting the lower limit of second conditional expression (24) for dispersion to 60.00 in the variable magnification optical system of the present embodiment. To further ensure the effect of the present embodiment, the lower limit of second conditional expression (24) for dispersion is preferably set to 62.50, 65.00, or 67.50, more preferably to 75.00.

In the variable magnification optical system of the present embodiment, the negative lens satisfying second conditional expression (24) for dispersion is preferably included in a final lens group disposed closest to the image side of lens groups in the rear group.

The variable magnification optical system of the present embodiment having such a configuration can correct chromatic aberration more favorably.

In the variable magnification optical system of the present embodiment, at least one lens group having positive refractive power of lens groups in the rear group preferably includes a positive lens satisfying the following third conditional expression for dispersion:

$$60.00 < \nu dP2 \quad (25)$$

where

κdP2 is the Abbe number for d-line of the positive lens in the rear group.

Third conditional expression (25) for dispersion restricts the Abbe number for d-line of the positive lens in the rear group. The variable magnification optical system of the present embodiment can correct chromatic aberration favorably by including a positive lens satisfying third conditional expression (25) for dispersion in the lens groups having positive refractive power.

The effect of the present embodiment can be ensured by setting the lower limit of third conditional expression (25) for dispersion to 60.00 in the variable magnification optical system of the present embodiment. To further ensure the effect of the present embodiment, the lower limit of third conditional expression (25) for dispersion is preferably set to 62.50, 65.00, or 67.50, more preferably to 75.00.

A small-sized variable magnification optical system of favorable imaging performance can be achieved by the above configurations.

An optical apparatus of the present embodiment includes a variable magnification optical system having a configuration described above. This enables achieving an optical apparatus of favorable optical performance.

A method for manufacturing a variable magnification optical system of the present embodiment is a method for manufacturing a variable magnification optical system including a plurality of lens groups; the plurality of lens groups is six or more lens groups and comprises a first lens group having positive refractive power and a rear group disposed closer to an image side than the first lens group; the method includes arranging so that at varying magnification the distances between the lens groups are varied, the first lens group consists of two or fewer lenses, and all of the following conditional expressions are satisfied:

$$8.00 < f1/D1 < 27.00 \quad (1)$$

$$1.00 < M1/D1 < 12.00 \quad (2)$$

where f1 is the focal length of the first lens group,

D1 is the thickness of the first lens group on an optical axis, and

M1 is the amount of movement of the first lens group at varying magnification from a wide-angle end state to a telephoto end state.

A variable magnification optical system of favorable optical performance can be manufactured by such a method for manufacturing a variable magnification optical system.

NUMERICAL EXAMPLES

Examples of the present application will be described below with reference to the drawings.

First Example

FIG. 1 is a cross-sectional view of a variable magnification optical system of a first example focusing on an object at infinity in the wide-angle end state.

The variable magnification optical system of the present example includes, in order from the object side, a first lens group G1 having positive refractive power, a second lens group G2 having negative refractive power, an aperture stop S, a third lens group G3 having positive refractive power, a fourth lens group G4 having positive refractive power, a fifth lens group G5 having positive refractive power, a sixth lens group G6 having positive refractive power, and a seventh lens group G7 having negative refractive power.

The first lens group G1 consists of a positive cemented lens composed of, in order from the object side, a negative meniscus lens L1 convex on the object side and a positive meniscus lens L2 convex on the object side.

The second lens group G2 consists of, in order from the object side, a negative meniscus lens L3 convex on the object side, a biconcave negative lens L4, a biconvex positive lens L5, and a negative meniscus lens L6 concave on the object side.

The third lens group G3 consists of a positive meniscus lens L7 convex on the object side and a biconvex positive lens L8.

The fourth lens group G4 consists of a positive cemented lens composed of, in order from the object side, a negative meniscus lens L9 convex on the object side and a biconvex positive lens L10.

The fifth lens group G5 consists of, in order from the object side, a negative meniscus lens L11 concave on the object side and a biconvex positive lens L12.

The sixth lens group G6 consists of a positive meniscus lens L13 concave on the object side.

The seventh lens group G7 consists of, in order from the object side, a positive meniscus lens L14 concave on the object side, a biconcave negative lens L15, and a negative meniscus lens L16 concave on the object side.

An imaging device (not shown) constructed from CCD, CMOS, or the like is disposed on an image plane I.

The variable magnification optical system of the present example focuses by moving the fifth lens group G5 and the sixth lens group G6 along the optical axis. When focus is shifted from infinity to a nearby object, the fifth lens group G5 and the sixth lens group G6 move from the image side toward the object side.

In the variable magnification optical system of the present example, the second lens group G2, the third lens group G3, the fourth lens group G4, the fifth lens group G5, the sixth lens group G6, and the seventh lens group G7 correspond to the rear group, and the seventh lens group G7 to the final lens group. The second lens group G2 corresponds to the first negative lens group, the third lens group G3 to the first positive lens group, the fourth lens group G4 to the second positive lens group, and the seventh lens group G7 to the second negative lens group. The fifth lens group G5 corresponds to the first focusing group, the sixth lens group G6 to the second focusing group, and the fifth lens group G5 and the sixth lens group G6 to the positive focusing group.

Table 1 below shows specifications of the variable magnification optical system of the present example.

In Table 1, fw denotes the focal length of the variable magnification optical system in the wide-angle end state, ft the focal length of the variable magnification optical system in the telephoto end state, Fnow the f-number of the variable magnification optical system in the wide-angle end state, and Fnot the f-number of the variable magnification optical system in the wide-angle end state. TL denotes the total optical length of the variable magnification optical system focusing on an object at infinity in the wide-angle end state, and Bf the back focus of the variable magnification optical system.

In Table 1, m denotes the places of optical surfaces counted from the object side, r the radii of curvature, d the surface-to-surface distances, nd the refractive indices for d-line (wavelength 587.6 nm), and νd the Abbe numbers for d-line. The radius of curvature r-∞ means a plane. In [Lens specifications], the optical surfaces with "*" are aspherical surfaces. [Lens specifications] also shows lenses corresponding to the positive lens P1, the negative lens N, and the positive lens P2 regarding conditional expressions (23), (24), and (25), respectively.

In Table 1, m denotes the optical surfaces corresponding to aspherical surface data, K the conic constants, and A4 to A14 the aspherical coefficients.

The aspherical surfaces are expressed by expression (a) below, where y denotes the height in a direction perpendicular to the optical axis, S(y) the distance along the optical axis from the tangent plane at the vertex of an aspherical surface to the aspherical surface at height y (a sag), r the radius of curvature of a reference sphere (paraxial radius of curvature), K the conic constant, and An the nth-order aspherical coefficient. In the examples, the second-order aspherical coefficient A2 is 0. "E-n" means "$\times 10^{-n}$"

$$S(y) = (y^2/r)/\left\{1 + \left(1 - K \times y^2/r^2\right)^{1/2}\right\} + A4 \times y^4 + A6 \times y^6 + A8 \times y^8 + A10 \times y^{10} + A12 \times y^{12} + A14 \times y^{14} \quad (a)$$

The unit of the focal lengths fw and ft, the radii of curvature r, and the other lengths listed in Table 1 is "mm." However, the unit is not limited thereto because the optical performance of a proportionally enlarged or reduced variable magnification optical system is the same as that of the original optical system.

The above reference symbols in Table 1 will also be used similarly in the tables of the other examples described below.

TABLE 1

[General specifications]

| | |
|---|---|
| fw | 24.75 |
| ft | 67.90 |
| Fnow | 2.92 |
| Fnot | 2.92 |

[Lens specifications]

| m | r | d | nd | νd | (23) | (24) | (25) |
|---|---|---|---|---|---|---|---|
| 1) | 63.844 | 2.500 | 1.854505 | 25.15 | | | |
| 2) | 43.986 | 8.128 | 1.816000 | 46.59 | | | |
| 3) | 142.193 | d3 | | | | | |
| *4) | 296.632 | 2.000 | 1.743890 | 49.53 | | | |
| 5) | 19.447 | 9.683 | | | | | |
| 6) | −100.452 | 1.300 | 1.834810 | 42.73 | P1 | | |
| 7) | 55.939 | 0.394 | | | | | |
| 8) | 38.386 | 6.222 | 1.728250 | 28.38 | | | |
| 9) | −56.749 | 2.082 | | | | | |
| 10) | −28.124 | 1.300 | 1.593490 | 67.00 | | N | |
| 11) | −72.000 | d11 | | | | | |
| 12> | ∞ | 2.257 | (aperture stop) | | | | |
| *13) | 45.234 | 2.437 | 1.820980 | 42.50 | P1 | | |
| 14) | 60.836 | 0.297 | | | | | |
| 15) | 39.871 | 5.325 | 1.593190 | 67.90 | | | P2 |
| 16) | −156.624 | d16 | | | | | |
| 17) | 58.428 | 1.300 | 1.737999 | 32.33 | | | |
| 18) | 19.539 | 9.700 | 1.497820 | 82.57 | | | P2 |
| 19) | −57.826 | d19 | | | | | |
| 20) | −24.303 | 1.200 | 1.720467 | 34.71 | | | |
| 21) | −64.092 | 0.200 | | | | | |
| 22) | 86.286 | 6.081 | 1.593490 | 67.00 | | | P2 |
| 23) | −33.001 | d23 | | | | | |
| 24) | −72.398 | 2.669 | 1.791890 | 45.04 | | | |
| *25) | −38.022 | d25 | | | | | |
| 26) | −44.000 | 3.018 | 1.945944 | 17.98 | | | |
| 27) | −32.214 | 0.200 | | | | | |

TABLE 1-continued

| | | | | |
|---|---|---|---|---|
| *28) | −84.205 | 1.500 | 1.816000 | 46.59 |
| 29) | 107.497 | 7.335 | | |
| 30) | −26.834 | 1.400 | 1.592700 | 35.27 |
| 31) | −54.107 | Bf | | |

[Aspherical surface data]

| m | K | A4 | A6 | A8 | A10 | A12 |
|---|---|---|---|---|---|---|
| 4) | 0.0000 | 5.67E−06 | −6.48E−09 | 1.59E−11 | −2.46E−14 | 1.99E−17 |
| 13) | 0.0000 | −3.46E−06 | 2.89E−09 | −1.52E−11 | 2.39E−14 | |
| 25) | 0.0000 | 1.23E−05 | −1.23E−08 | 2.75E−11 | 3.33E−14 | −1.60E−16 |
| 28) | 0.0000 | −2.18E−06 | −1.57E−08 | −1.32E−11 | 1.50E−14 | |

[Focal length data of groups]

| Groups | Starting surfaces | Focal lengths |
|---|---|---|
| G1 | 1 | 138.68 |
| G2 | 4 | −24.42 |
| G3 | 13 | 43.63 |
| G4 | 17 | 111.65 |
| G5 | 20 | 124.10 |
| G6 | 24 | 97.77 |
| G7 | 26 | −47.85 |

[Variable distance data]

| | Wide-angle end state | Telephoto end state |
|---|---|---|
| d3 | 1.800 | 32.239 |
| d11 | 22.304 | 2.000 |
| d16 | 8.637 | 1.500 |
| d19 | 5.489 | 19.095 |
| d23 | 3.541 | 2.935 |
| d25 | 5.473 | 2.073 |
| Bf | 11.855 | 28.555 |

Figure 2A:
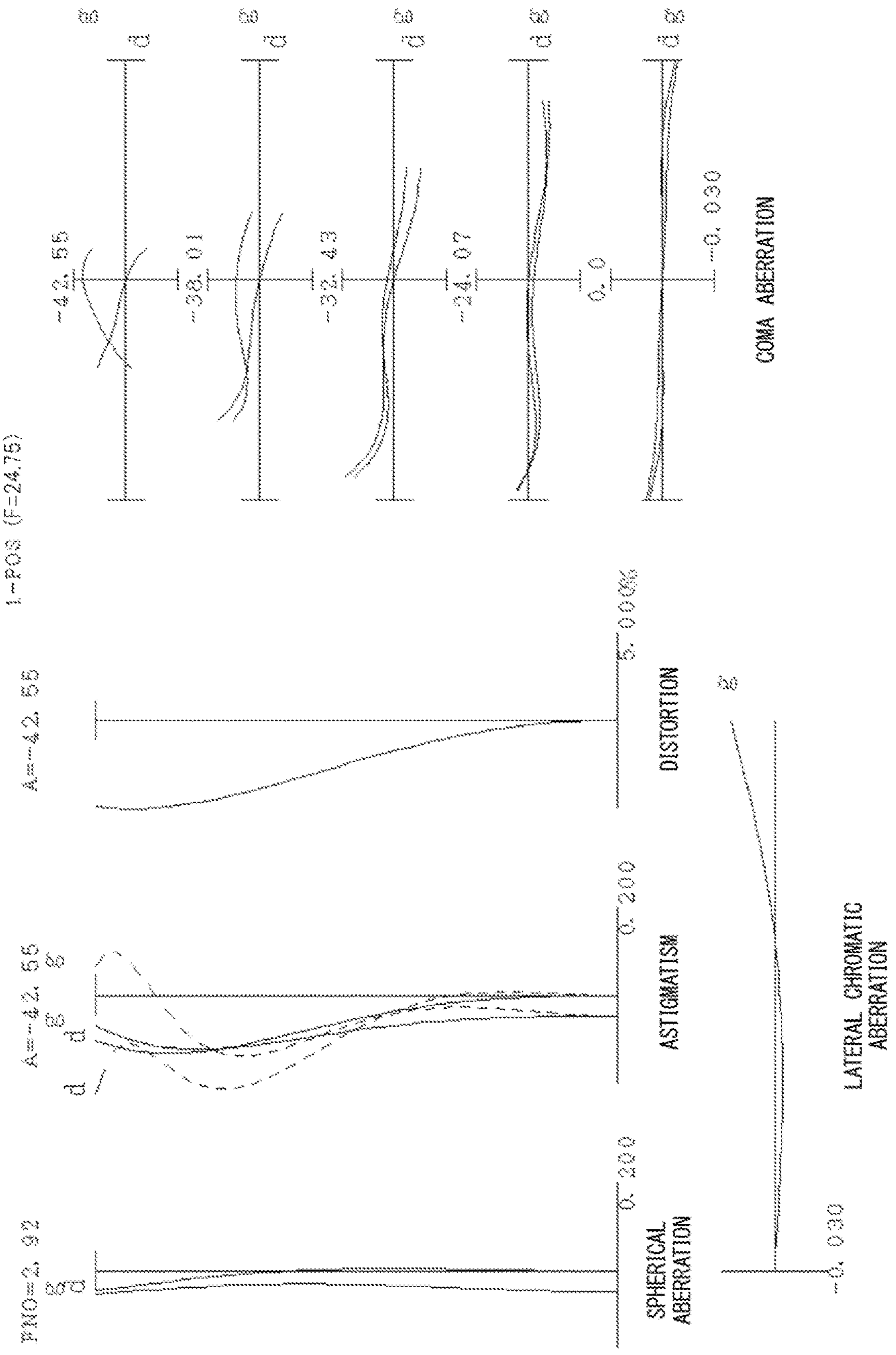
FIG. 2A shows aberrations of the variable magnification optical system of the first example focusing on an object at infinity in the wide-angle end state.
Figure 2B:
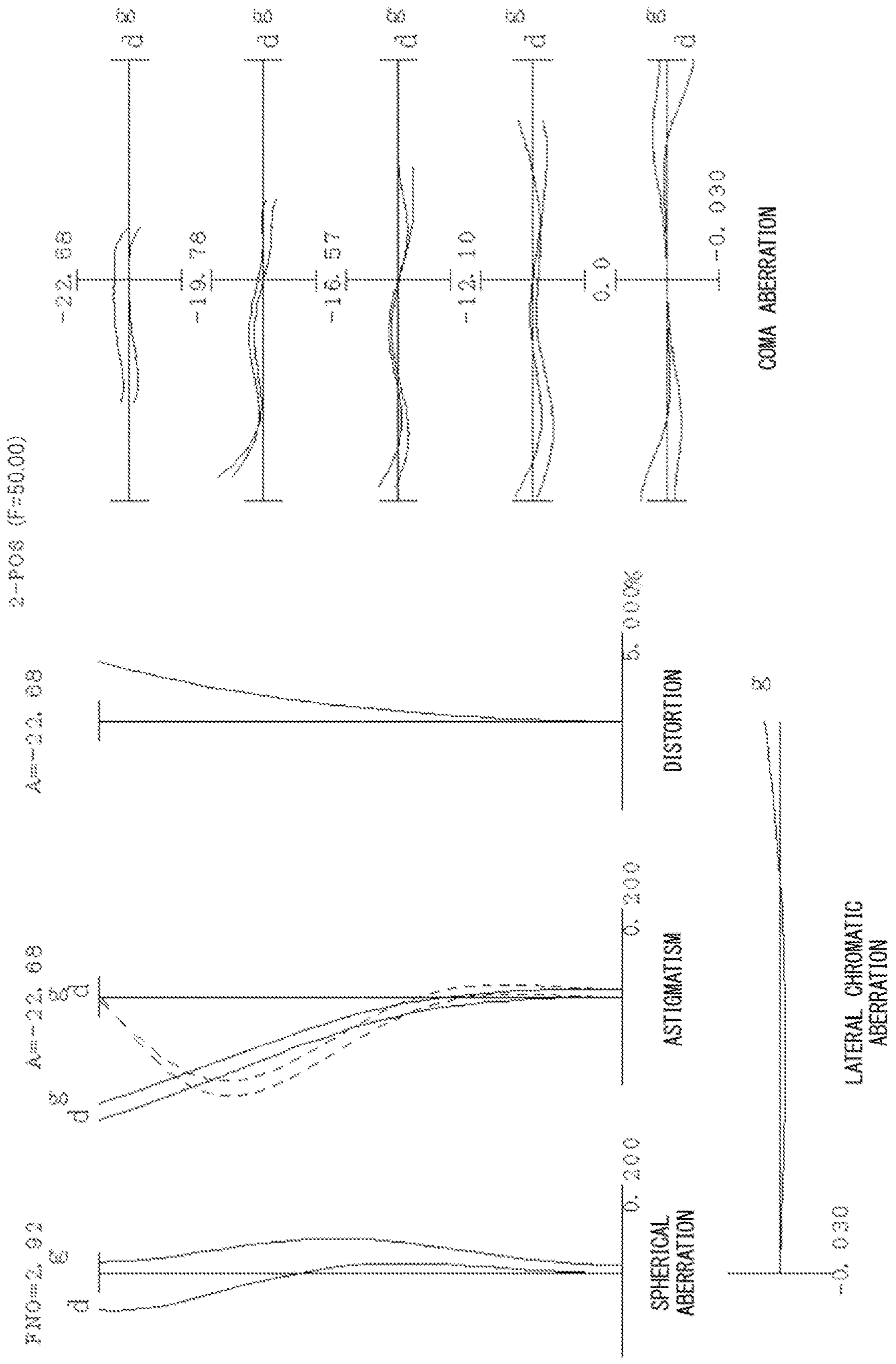
FIG. 2B shows aberrations of the variable magnification optical system of the first example focusing on an object at infinity in an intermediate focal length state.
Figure 2C:
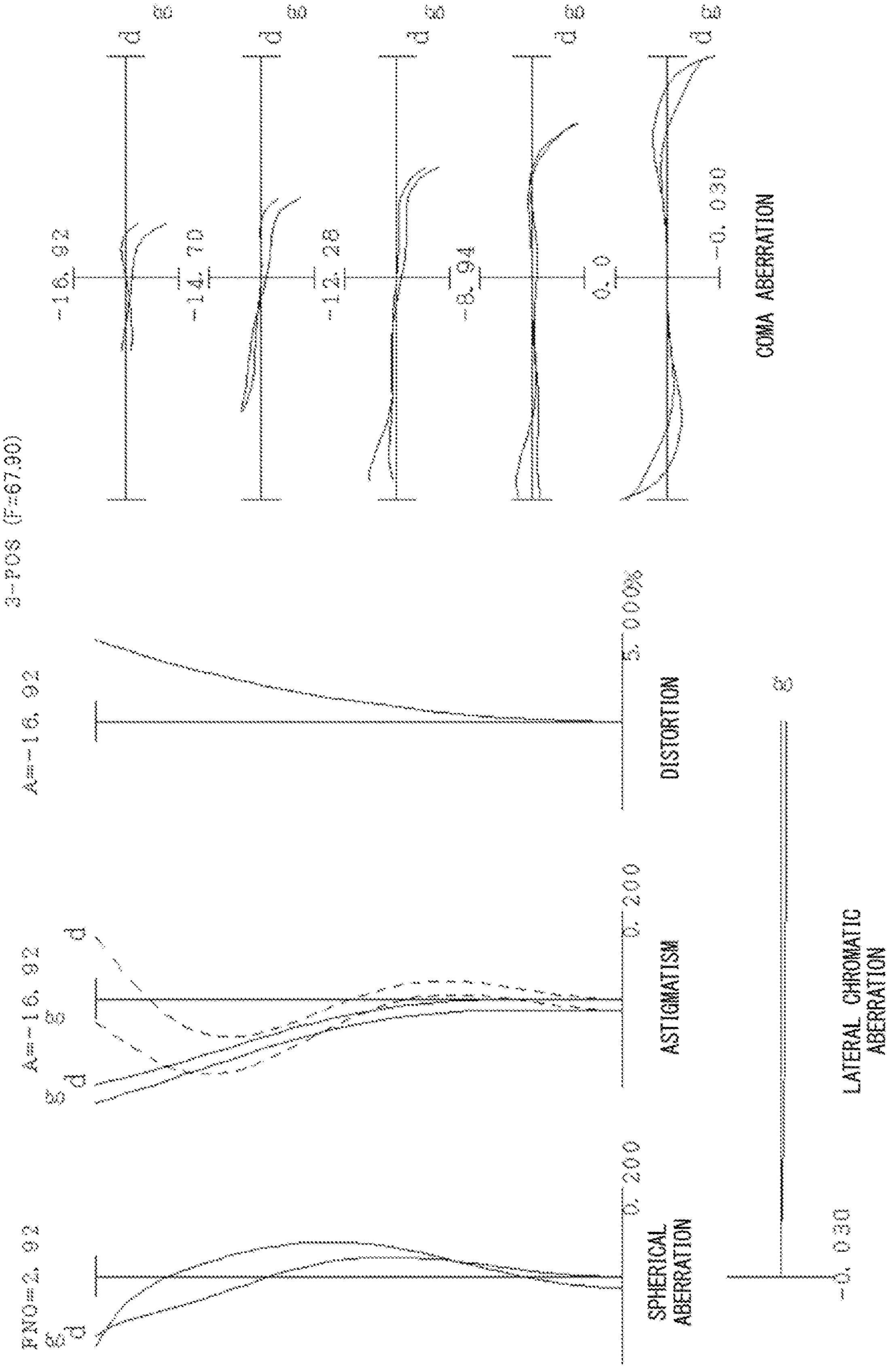
FIG. 2C shows aberrations of the variable magnification optical system of the first example focusing on an object at infinity in the telephoto end state.

FIG. 2A shows aberrations of the variable magnification optical system of the first example focusing on an object at infinity in the wide-angle end state. FIG. 2B shows aberrations of the variable magnification optical system of the first example focusing on an object at infinity in an intermediate focal length state. FIG. 2C shows aberrations of the variable magnification optical system of the first example focusing on an object at infinity in the telephoto end state.

In the graphs of aberrations, FNO and Y denote f-number and image height, respectively. More specifically, the graphs of spherical aberration show the f-number corresponding to the maximum aperture, the graphs of astigmatism and distortion show the maximum of image height, and the graphs of coma aberration show the values of image height. d and g denote d-line and g-line (wavelength 435.8 nm), respectively. In the graphs of astigmatism, the solid lines and the broken lines show a sagittal plane and a meridional plane, respectively. The reference symbols in the graphs of aberrations of the present example will also be used in those of the other examples described below.

The graphs of aberrations suggest that the variable magnification optical system of the present example effectively reduces variations in aberrations at focusing and at varying magnification and has high optical performance.

Second Example

Figure 3:
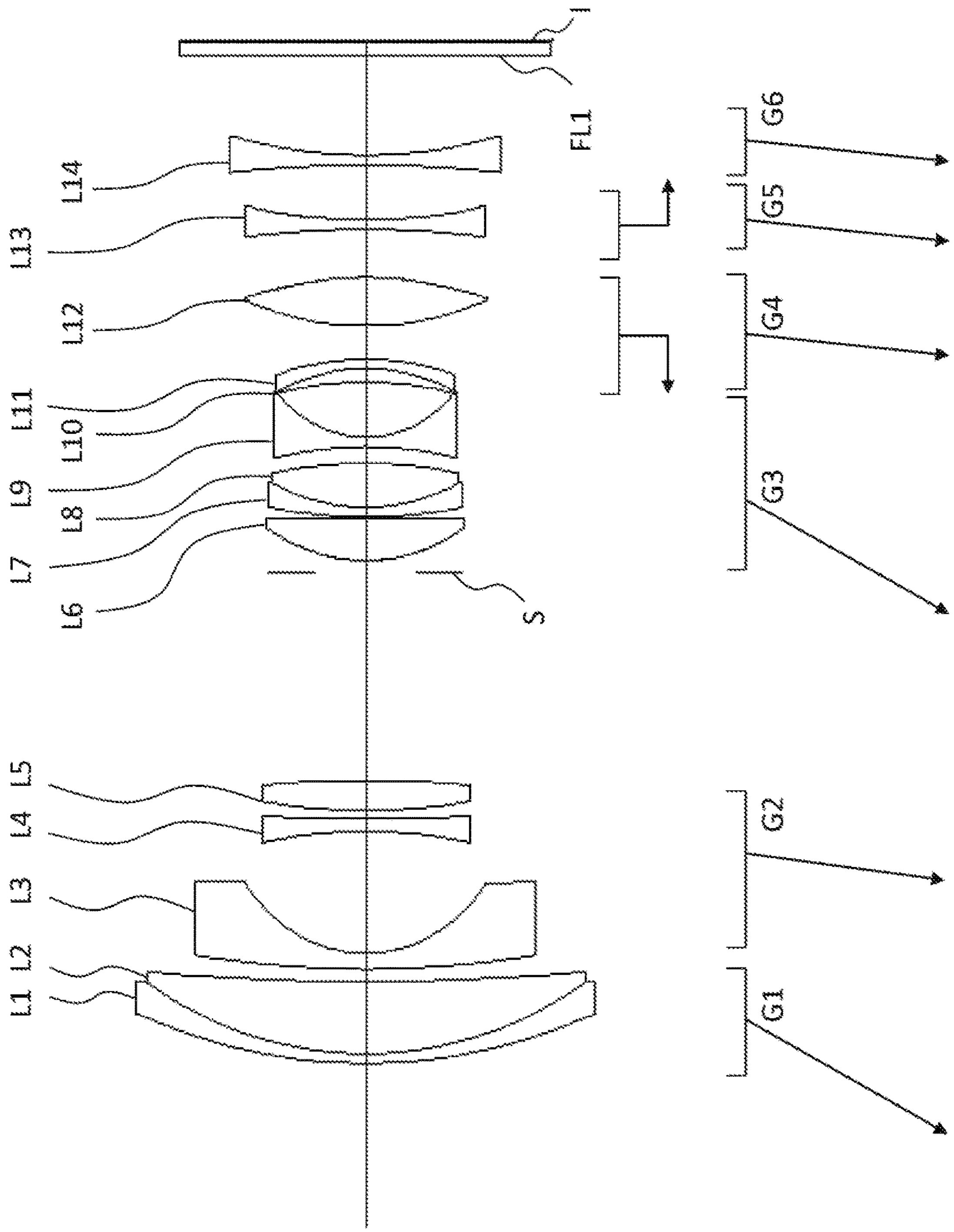
FIG. 3 is a cross-sectional view of a variable magnification optical system of a second example focusing on an object at infinity in the wide-angle end state.

FIG. 3 is a cross-sectional view of a variable magnification optical system of a second example focusing on an object at infinity in the wide-angle end state.

The variable magnification optical system of the present example includes, in order from the object side, a first lens group G1 having positive refractive power, a second lens group G2 having negative refractive power, an aperture stop S, a third lens group G3 having positive refractive power, a fourth lens group G4 having positive refractive power, a fifth lens group G5 having negative refractive power, and a sixth lens group G6 having negative refractive power.

The first lens group G1 consists of a positive cemented lens composed of, in order from the object side, a negative meniscus lens L1 convex on the object side and a positive meniscus lens L2 convex on the object side.

The second lens group G2 consists of, in order from the object side, a negative meniscus lens L3 convex on the object side, a biconcave negative lens L4, and a biconvex positive lens L5.

The third lens group G3 consists of, in order from the object side, a positive meniscus lens L6 convex on the object side, a positive cemented lens composed of a negative meniscus lens L7 convex on the object side and a biconvex positive lens L8, and a negative cemented lens composed of a biconcave negative lens L9 and a biconvex positive lens L10.

The fourth lens group G4 consists of, in order from the object side, a negative meniscus lens L11 concave on the object side and a biconvex positive lens L12.

The fifth lens group G5 consists of a biconcave negative lens L13.

The sixth lens group G6 consists of a biconcave negative lens L14.

An imaging device (not shown) constructed from CCD, CMOS, or the like is disposed on an image plane I.

A filter FL1 is disposed between the optical system of the present example and the image plane I.

The variable magnification optical system of the present example focuses by moving the fourth lens group G4 and the fifth lens group G5 along the optical axis. When focus is shifted from infinity to a nearby object, the fourth lens group G4 moves from the image side toward the object side whereas the fifth lens group G5 moves from the object side toward the image side.

In the variable magnification optical system of the present example, the second lens group G2, the third lens group G3, the fourth lens group G4, the fifth lens group G5, and the sixth lens group G6 correspond to the rear group, and the sixth lens group G6 to the final lens group. The second lens group G2 corresponds to the first negative lens group, the third lens group G3 to the first positive lens group, the fourth lens group G4 to the second positive lens group, and the fifth lens group G5 to the second negative lens group. The fourth lens group G4 corresponds to the first focusing group and the positive focusing group, and the fifth lens group G5 to the second focusing group and the negative focusing group.

Table 2 below shows specifications of the variable magnification optical system of the present example.

In Table 2, Bfw denotes an air-equivalent-length back focus of the variable magnification optical system in the wide-angle end state, and Bft an air-equivalent-length back focus of the variable magnification optical system in the telephoto end state.

TABLE 2

[General specifications]

| | |
|---|---|
| fw | 24.84 |
| ft | 67.00 |
| Fnow | 4.10 |
| Fnot | 4.10 |
| Bfw | 12.06 |
| Bft | 37.58 |

[Lens specifications]

| m | r | d | nd | νd | (23) | (24) | (25) |
|---|---|---|---|---|---|---|---|
| 1) | 67.159 | 1.200 | 1.846660 | 23.80 | | | |
| 2) | 45.296 | 8.873 | 1.755000 | 52.34 | | | |
| 3) | 304.642 | d3 | | | | | |
| 4) | 127.887 | 1.919 | 1.743890 | 49.53 | | | |
| *5) | 15.932 | 14.912 | | | | | |
| 6) | −57.698 | 1.500 | 1.755000 | 52.34 | | | |
| 7) | 199.334 | 1.013 | | | | | |
| 8) | 69.130 | 3.648 | 2.000690 | 25.46 | P1 | | |
| 9) | −155.105 | d9 | | | | | |
| 10> | ∞ | 1.500 | (aperture stop) | | | | |
| *11) | 19.502 | 5.108 | 1.553319 | 71.68 | | | P2 |
| 12) | 441.866 | 0.254 | | | | | |
| 13) | 58.720 | 1.200 | 1.834810 | 42.73 | | | |
| 14) | 23.155 | 5.413 | 1.618000 | 63.34 | | | P2 |
| 15) | −53.323 | 1.992 | | | | | |
| 16) | −47.176 | 1.200 | 1.816000 | 46.59 | | | |
| 17) | 13.539 | 6.663 | 1.593190 | 67.90 | | | P2 |
| 18) | −44.547 | d18 | | | | | |
| 19) | −22.465 | 1.200 | 1.801000 | 34.92 | P1 | | |
| 20) | −31.837 | 4.063 | | | | | |
| 21) | 37.168 | 5.930 | 1.592014 | 67.02 | | | |
| *22) | −36.742 | d22 | | | | | |
| 23) | −110.866 | 1.200 | 1.589130 | 61.25 | | N | |
| *24) | 82.217 | d24 | | | | | |
| 25) | −154.025 | 1.200 | 1.618000 | 63.34 | | N | |
| 26) | 58.288 | d26 | | | | | |
| 27) | ∞ | 1.600 | 1.516800 | 64.13 | | | |
| 28) | ∞ | 0.200 | | | | | |

[Aspherical surface data]

| m | K | A4 | A6 | A8 | A10 | A12 | A14 |
|---|---|---|---|---|---|---|---|
| 5) | −1.0000 | 2.25E−05 | 4.00E−08 | −2.54E−11 | 1.56E−12 | −7.84E−15 | 1.86E−17 |
| 11) | 0.0000 | −8.04E−06 | −1.10E−08 | −6.04E−11 | −2.10E−14 | | |
| 22) | 0.0000 | 1.64E−05 | −1.39E−08 | 3.12E−11 | −2.27E−13 | | |
| 24) | 0.0000 | 6.46E−06 | 6.55E−09 | −3.77E−11 | 3.26E−13 | | |

[Focal length data of groups]

| Groups | Starting surfaces | Focal lengths |
|---|---|---|
| G1 | 1 | 120.85 |
| G2 | 4 | −31.99 |
| G3 | 11 | 38.78 |
| G4 | 19 | 42.07 |
| G5 | 23 | −79.95 |
| G6 | 25 | −68.28 |

TABLE 2-continued

| [Variable distance data] | | |
|---|---|---|
| | Wide-angle end state | Telephoto end state |
| d3 | 1.520 | 26.769 |
| d9 | 25.467 | 6.262 |
| d18 | 1.666 | 8.929 |
| d22 | 5.905 | 0.358 |
| d24 | 6.655 | 3.050 |
| d26 | 12.200 | 37.722 |

Figure 4A:
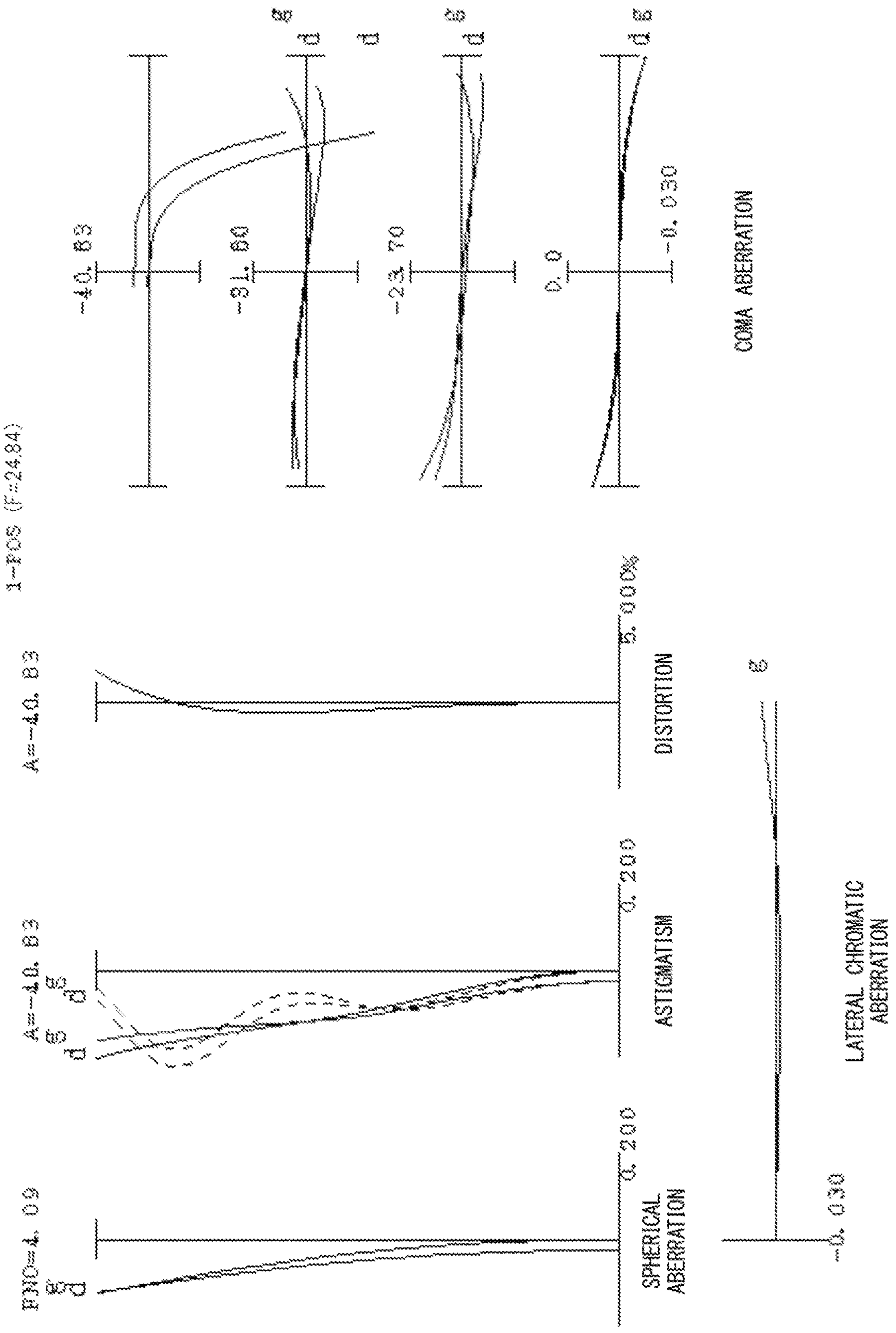
FIG. 4A shows aberrations of the variable magnification optical system of the second example focusing on an object at infinity in the wide-angle end state.
Figure 4B:
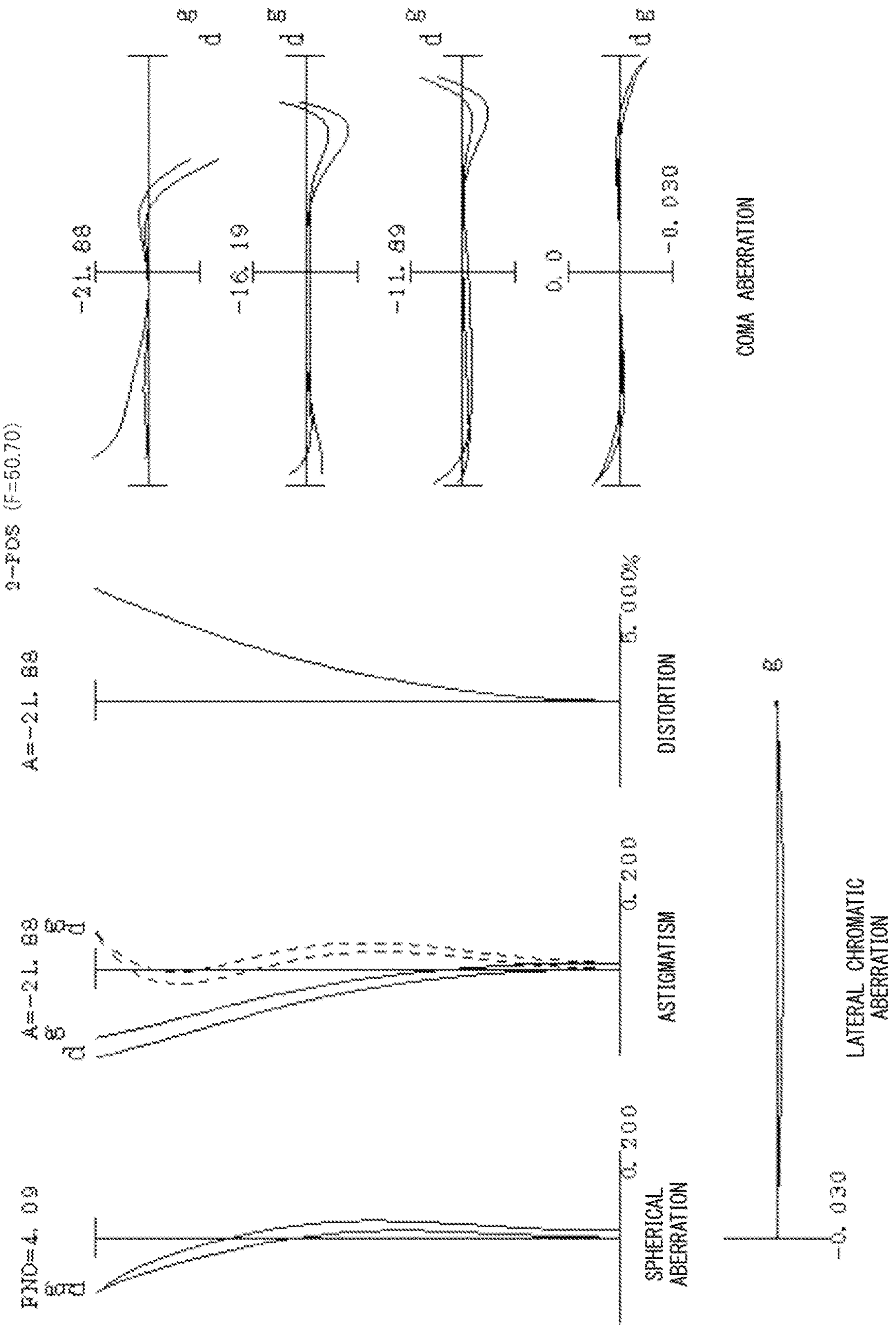
FIG. 4B shows aberrations of the variable magnification optical system of the second example focusing on an object at infinity in an intermediate focal length state.
Figure 4C:
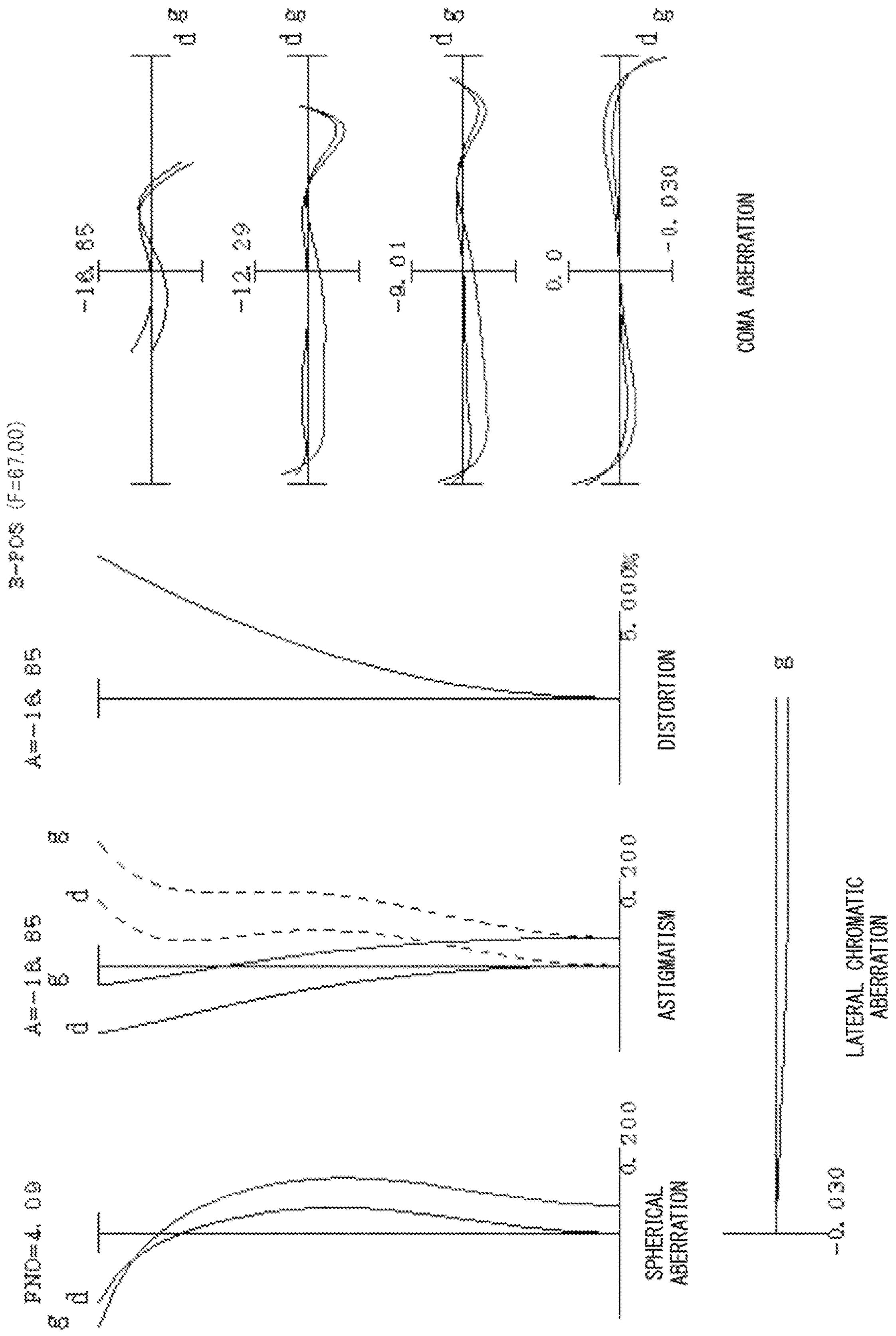
FIG. 4C shows aberrations of the variable magnification optical system of the second example focusing on an object at infinity in the telephoto end state.

FIG. 4A shows aberrations of the variable magnification optical system of the second example focusing on an object at infinity in the wide-angle end state. FIG. 4B shows aberrations of the variable magnification optical system of the second example focusing on an object at infinity in an intermediate focal length state. FIG. 4C shows aberrations of the variable magnification optical system of the second example focusing on an object at infinity in the telephoto end state.

The graphs of aberrations suggest that the variable magnification optical system of the present example effectively reduces variations in aberrations at focusing and at varying magnification and has high optical performance.

Third Example

Figure 5:
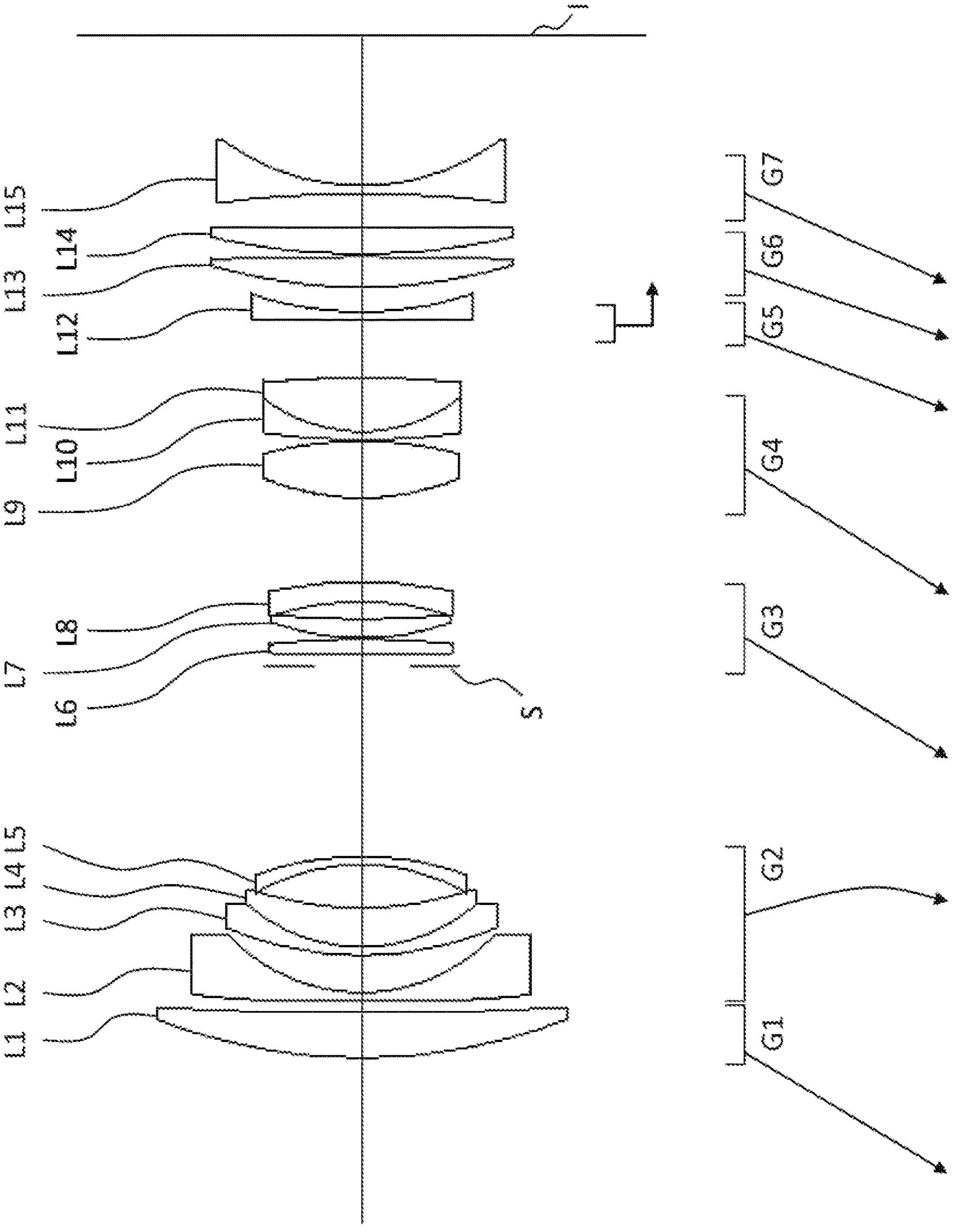
FIG. 5 is a cross-sectional view of a variable magnification optical system of a third example focusing on an object at infinity in the wide-angle end state.

FIG. 5 is a cross-sectional view of a variable magnification optical system of a third example focusing on an object at infinity in the wide-angle end state.

The variable magnification optical system of the present example includes, in order from the object side, a first lens group G1 having positive refractive power, a second lens group G2 having negative refractive power, an aperture stop S, a third lens group G3 having positive refractive power, a fourth lens group G4 having positive refractive power, a fifth lens group G5 having negative refractive power, a sixth lens group G6 having positive refractive power, and a seventh lens group G7 having negative refractive power.

The first lens group G1 consists of a positive meniscus lens L1 convex on the object side.

The second lens group G2 consists of, in order from the object side, a planoconcave negative lens L2 concave on the image side, a positive cemented lens composed of a negative meniscus lens L3 convex on the object side and a positive meniscus lens L4 convex on the object side, and a negative meniscus lens L5 concave on the object side.

The third lens group G3 consists of, in order from the object side, a biconvex positive lens L6, a positive meniscus lens L7 convex on the object side, and a negative meniscus lens L8 concave on the object side.

The fourth lens group G4 consists of, in order from the object side, a biconvex positive lens L9 and a positive cemented lens composed of a negative meniscus lens L10 convex on the object side and a biconvex positive lens L11.

The fifth lens group G5 consists of a negative meniscus lens L12 convex on the object side.

The sixth lens group G6 consists of, in order from the object side, a biconvex positive lens L13 and a biconvex positive lens L14.

The seventh lens group G7 consists of a biconcave negative lens L15.

An imaging device (not shown) constructed from CCD, CMOS, or the like is disposed on an image plane I.

The variable magnification optical system of the present example focuses by moving the fifth lens group G5 along the optical axis. When focus is shifted from infinity to a nearby object, the fifth lens group G5 moves from the object side toward the image side.

In the variable magnification optical system of the present example, the second lens group G2, the third lens group G3, the fourth lens group G4, the fifth lens group G5, the sixth lens group G6, and the seventh lens group G7 correspond to the rear group, and the seventh lens group G7 to the final lens group. The second lens group G2 corresponds to the first negative lens group, the third lens group G3 to the first positive lens group, the fourth lens group G4 to the second positive lens group, and the fifth lens group G5 to the second negative lens group. The fifth lens group G5 corresponds to the negative focusing group.

Table 3 below shows specifications of the variable magnification optical system of the present example.

TABLE 3

| [General specifications] | |
|---|---|
| fw | 24.70 |
| ft | 101.90 |
| Fnow | 4.00 |
| Fnot | 4.12 |

[Lens specifications]

| m | r | d | nd | vd | (23) | (24) | (25) |
|---|---|---|---|---|---|---|---|
| 1) | 69.070 | 5.474 | 1.752087 | 52.47 | | | |
| 2) | 439.840 | d2 | | | | | |
| *3) | ∞ | 1.500 | 1.885373 | 40.28 | | | |
| 4) | 22.109 | 4.545 | | | | | |
| 5) | 42.147 | 1.000 | 1.489549 | 80.93 | | N | |
| 6) | 21.170 | 4.738 | 1.861167 | 25.66 | P1 | | |
| 7) | 41.657 | 5.230 | | | | | |

TABLE 3-continued

| | | | | | | | |
|---|---|---|---|---|---|---|---|
| 8) | −25.535 | 1.011 | 1.803585 | 46.74 | | | |
| 9) | −37.107 | d9 | | | | | |
| 10> | ∞ | 1.400 | (aperture stop) | | | | |
| 11) | 295.856 | 1.867 | 1.835571 | 24.07 | P1 | | |
| 12) | −113.960 | 0.200 | | | | | |
| 13) | 32.140 | 2.337 | 1.602919 | 62.63 | | | P2 |
| 14) | 125.086 | 2.085 | | | | | |
| 15) | −33.735 | 2.334 | 1.919001 | 29.19 | | | |
| 16) | −58.214 | d16 | | | | | |
| *17) | 30.409 | 6.839 | 1.508562 | 76.49 | | | P2 |
| 18) | −49.408 | 0.200 | | | | | |
| 19) | 84.317 | 1.002 | 1.890613 | 32.29 | | | |
| 20) | 19.543 | 6.528 | 1.588613 | 64.15 | | | P2 |
| *21) | −88.251 | d21 | | | | | |
| 22) | 1009.066 | 1.000 | 1.930813 | 30.21 | | | |
| 23) | 43.640 | d23 | | | | | |
| 24) | 65.370 | 3.678 | 1.855614 | 24.40 | P1 | | |
| 25) | −632.954 | 0.380 | | | | | |
| 26) | 80.628 | 3.324 | 1.883000 | 40.66 | | | |
| 27) | −2737.698 | d27 | | | | | |
| 28) | −140.459 | 1.000 | 1.456000 | 91.38 | | N | |
| 29) | 28.388 | Bf | | | | | |

[Aspherical surface data]

| m | K | A4 | A6 | A8 | A10 |
|---|---|---|---|---|---|
| 3) | 0.0000 | 4.90E−06 | −1.37E−09 | −5.21E−13 | 5.68E−15 |
| 17) | 0.0000 | −3.60E−06 | 1.38E−08 | −4.49E−11 | 5.49E−14 |
| 21) | 0.0000 | 1.56E−05 | 2.61E−08 | 9.57E−12 | 2.95E−13 |

[Focal length data of groups]

| Groups | Starting surfaces | Focal lengths |
|---|---|---|
| G1 | 1 | 108.26 |
| G2 | 3 | −23.31 |
| G3 | 11 | 72.07 |
| G4 | 17 | 36.45 |
| G5 | 22 | −49.03 |
| G6 | 24 | 39.51 |
| G7 | 28 | −51.69 |

[Variable distance data]

| | Wide-angle end state | Telephoto end state |
|---|---|---|
| d2 | 1.500 | 38.142 |
| d9 | 23.111 | 1.850 |
| d16 | 10.315 | 1.500 |
| d21 | 7.006 | 2.000 |
| d23 | 2.971 | 33.465 |
| d27 | 4.024 | 4.217 |
| Bf | 18.056 | 39.081 |

Figure 6A:
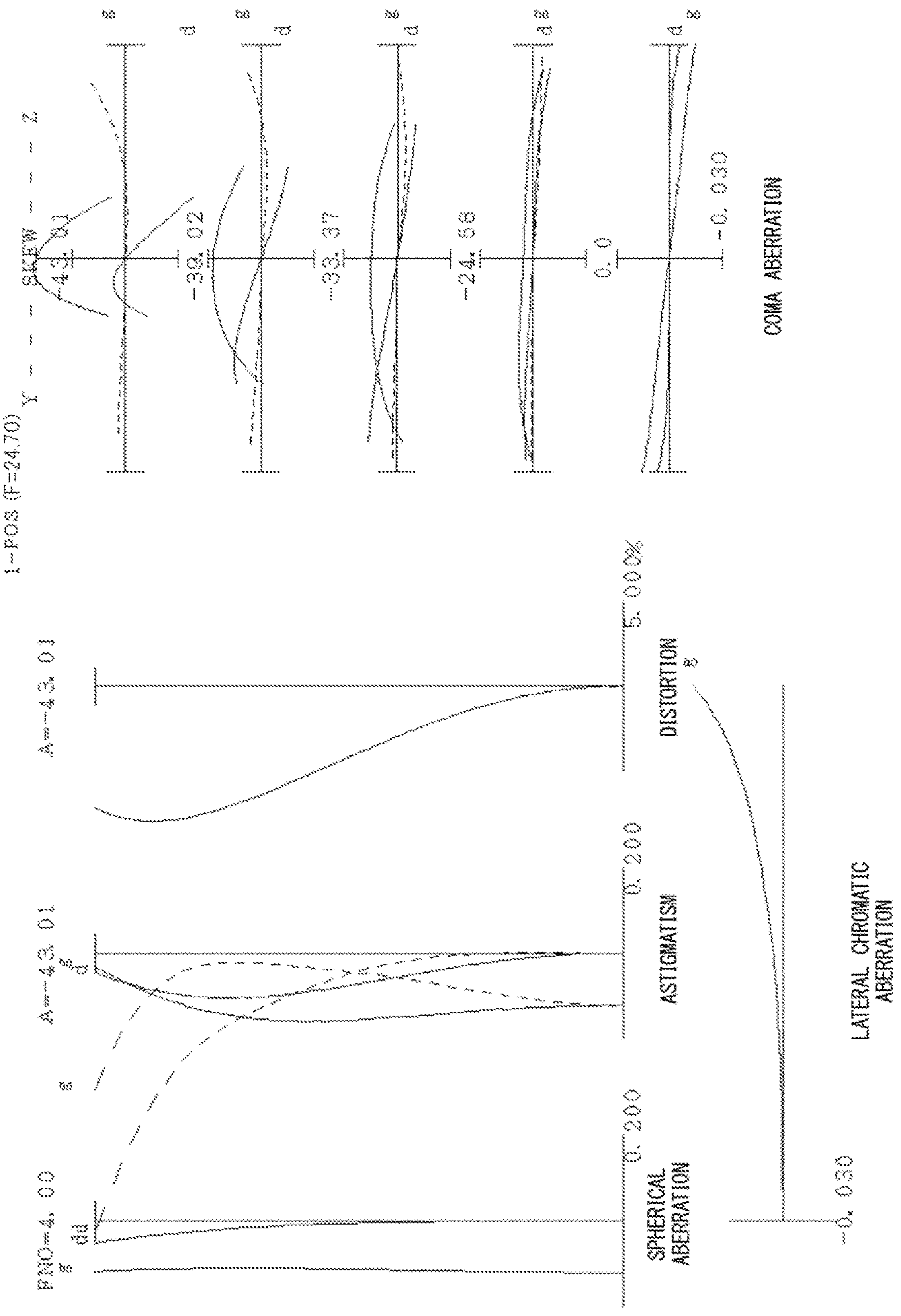
FIG. 6A shows aberrations of the variable magnification optical system of the third example focusing on an object at infinity in the wide-angle end state.
Figure 6B:
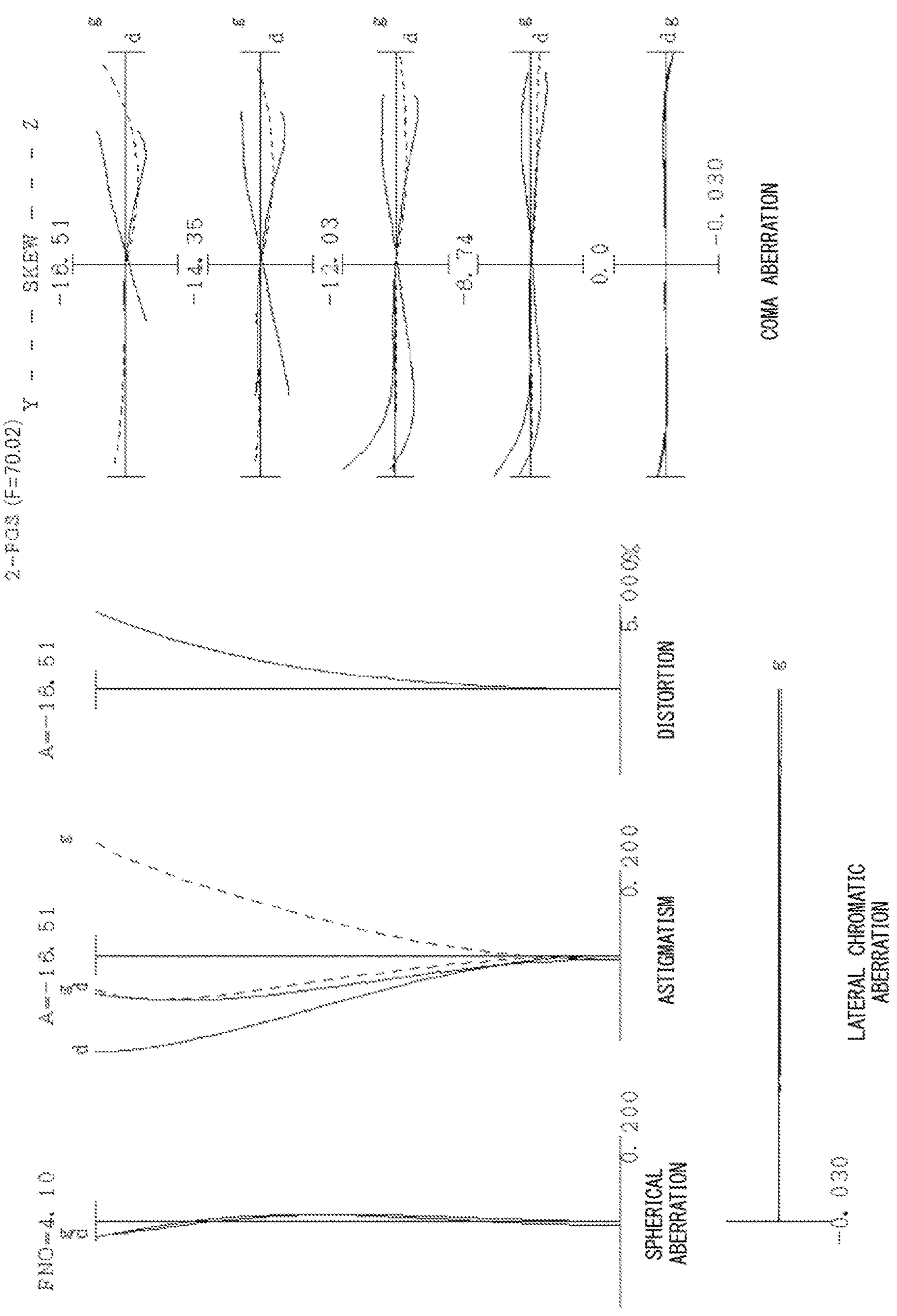
FIG. 6B shows aberrations of the variable magnification optical system of the third example focusing on an object at infinity in an intermediate focal length state.
Figure 6C:
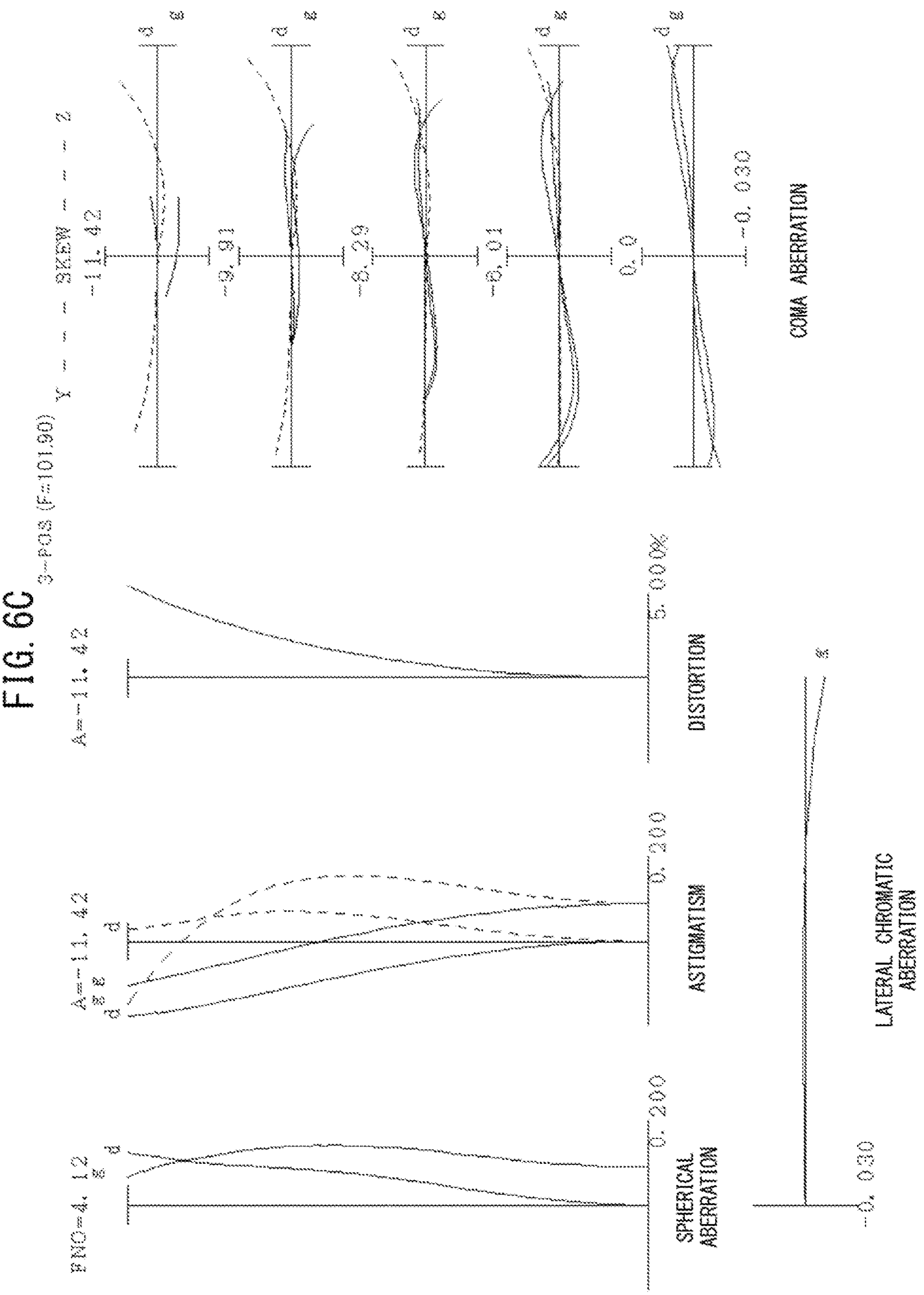
FIG. 6C shows aberrations of the variable magnification optical system of the third example focusing on an object at infinity in the telephoto end state.

FIG. 6A shows aberrations of the variable magnification optical system of the third example focusing on an object at infinity in the wide-angle end state. FIG. 6B shows aberrations of the variable magnification optical system of the third example focusing on an object at infinity in an intermediate focal length state. FIG. 6C shows aberrations of the variable magnification optical system of the third example focusing on an object at infinity in the telephoto end state.

The graphs of aberrations suggest that the variable magnification optical system of the present example effectively reduces variations in aberrations at focusing and at varying magnification and has high optical performance.

Fourth Example

Figure 7:
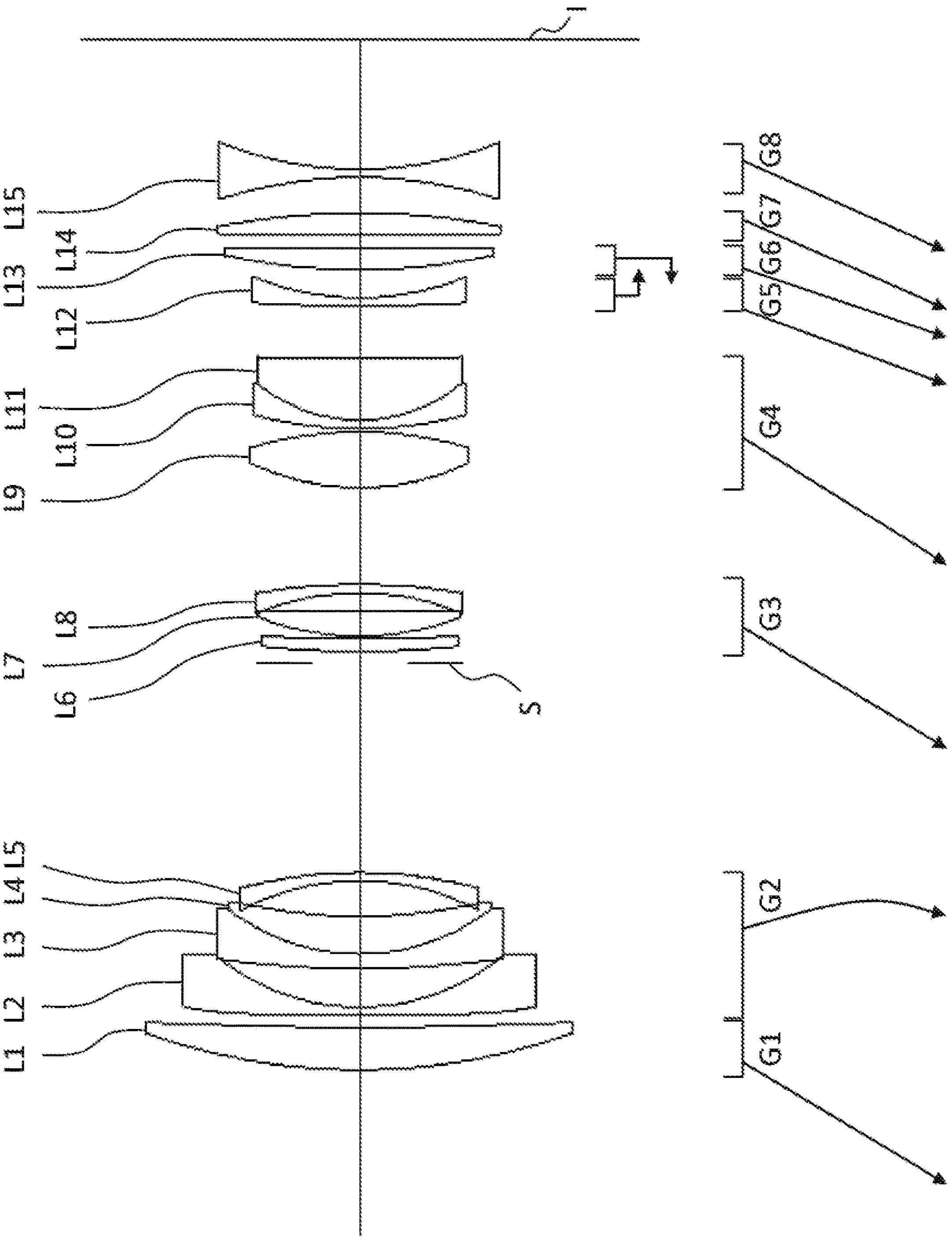
FIG. 7 is a cross-sectional view of a variable magnification optical system of a fourth example focusing on an object at infinity in the wide-angle end state.

FIG. 7 is a cross-sectional view of a variable magnification optical system of a fourth example focusing on an object at infinity in the wide-angle end state.

The variable magnification optical system of the present example includes, in order from the object side, a first lens group G1 having positive refractive power, a second lens group G2 having negative refractive power, an aperture stop S, a third lens group G3 having positive refractive power, a fourth lens group G4 having positive refractive power, a fifth lens group G5 having negative refractive power, a sixth lens group G6 having positive refractive power, a seventh lens group G7 having positive refractive power, and an eighth lens group G8 having negative refractive power.

The first lens group G1 consists of a positive meniscus lens convex on the object side.

The second lens group G2 consists of, in order from the object side, a planoconcave negative lens L2 concave on the image side, a positive cemented lens composed of a negative meniscus lens L3 convex on the object side and a positive meniscus lens L4 convex on the object side, and a negative meniscus lens L5 concave on the object side.

The third lens group G3 consists of, in order from the object side, a positive meniscus lens L6 convex on the object side, a biconvex positive lens L7, and a negative meniscus lens L8 concave on the object side.

The fourth lens group G4 consists of, in order from the object side, a biconvex positive lens L9 and a positive cemented lens composed of a negative meniscus lens L10 convex on the object side and a biconvex positive lens L11.

The fifth lens group G5 consists of a negative meniscus lens L12 convex on the object side.

The sixth lens group G6 consists of a biconvex positive lens L13.

The seventh lens group G7 consists of a biconvex positive lens L14.

The eighth lens group G8 consists of a biconcave negative lens L15.

An imaging device (not shown) constructed from CCD, CMOS, or the like is disposed on an image plane I.

The variable magnification optical system of the present example focuses by moving the fifth lens group G5 and the sixth lens group G6 along the optical axis. When focus is shifted from infinity to a nearby object, the fifth lens group G5 moves from the object side toward the image side whereas the sixth lens group G6 moves from the image side toward the object side.

In the variable magnification optical system of the present example, the second lens group G2, the third lens group G3, the fourth lens group G4, the fifth lens group G5, the sixth lens group G6, the seventh lens group G7, and the eighth lens group G8 correspond to the rear group, and the eighth lens group G8 to the final lens group. The second lens group G2 corresponds to the first negative lens group, the third lens group G3 to the first positive lens group, the fourth lens group G4 to the second positive lens group, and the fifth lens group G5 to the second negative lens group. The fifth lens group G5 corresponds to the first focusing group and the negative focusing group, and the sixth lens group G6 to the second focusing group and the positive focusing group.

Table 4 below shows specifications of the variable magnification optical system of the present example.

TABLE 4

[General specifications]

| | |
|---|---|
| fw | 24.70 |
| ft | 116.50 |
| Fnow | 4.00 |
| Fnot | 4.12 |

[Lens specifications]

| m | r | d | nd | vd | (23) | (24) | (25) |
|---|---|---|---|---|---|---|---|
| 1) | 77.446 | 5.210 | 1.727296 | 53.67 | | | |
| 2) | 584.308 | d2 | | | | | |
| *3) | ∞ | 1.000 | 1.862652 | 41.96 | | | |
| 4) | 27.504 | 4.699 | | | | | |
| 5) | 130.462 | 1.752 | 1.484196 | 82.34 | | N | |
| 6) | 26.180 | 4.599 | 1.857087 | 24.50 | P1 | | |
| 7) | 67.904 | 4.302 | | | | | |
| 8) | −30.859 | 1.000 | 1.820730 | 45.17 | | | |
| *9) | −53.767 | d9 | | | | | |
| 10> | ∞ | 1.400 | (aperture | stop) | | | |
| 11) | 107.826 | 1.676 | 1.848261 | 23.90 | P1 | | |
| 12) | 621.616 | 0.200 | | | | | |
| 13) | 33.878 | 3.203 | 1.620766 | 60.92 | | | P2 |
| 14) | −929.742 | 2.057 | | | | | |
| 15) | −32.817 | 1.000 | 1.943635 | 31.37 | | | |
| 16) | −77.769 | d16 | | | | | |
| *17) | 29.728 | 6.798 | 1.520726 | 74.04 | | | P2 |
| 18) | −46.669 | 0.371 | | | | | |
| 19) | 50.503 | 1.040 | 1.892112 | 32.72 | | | |
| 20) | 19.569 | 7.642 | 1.588166 | 64.20 | | | P2 |
| *21) | −135.546 | d21 | | | | | |
| 22) | 207.734 | 1.000 | 1.953434 | 32.29 | | | |
| 23) | 34.501 | d23 | | | | | |
| 24) | 72.467 | 2.748 | 1.846660 | 23.80 | P1 | | |
| 25) | −4031.890 | d25 | | | | | |
| 26) | 760.138 | 2.738 | 1.855244 | 24.37 | | | |
| 27) | −90.866 | d27 | | | | | |
| 28) | −56.111 | 1.000 | 1.511730 | 70.00 | | N | |
| 29) | 46.882 | Bf | | | | | |

[Aspherical surface data]

| m | K | A4 | A6 | A8 | A10 |
|---|---|---|---|---|---|
| 3) | 0.0000 | 4.80E−06 | −1.03E−09 | 1.15E−12 | 5.58E−15 |
| 9) | 0.0000 | 2.15E−06 | −3.33E−09 | 3.17E−11 | −6.65E−14 |
| 17) | 0.0000 | −4.97E−06 | 1.08E−08 | −4.23E−11 | 4.57E−14 |
| 21) | 0.0000 | 2.09E−05 | 3.18E−08 | −4.07E−11 | 5.57E−13 |

[Focal length data of groups]

| Groups | Starting surfaces | Focal lengths |
|---|---|---|
| G1 | 1 | 122.23 |
| G2 | 3 | −25.06 |
| G3 | 11 | 95.16 |

TABLE 4-continued

| | | |
|---|---|---|
| G4 | 17 | 29.99 |
| G5 | 22 | −43.51 |
| G6 | 24 | 84.11 |
| G7 | 26 | 95.04 |
| G8 | 28 | −49.75 |

[Variable distance data]

| | Wide-angle end state | Telephoto end state |
|---|---|---|
| d2 | 1.500 | 42.085 |
| d9 | 25.504 | 1.850 |
| d16 | 11.841 | 1.500 |
| d21 | 6.232 | 2.092 |
| d23 | 3.379 | 34.095 |
| d25 | 1.500 | 1.500 |
| d27 | 4.340 | 7.175 |
| Bf | 15.724 | 34.724 |

Figure 8A:
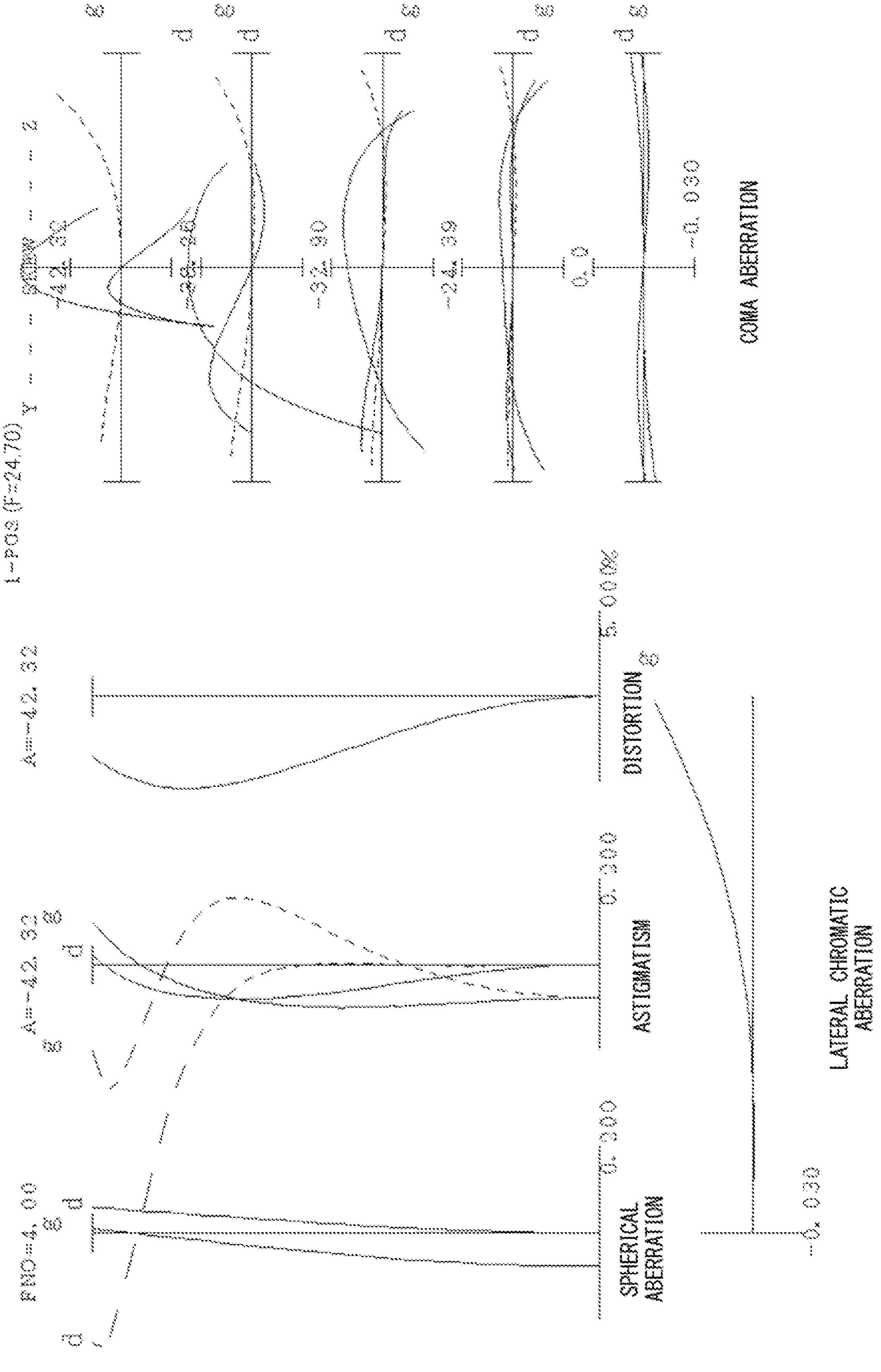
FIG. 8A shows aberrations of the variable magnification optical system of the fourth example focusing on an object at infinity in the wide-angle end state.
Figure 8B:
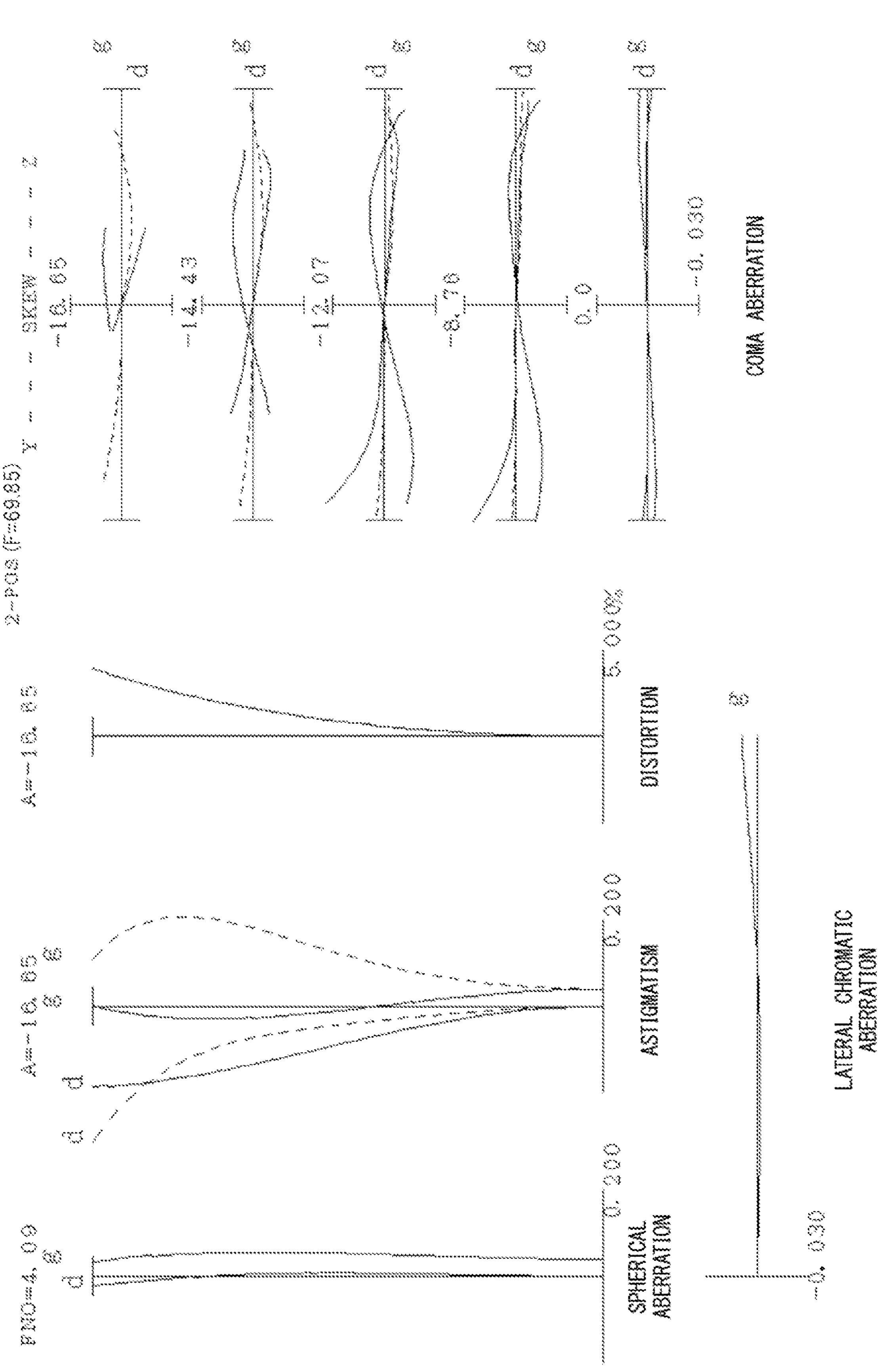
FIG. 8B shows aberrations of the variable magnification optical system of the fourth example focusing on an object at infinity in an intermediate focal length state.
Figure 8C:
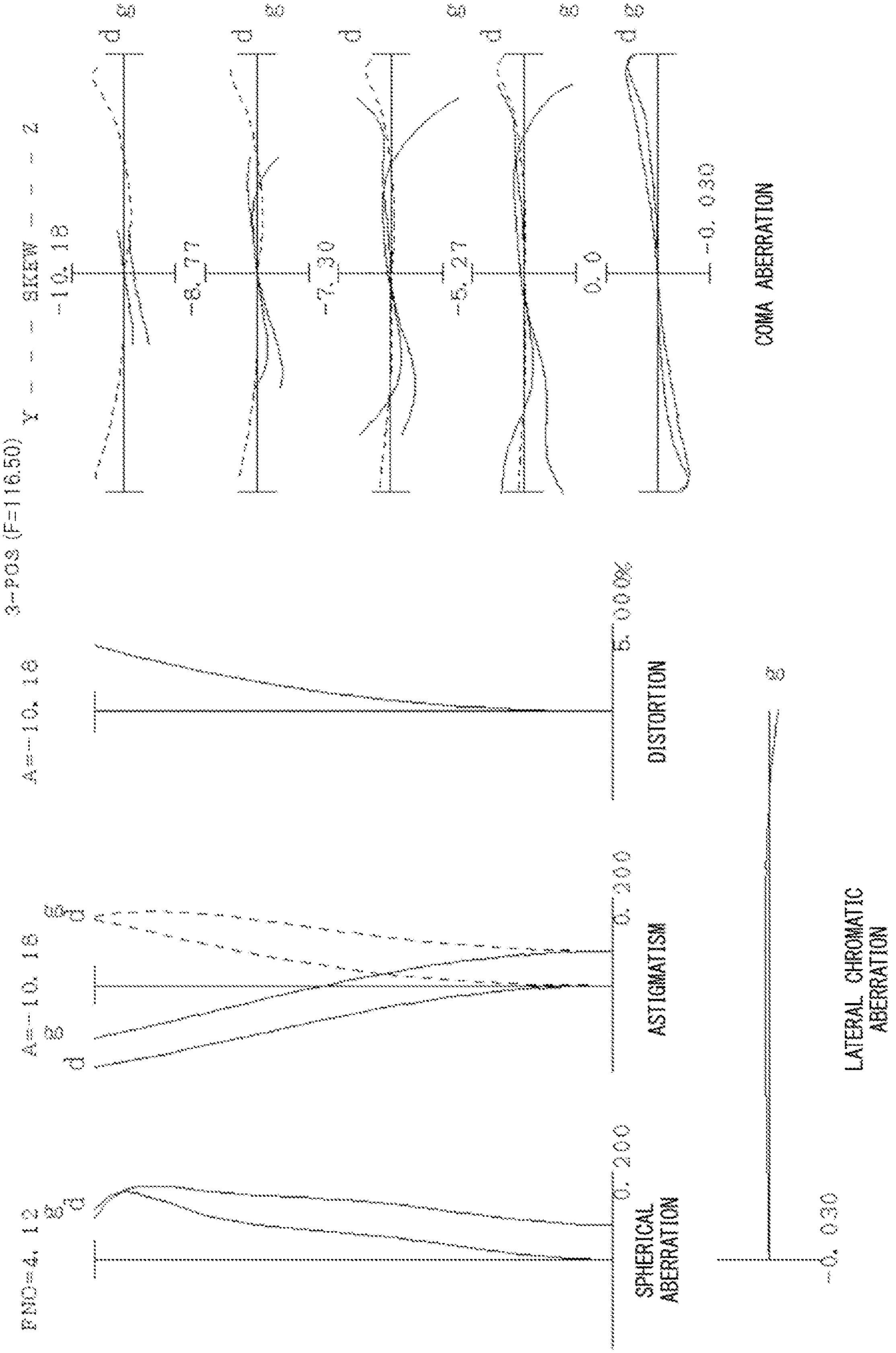
FIG. 8C shows aberrations of the variable magnification optical system of the fourth example focusing on an object at infinity in the telephoto end state.

FIG. 8A shows aberrations of the variable magnification optical system of the fourth example focusing on an object at infinity in the wide-angle end state. FIG. 8B shows aberrations of the variable magnification optical system of the fourth example focusing on an object at infinity in an intermediate focal length state. FIG. 8C shows aberrations of the variable magnification optical system of the fourth example focusing on an object at infinity in the telephoto end state.

The graphs of aberrations suggest that the variable magnification optical system of the present example effectively reduces variations in aberrations at focusing and at varying magnification and has high optical performance.

Fifth Example

Figure 9:
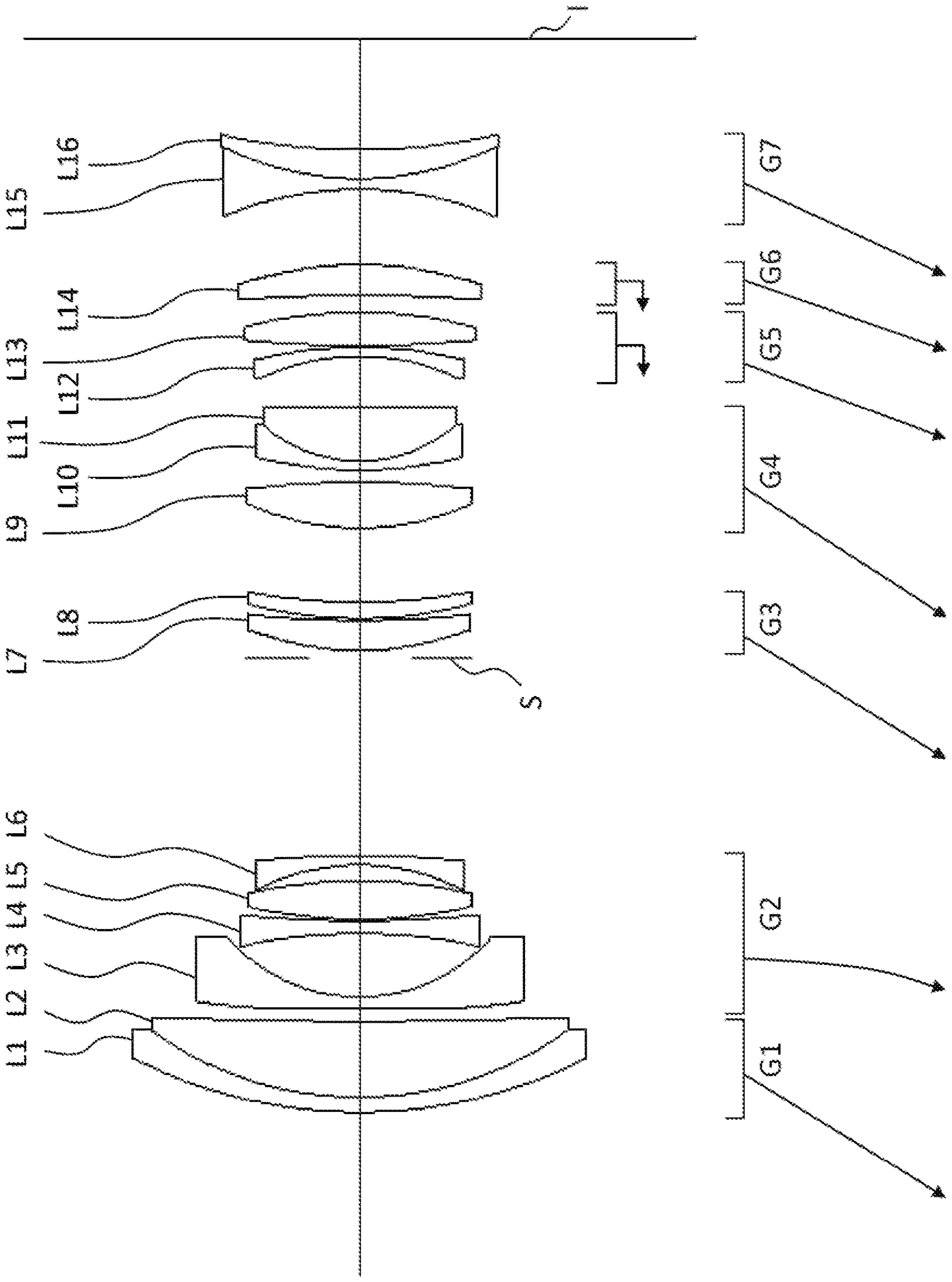
FIG. 9 is a cross-sectional view of a variable magnification optical system of a fifth example focusing on an object at infinity in the wide-angle end state.

FIG. 9 is a cross-sectional view of a variable magnification optical system of a fifth example focusing on an object at infinity in the wide-angle end state.

The variable magnification optical system of the present example includes, in order from the object side, a first lens group G1 having positive refractive power, a second lens group G2 having negative refractive power, an aperture stop S, a third lens group G3 having positive refractive power, a fourth lens group G4 having positive refractive power, a fifth lens group G5 having positive refractive power, a sixth lens group G6 having positive refractive power, and a seventh lens group G7 having negative refractive power.

The first lens group G1 consists of a positive cemented lens composed of, in order from the object side, a negative meniscus lens L1 convex on the object side and a positive meniscus lens L2 convex on the object side.

The second lens group G2 consists of, in order from the object side, a negative meniscus lens L3 convex on the object side, a biconcave negative lens L4, a biconvex positive lens L5, and a negative meniscus lens L6 concave on the object side.

The third lens group G3 consists of, in order from the object side, a positive meniscus lens L7 convex on the object side and a positive meniscus lens L8 convex on the object side.

The fourth lens group G4 consists of, in order from the object side, a biconvex positive lens L9 and a negative cemented lens composed of a negative meniscus lens L10 convex on the object side and a positive meniscus lens L11 convex on the object side.

The fifth lens group G5 consists of, in order from the object side, a negative meniscus lens L12 concave on the object side and a biconvex positive lens L13.

The sixth lens group G6 consists of a positive meniscus lens L14 concave on the object side.

The seventh lens group G7 consists of a negative cemented lens composed of, in order from the object side, a biconcave negative lens L15 and a positive meniscus lens L16 convex on the object side.

An imaging device (not shown) constructed from CCD, CMOS, or the like is disposed on an image plane I.

The variable magnification optical system of the present example focuses by moving the fifth lens group G5 and the sixth lens group G6 along the optical axis. When focus is shifted from infinity to a nearby object, the fifth lens group G5 and the sixth lens group G6 move from the image side toward the object side.

In the variable magnification optical system of the present example, the second lens group G2, the third lens group G3, the fourth lens group G4, the fifth lens group G5, the sixth lens group G6, and the seventh lens group G7 correspond to the rear group, and the seventh lens group G7 to the final lens group. The second lens group G2 corresponds to the first negative lens group, the third lens group G3 to the first positive lens group, the fourth lens group G4 to the second positive lens group, and the seventh lens group G7 to the second negative lens group. The fifth lens group G5 corresponds to the first focusing group, the sixth lens group G6 to the second focusing group, and the fifth lens group G5 and the sixth lens group G6 to the positive focusing group.

Table 5 below shows specifications of the variable magnification optical system of the present example.

TABLE 5

| [General specifications] | |
|---|---|
| fw | 24.70 |
| ft | 116.50 |
| Fnow | 4.00 |
| Fnot | 4.12 |

[Lens specifications]

| m | r | d | nd | vd | (23) | (24) | (25) |
|---|---|---|---|---|---|---|---|
| 1) | 61.204 | 1.800 | 1.903660 | 31.27 | | | |
| 2) | 43.500 | 9.290 | 1.618000 | 63.34 | | | |
| 3) | 599.325 | d3 | | | | | |
| *4) | 8892.243 | 1.400 | 1.775030 | 47.31 | | | |
| 5) | 21.486 | 7.770 | | | | | |
| 6) | −67.187 | 1.500 | 1.834000 | 37.18 | | | |
| 7) | 139.906 | 0.230 | | | | | |
| 8) | 60.170 | 4.730 | 1.854510 | 25.15 | P1 | | |
| 9) | −60.170 | 1.960 | | | | | |
| 10) | −27.165 | 1.100 | 1.497820 | 82.57 | | N | |
| 11) | −128.171 | d11 | | | | | |
| 12> | ∞ | 0.880 | (aperture stop) | | | | |
| *13) | 34.508 | 3.660 | 1.593060 | 66.97 | | | P2 |
| 14) | 131.359 | 0.200 | | | | | |
| 15) | 51.576 | 2.030 | 1.618000 | 63.34 | | | P2 |
| 16) | 76.388 | d16 | | | | | |
| 17) | 33.398 | 5.600 | 1.497820 | 82.57 | | | P2 |
| 18) | −112.939 | 1.450 | | | | | |
| 19) | 51.317 | 1.100 | 1.900430 | 37.38 | | | |
| 20) | 17.933 | 6.550 | 1.497820 | 82.57 | | | P2 |
| 21) | 1939.354 | d21 | | | | | |
| 22) | −28.100 | 1.100 | 1.784720 | 25.64 | | | |
| 23) | −52.294 | 0.200 | | | | | |
| 24) | 156.708 | 4.090 | 1.772500 | 49.62 | | | |
| 25) | −53.421 | d25 | | | | | |
| 26) | −214.076 | 3.800 | 1.553320 | 71.67 | | | P2 |
| *27) | −36.775 | d27 | | | | | |
| *28) | −43.094 | 1.300 | 1.775030 | 47.31 | | | |
| 29) | 37.433 | 3.600 | 1.922860 | 20.88 | P1 | | |
| 30) | 81.956 | Bf | | | | | |

[Aspherical surface data]

| m | K | A4 | A6 | A8 | A10 | A12 | A14 |
|---|---|---|---|---|---|---|---|
| 4) | 0.0000 | 6.78E−06 | −9.11E−09 | 2.14E−11 | −6.61E−15 | −7.48E−17 | 1.46E−19 |
| 13) | 0.0000 | −7.33E−06 | 1.12E−09 | −3.78E−12 | −5.24E−15 | | |
| 27) | 0.0000 | 1.69E−05 | −8.63E−09 | 5.71E−12 | −9.88E−15 | | |
| 28) | 0.0000 | 2.41E−06 | 1.50E−09 | −1.37E−10 | 6.99E−13 | −1.28E−15 | −1.88E−19 |

[Focal length data of groups]

| Groups | Starting surfaces | Focal lengths |
|---|---|---|
| G1 | 1 | 136.58 |
| G2 | 4 | −24.06 |
| G4 | 17 | 67.49 |
| G5 | 22 | 135.76 |
| G6 | 26 | 79.64 |
| G7 | 28 | −38.93 |

[Variable distance data]

| | Wide-angle end state | Telephoto end state |
|---|---|---|
| d3 | 1.525 | 46.708 |
| d11 | 24.145 | 2.370 |
| d16 | 9.007 | 1.400 |
| d21 | 6.277 | 18.040 |
| d25 | 2.000 | 5.177 |
| d27 | 9.107 | 1.773 |
| Bf | 13.555 | 45.147 |

Figure 10A:
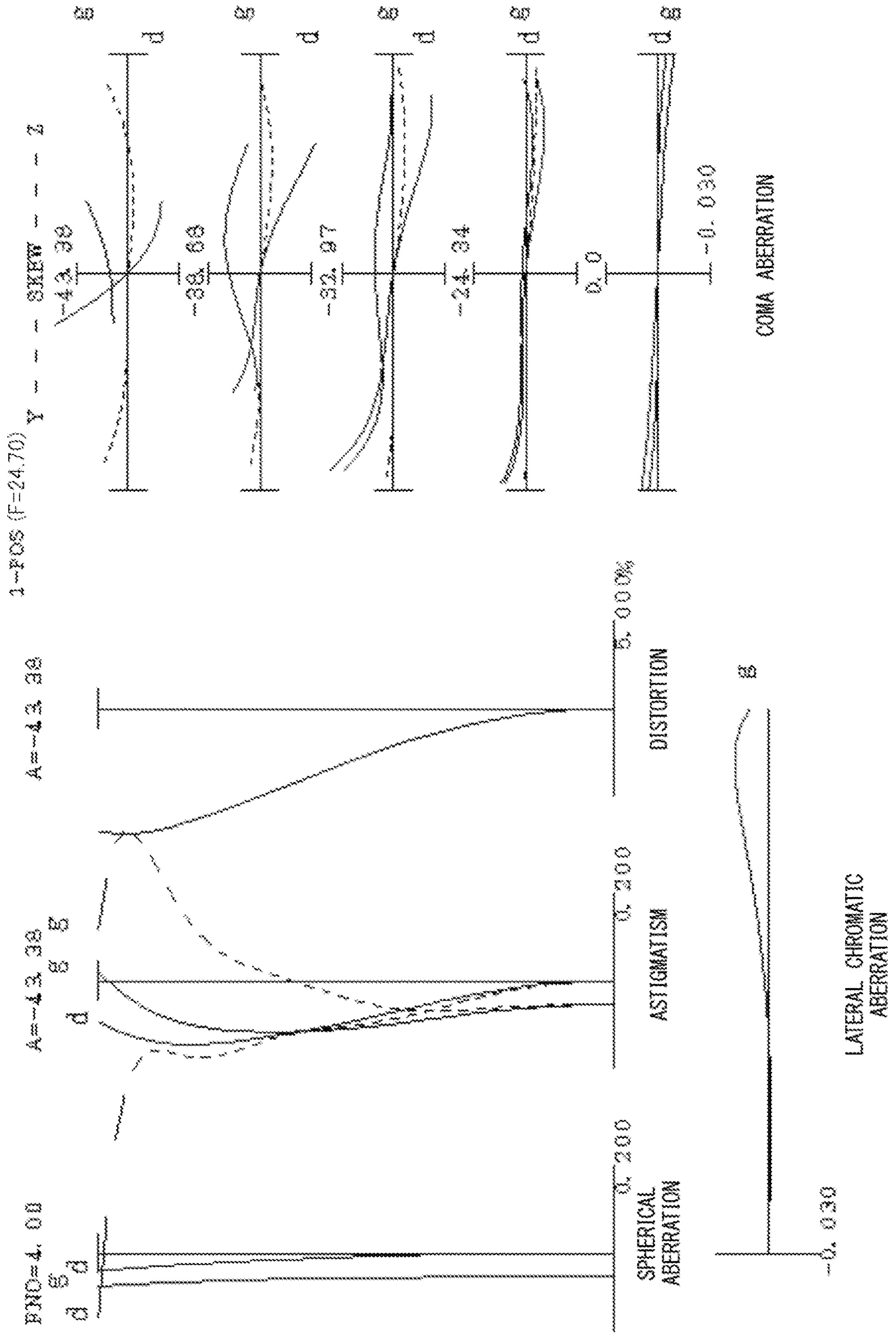
FIG. 10A shows aberrations of the variable magnification optical system of the fifth example focusing on an object at infinity in the wide-angle end state.
Figure 10B:
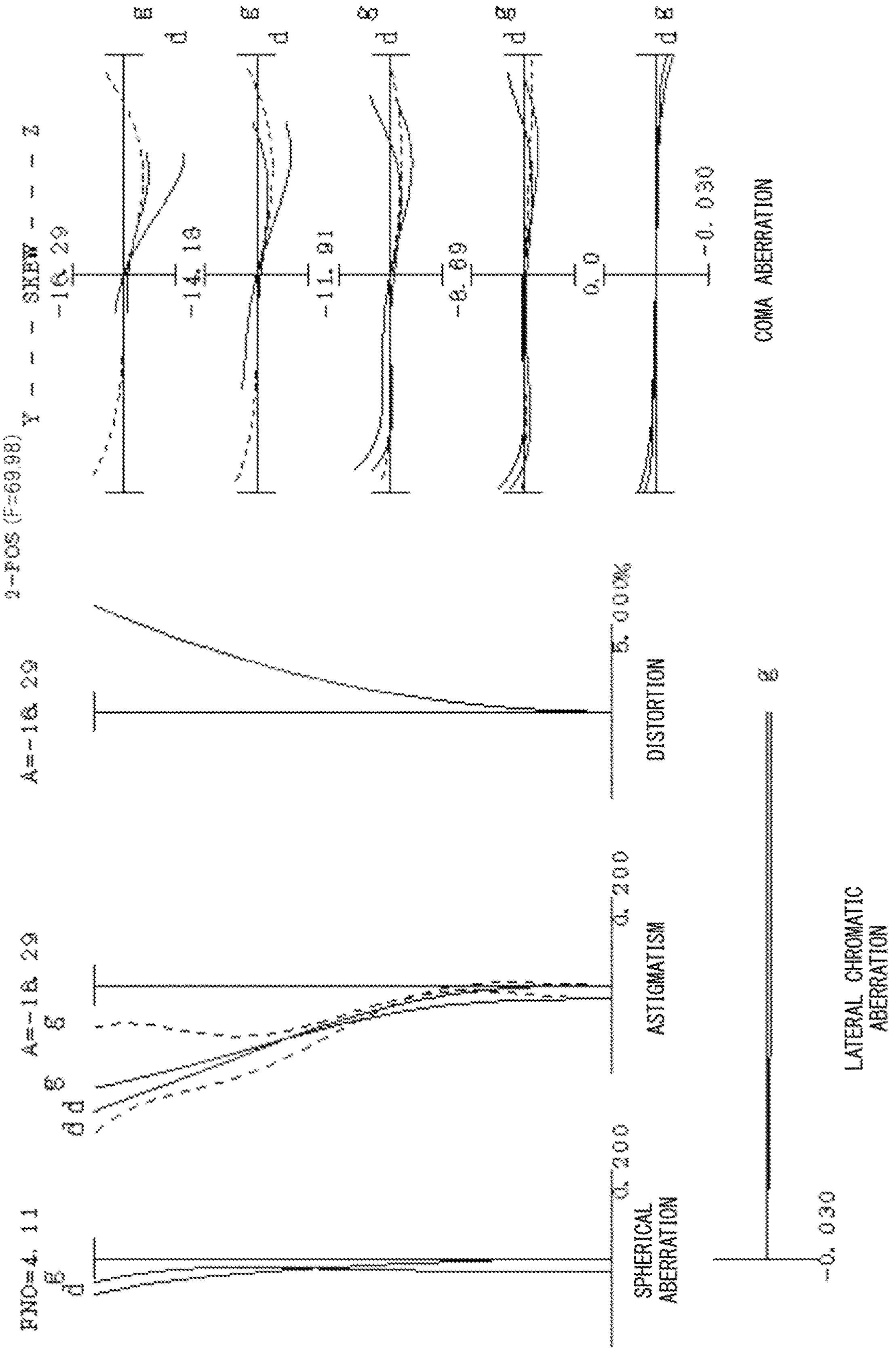
FIG. 10B shows aberrations of the variable magnification optical system of the fifth example focusing on an object at infinity in an intermediate focal length state.
Figure 10C:
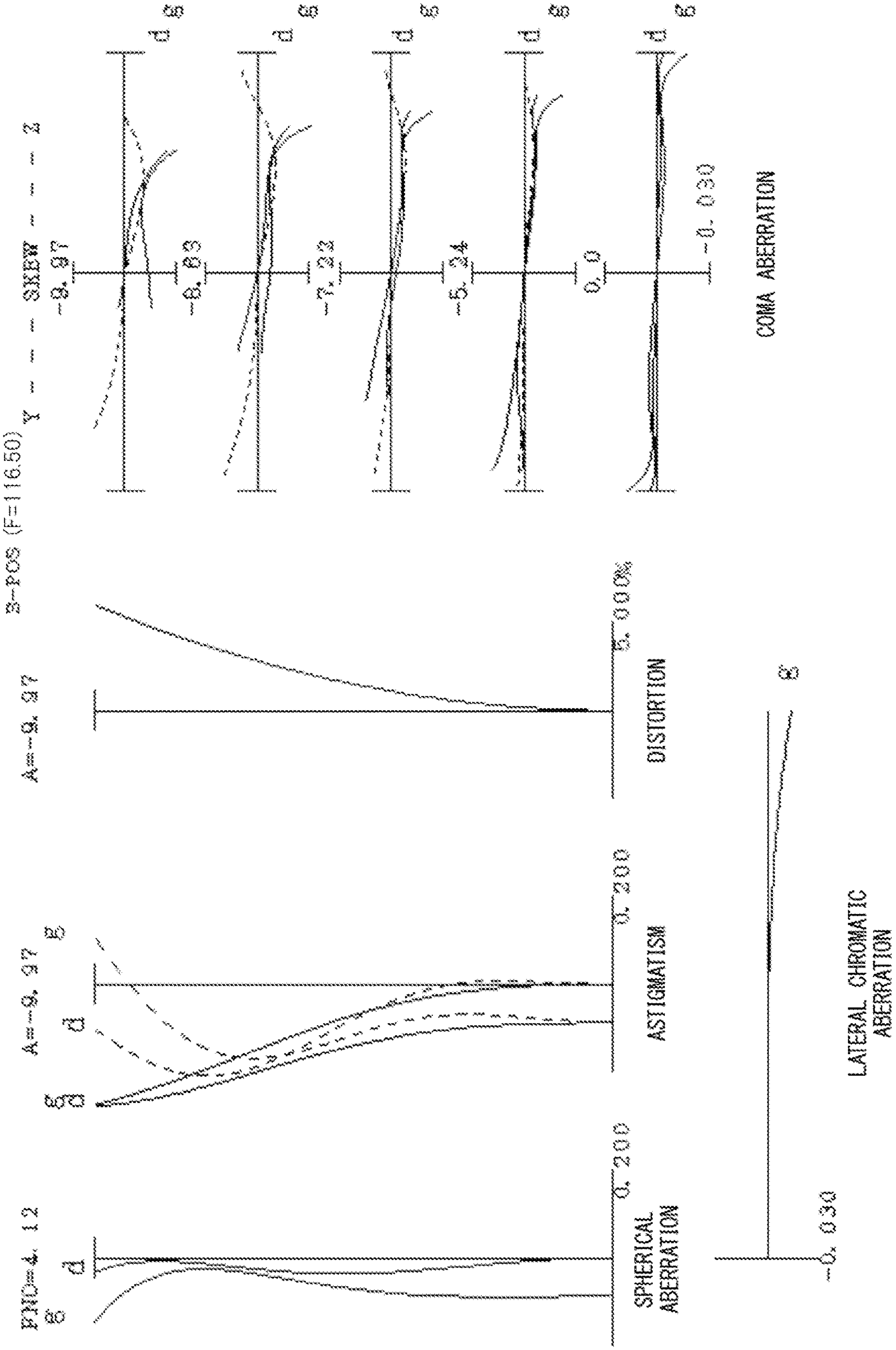
FIG. 10C shows aberrations of the variable magnification optical system of the fifth example focusing on an object at infinity in the telephoto end state.

FIG. 10A shows aberrations of the variable magnification optical system of the fifth example focusing on an object at infinity in the wide-angle end state. FIG. 10B shows aberrations of the variable magnification optical system of the fifth example focusing on an object at infinity in an intermediate focal length state. FIG. 10C shows aberrations of the variable magnification optical system of the fifth example focusing on an object at infinity in the telephoto end state.

The graphs of aberrations suggest that the variable magnification optical system of the present example effectively reduces variations in aberrations at focusing and at varying magnification and has high optical performance.

Sixth Example

Figure 11:
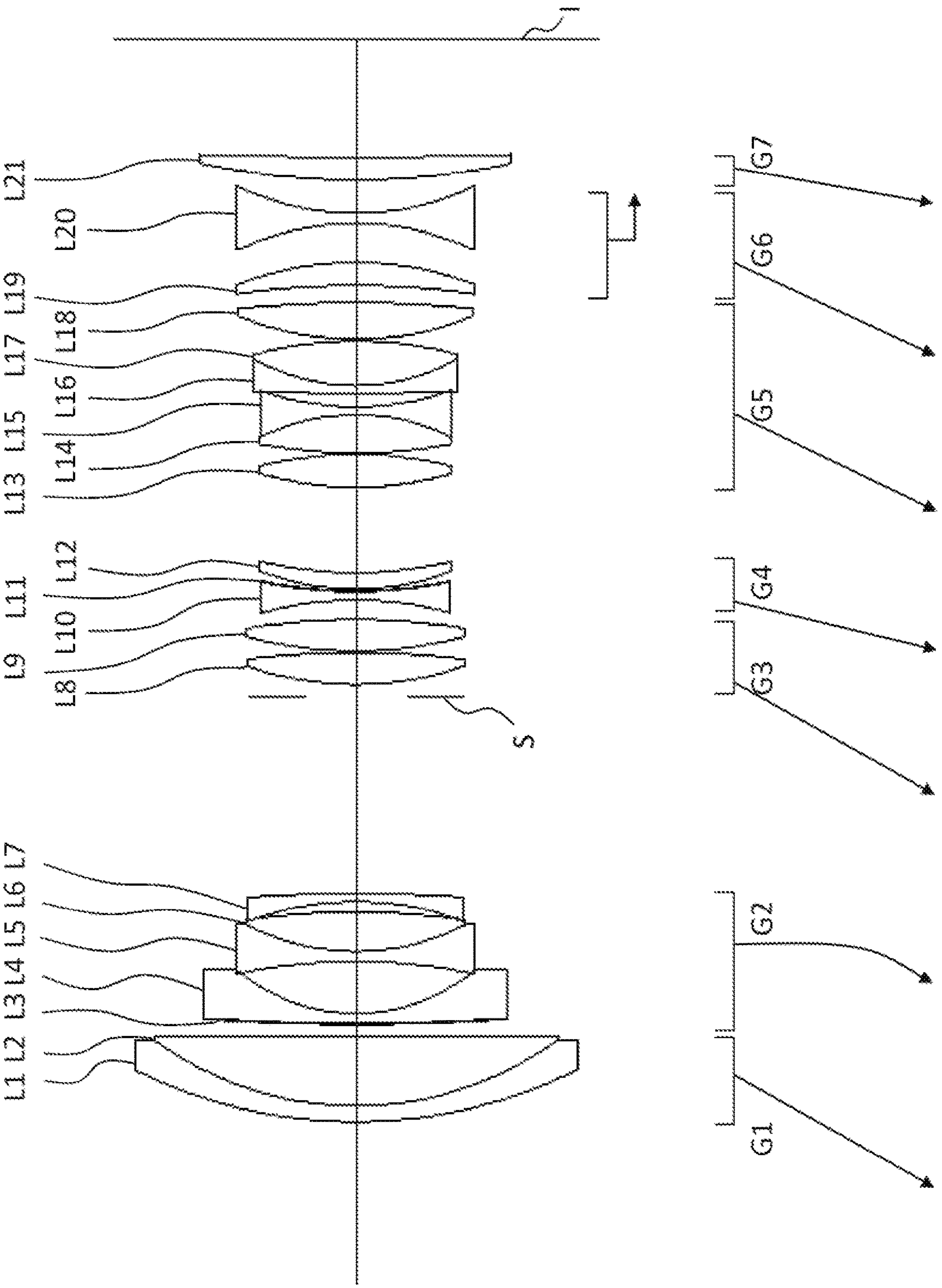
FIG. 11 is a cross-sectional view of a variable magnification optical system of a sixth example focusing on an object at infinity in the wide-angle end state.

FIG. 11 is a cross-sectional view of a variable magnification optical system of a sixth example focusing on an object at infinity in the wide-angle end state.

The variable magnification optical system of the present example includes, in order from the object side, a first lens group G1 having positive refractive power, a second lens group G2 having negative refractive power, an aperture stop S, a third lens group G3 having positive refractive power, a fourth lens group G4 having negative refractive power, a fifth lens group G5 having positive refractive power, a sixth lens group G6 having negative refractive power, and a seventh lens group G7 having positive refractive power.

The first lens group G1 consists of a positive cemented lens composed of, in order from the object side, a negative meniscus lens L1 convex on the object side and a biconvex positive lens L2.

The second lens group G2 consists of, in order from the object side, a negative cemented lens composed of a negative meniscus lens L3 convex on the object side and a negative meniscus lens L4 convex on the object side, a positive cemented lens composed of a biconcave negative lens L5 and a biconvex positive lens L6, and a negative meniscus lens L7 concave on the object side.

The third lens group G3 consists of, in order from the object side, a biconvex positive lens L8 and a biconvex positive lens L9.

The fourth lens group G4 consists of, in order from the object side, a negative cemented lens composed of a biconcave negative lens L10 and a positive meniscus lens L11 convex on the object side as well as a positive meniscus lens L12 convex on the object side.

The fifth lens group G5 consists of, in order from the object side, a biconvex positive lens L13, a negative cemented lens composed of a biconvex positive lens L14 and a biconcave negative lens L15, a negative cemented lens composed of a negative meniscus lens L16 convex on the object side and a biconvex positive lens L17, and a biconvex positive lens L18.

The sixth lens group G6 consists of, in order from the object side, a positive meniscus lens L19 concave on the object side and a biconcave negative lens L20.

The seventh lens group G7 consists of a positive meniscus lens L21 convex on the object side.

An imaging device (not shown) constructed from CCD, CMOS, or the like is disposed on an image plane I.

The variable magnification optical system of the present example focuses by moving the sixth lens group G6 along the optical axis. When focus is shifted from infinity to a nearby object, the sixth lens group G6 moves from the object side toward the image side.

In the variable magnification optical system of the present example, the second lens group G2, the third lens group G3, the fourth lens group G4, the fifth lens group G5, the sixth lens group G6, and the seventh lens group G7 correspond to the rear group, and the seventh lens group G7 to the final lens group. The second lens group G2 corresponds to the first negative lens group, the third lens group G3 to the first positive lens group, the fourth lens group G4 to the second negative lens group, and the fifth lens group G5 to the second positive lens group. The sixth lens group G6 corresponds to the negative focusing group.

Table 6 below shows specifications of the variable magnification optical system of the present example.

TABLE 6

[General specifications]

| | |
|---|---|
| fw | 24.70 |
| ft | 116.50 |
| Fnow | 4.10 |
| Fnot | 4.10 |

[Lens specifications]

| m | r | d | nd | νd | (23) | (24) | (25) |
|---|---|---|---|---|---|---|---|
| *1) | 60.967 | 2.000 | 1.953750 | 32.33 | | | |
| 2) | 42.237 | 8.537 | 1.618000 | 63.34 | | | |
| 3) | −3319.753 | d3 | | | | | |
| 4) | 426.783 | 0.100 | 1.560930 | 36.64 | | | |
| 5) | 278.283 | 1.200 | 1.883000 | 40.69 | | | |
| 6) | 22.697 | 6.425 | | | | | |
| 7) | −70.255 | 1.200 | 1.618000 | 63.34 | | N | |
| 8) | 28.843 | 4.893 | 1.850250 | 30.05 | P1 | | |
| 9) | −92.169 | 1.309 | | | | | |
| 10) | −37.069 | 1.000 | 1.755000 | 52.34 | | | |
| 11) | −200.602 | d11 | | | | | |
| 12> | ∞ | 1.500 | (aperture stop) | | | | |
| 13) | 41.043 | 3.957 | 1.497820 | 82.57 | | | P2 |
| 14) | −112.702 | 0.200 | | | | | |
| 15) | 50.383 | 3.908 | 1.593240 | 67.90 | | | P2 |
| *16) | −73.304 | d16 | | | | | |
| 17) | −44.208 | 1.000 | 1.696800 | 55.52 | | | |
| 18) | 54.606 | 0.100 | 1.560930 | 36.64 | | | |
| *19) | 54.619 | 0.200 | | | | | |
| 20) | 32.260 | 2.040 | 1.846660 | 23.80 | P1 | | |
| 21) | 50.118 | d21 | | | | | |
| *22) | 38.298 | 4.049 | 1.593240 | 67.90 | | | P2 |

TABLE 6-continued

| | | | | | | |
|---|---|---|---|---|---|---|
| 23) | −50.338 | 0.200 | | | | |
| 24) | 66.052 | 4.718 | 1.755000 | 52.34 | | |
| 25) | −25.774 | 1.000 | 1.950000 | 29.37 | | |
| 26) | 36.234 | 1.627 | | | | |
| 27) | 328.661 | 1.000 | 1.950000 | 29.37 | | |
| 28) | 25.731 | 5.492 | 1.487490 | 70.31 | | P2 |
| 29) | −46.438 | 0.200 | | | | |
| 30) | 38.196 | 4.498 | 1.850000 | 27.03 | P1 | |
| 31) | −143.789 | d31 | | | | |
| 32) | −102.642 | 2.859 | 1.672700 | 32.19 | P1 | |
| 33) | −40.067 | 4.819 | | | | |
| 34) | −33.105 | 1.200 | 1.696800 | 55.52 | | |
| 35) | 33.390 | d35 | | | | |
| 36) | 90.269 | 2.873 | 1.846660 | 23.80 | P1 | |
| 37) | 637.643 | Bf | | | | |

[Aspherical surface data]

| m | K | A4 | A6 | A8 | A10 |
|---|---|---|---|---|---|
| 1) | −1.0000 | 2.89E−06 | −2.02E−09 | 7.60E−12 | −1.67E−14 |
| 16) | 0.0000 | 6.47E−06 | −4.63E−09 | −3.91E−12 | 2.63E−14 |
| 19) | 0.0000 | −5.70E−06 | 2.86E−08 | −6.41E−11 | 5.59E−14 |
| 22) | 0.0000 | −1.01E−05 | 1.59E−08 | −7.06E−11 | 1.42E−13 |

[Focal length data of groups]

| Groups | Starting surfaces | Focal lengths |
|---|---|---|
| G1 | 1 | 125.04 |
| G2 | 4 | −21.06 |
| G3 | 13 | 28.56 |
| G4 | 17 | −52.12 |
| G5 | 22 | 34.93 |
| G6 | 32 | −33.33 |
| G7 | 36 | 123.90 |

[Variable distance data]

| | Wide-angle end state | Telephoto end state |
|---|---|---|
| d3 | 1.500 | 41.533 |
| d11 | 24.224 | 1.500 |
| d16 | 2.407 | 11.409 |
| d21 | 10.502 | 1.500 |
| d31 | 2.120 | 2.268 |
| d35 | 4.113 | 23.421 |
| Bf | 14.555 | 27.789 |

Figure 12A:
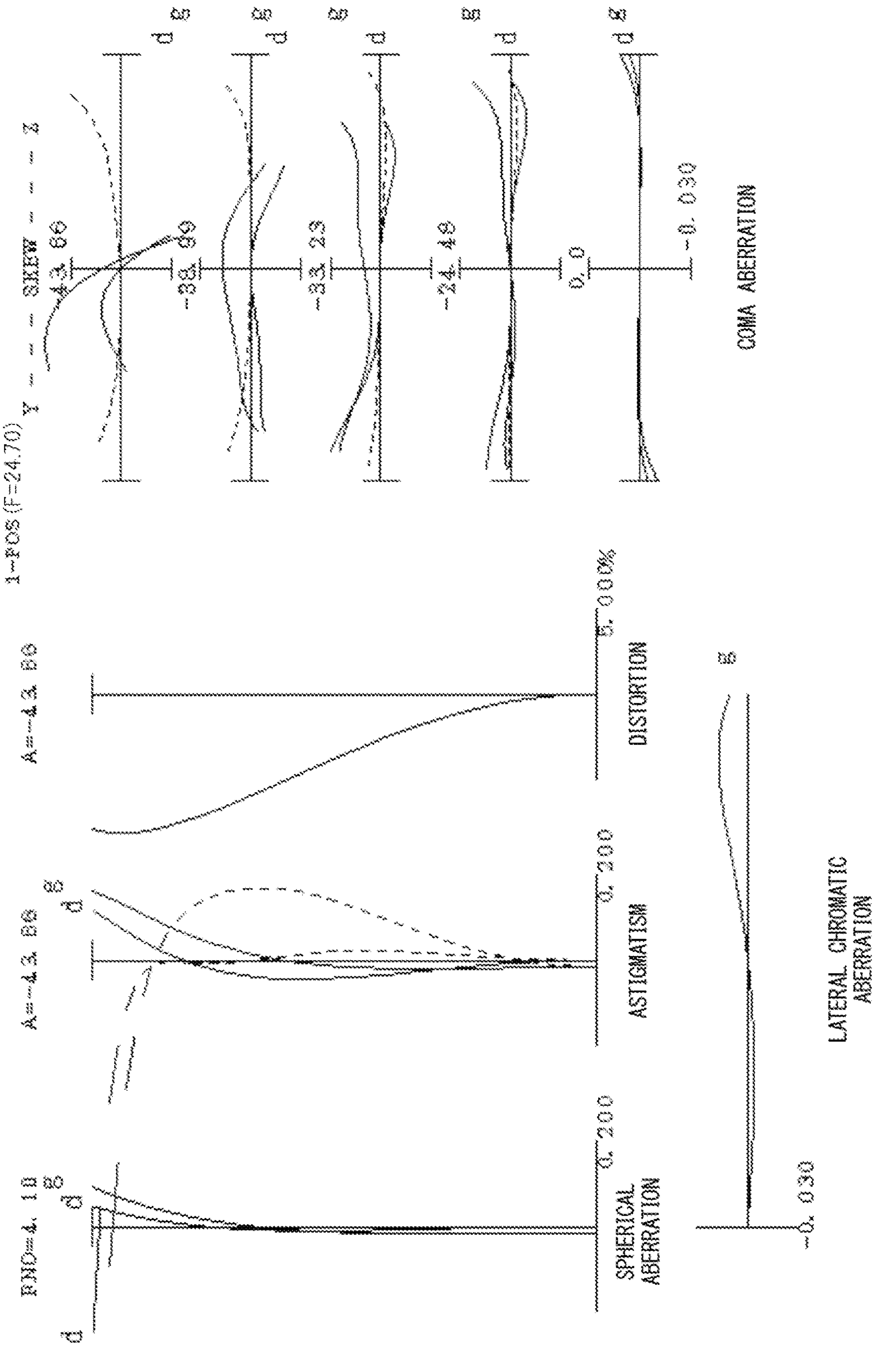
FIG. 12A shows aberrations of the variable magnification optical system of the sixth example focusing on an object at infinity in the wide-angle end state.
Figure 12B:
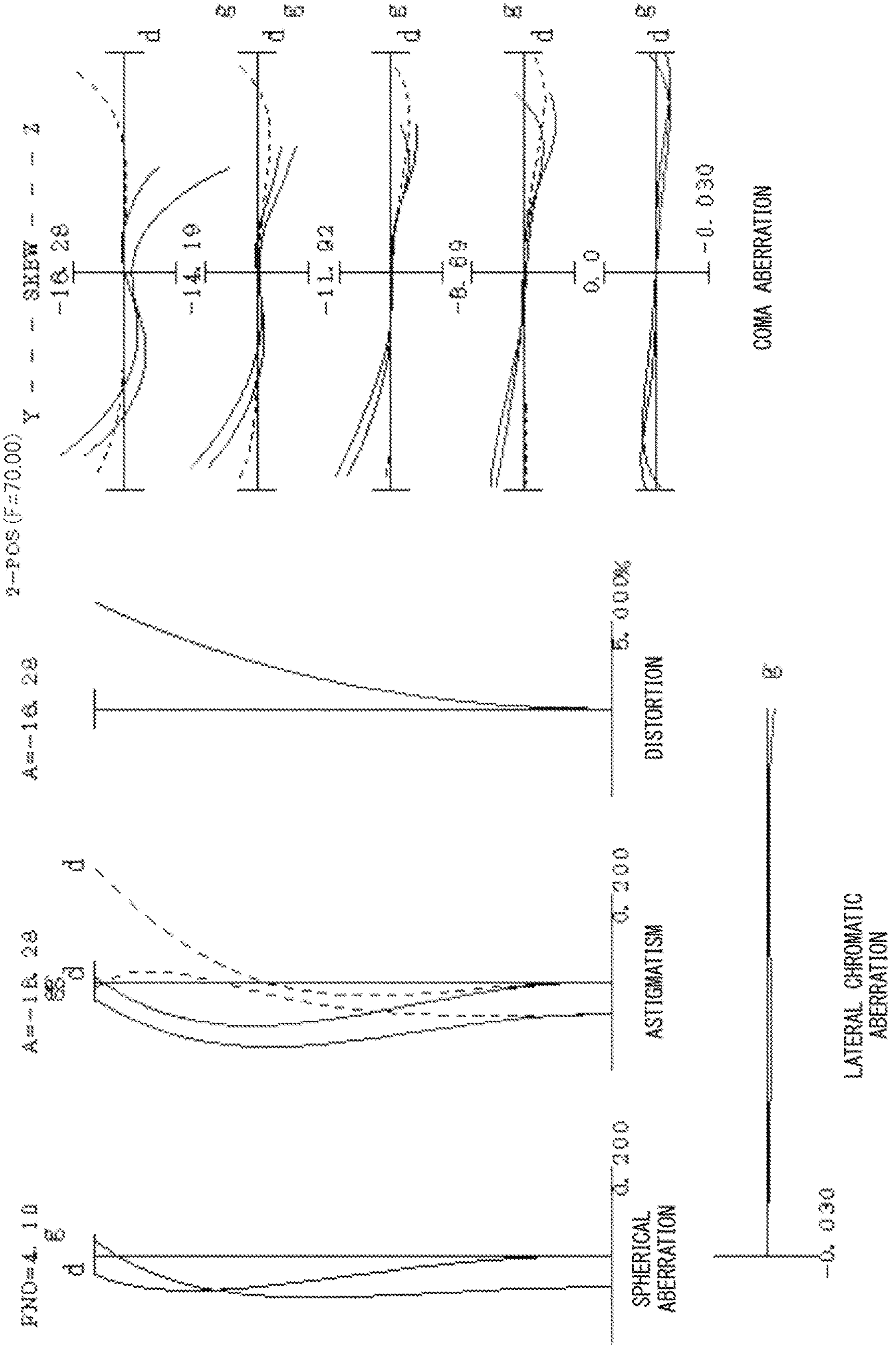
FIG. 12B shows aberrations of the variable magnification optical system of the sixth example focusing on an object at infinity in an intermediate focal length state.
Figure 12C:
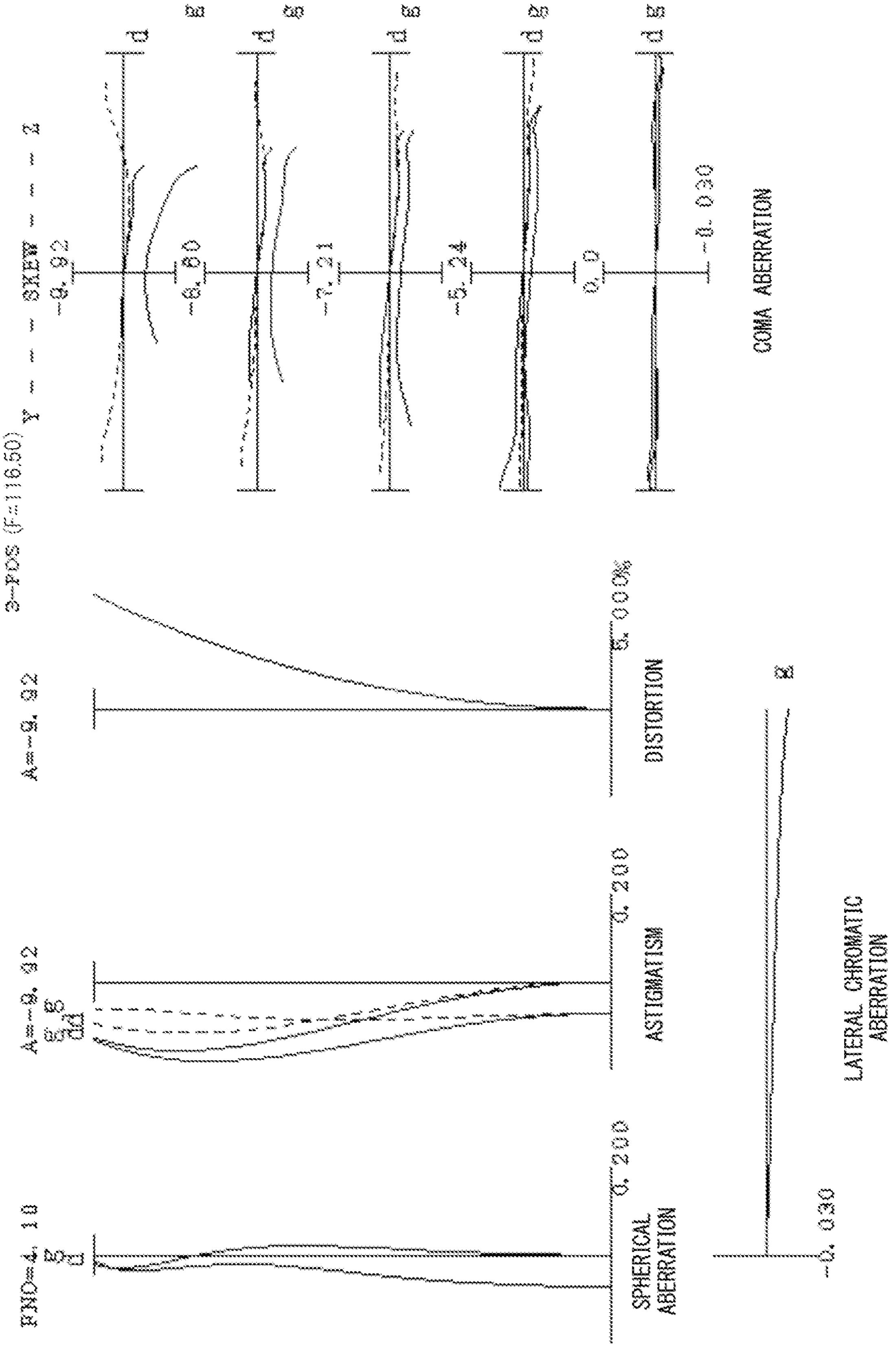
FIG. 12C shows aberrations of the variable magnification optical system of the sixth example focusing on an object at infinity in the telephoto end state.

FIG. 12A shows aberrations of the variable magnification optical system of the sixth example focusing on an object at infinity in the wide-angle end state. FIG. 12B shows aberrations of the variable magnification optical system of the sixth example focusing on an object at infinity in an intermediate focal length state. FIG. 12C shows aberrations of the variable magnification optical system of the sixth example focusing on an object at infinity in the telephoto end state.

The graphs of aberrations suggest that the variable magnification optical system of the present example effectively reduces variations in aberrations at focusing and at varying magnification and has high optical performance.

Seventh Example

Figure 13:
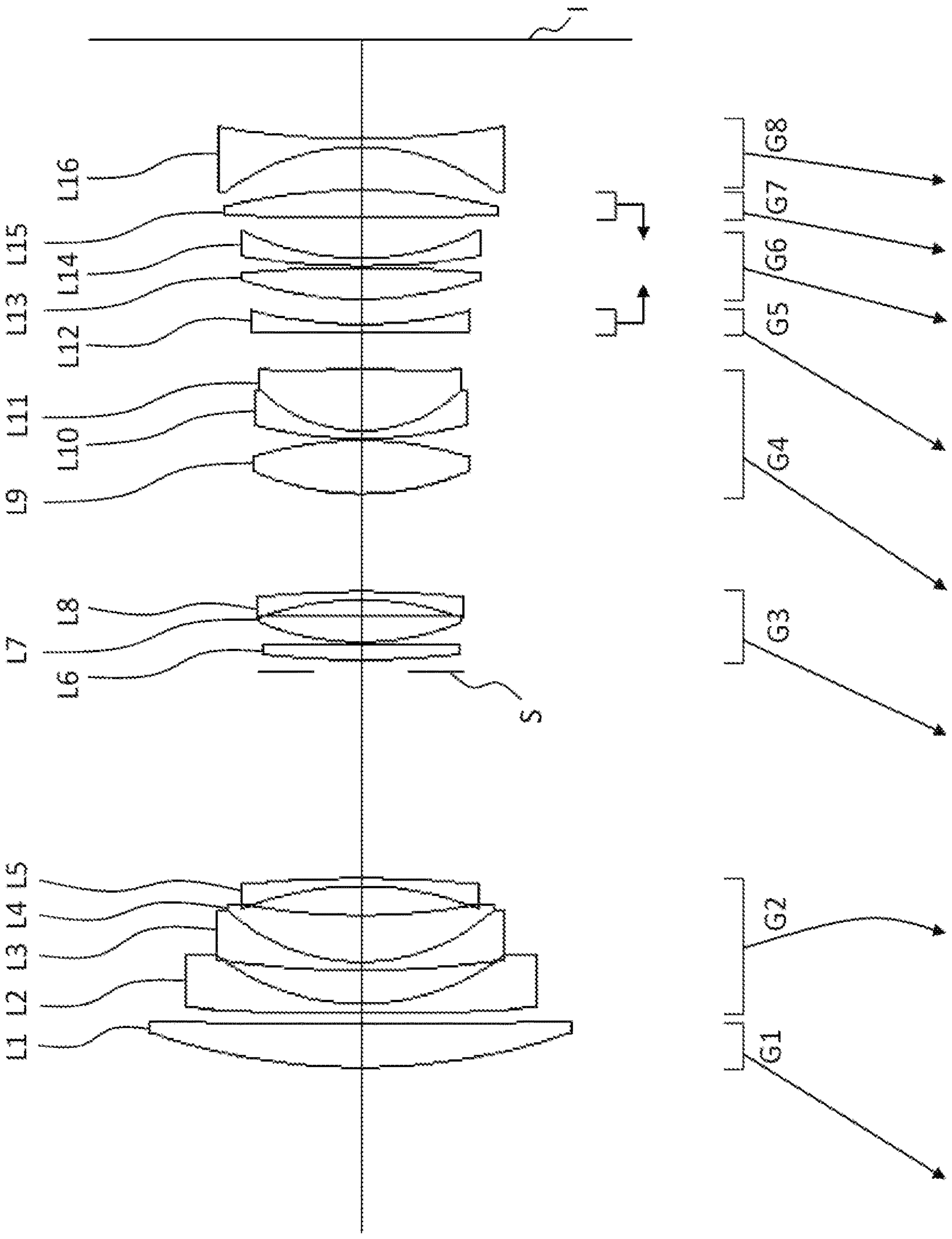
FIG. 13 is a cross-sectional view of a variable magnification optical system of a seventh example focusing on an object at infinity in the wide-angle end state.

FIG. 13 is a cross-sectional view of a variable magnification optical system of a seventh example focusing on an object at infinity in the wide-angle end state.

The variable magnification optical system of the present example includes, in order from the object side, a first lens group G1 having positive refractive power, a second lens group G2 having negative refractive power, an aperture stop S, a third lens group G3 having positive refractive power, a fourth lens group G4 having positive refractive power, a fifth lens group G5 having negative refractive power, a sixth lens group G6 having positive refractive power, a seventh lens group G7 having positive refractive power, and an eighth lens group G8 having negative refractive power.

The first lens group G1 consists of a positive meniscus lens L1 convex on the object side.

The second lens group G2 consists of, in order from the object side, a biconcave negative lens L2, a positive cemented lens composed of a negative meniscus lens L3 convex on the object side and a positive meniscus lens L4 convex on the object side, and a negative meniscus lens L5 concave on the object side.

The third lens group G3 consists of, in order from the object side, a biconvex positive lens L6, a positive meniscus lens L7 convex on the object side, and a negative meniscus lens L8 concave on the object side.

The fourth lens group G4 consists of, in order from the object side, a biconvex positive lens L9 and a positive cemented lens composed of a negative meniscus lens L10 convex on the object side and a biconvex positive lens L11.

The fifth lens group G5 consists of a negative meniscus lens L12 convex on the object side.

The sixth lens group G6 consists of, in order from the object side, a biconvex positive lens L13 and a negative meniscus lens L14 convex on the object side.

The seventh lens group G7 consists of a biconvex positive lens L15.

The eighth lens group G8 consists of a biconcave negative lens L16.

An imaging device (not shown) constructed from CCD, CMOS, or the like is disposed on an image plane I.

The variable magnification optical system of the present example focuses by moving the fifth lens group G5 and the seventh lens group G7 along the optical axis. When focus is shifted from infinity to a nearby object, the fifth lens group G5 moves from the object side toward the image side whereas the seventh lens group G7 moves from the image side toward the object side.

In the variable magnification optical system of the present example, the second lens group G2, the third lens group G3, the fourth lens group G4, the fifth lens group G5, the sixth lens group G6, the seventh lens group G7, and the eighth lens group G8 correspond to the rear group, and the eighth lens group G8 to the final lens group. The second lens group G2 corresponds to the first negative lens group, the third lens group G3 to the first positive lens group, the fourth lens group G4 to the second positive lens group, and the fifth lens group G5 to the second negative lens group. The fifth lens group G5 corresponds to the first focusing group and the negative focusing group, and the seventh lens group G7 to the second focusing group and the positive focusing group.

Table 7 below shows specifications of the variable magnification optical system of the present example.

TABLE 7

[General specifications]

| | |
|---|---|
| fw | 24.70 |
| ft | 116.50 |
| Fnow | 4.00 |
| Fnot | 4.12 |

[Lens specifications]

| m | r | d | nd | vd | (23) | (24) | (25) |
|---|---|---|---|---|---|---|---|
| 1) | 79.267 | 5.328 | 1.610028 | 61.92 | | | |
| 2) | 1211.020 | d2 | | | | | |
| *3) | −666.001 | 1.000 | 1.846765 | 43.08 | | | |
| 4) | 28.956 | 4.106 | | | | | |
| 5) | 119.464 | 1.000 | 1.488366 | 81.23 | | N | |
| 6) | 23.990 | 5.694 | 1.859720 | 25.58 | P1 | | |
| 7) | 75.610 | 3.523 | | | | | |
| 8) | −40.022 | 1.000 | 1.858890 | 42.22 | | | |
| *9) | −119.737 | d9 | | | | | |
| 10> | ∞ | 1.400 | (aperture stop) | | | | |
| 11) | 118.226 | 1.928 | 1.887426 | 26.67 | P1 | | |
| 12) | −502.479 | 0.200 | | | | | |
| 13) | 32.921 | 3.197 | 1.619109 | 61.07 | | | P2 |
| 14) | 3093.936 | 1.947 | | | | | |
| 15) | −36.444 | 1.000 | 1.951916 | 32.14 | | | |
| 16) | −121.050 | d16 | | | | | |
| *17) | 31.693 | 6.478 | 1.527617 | 72.77 | | | P2 |
| 18) | −45.685 | 0.200 | | | | | |
| 19) | 50.306 | 1.000 | 1.888302 | 31.72 | | | |
| 20) | 17.709 | 7.435 | 1.590315 | 63.96 | | | P2 |
| *21) | −188.818 | d21 | | | | | |
| 22) | 1078.096 | 1.000 | 1.952697 | 32.41 | | | |
| 23) | 53.346 | d23 | | | | | |
| 24) | 45.805 | 3.800 | 1.846660 | 23.80 | P1 | | |
| 25) | −165.803 | 0.200 | | | | | |
| 26) | 83.490 | 1.000 | 1.863249 | 41.92 | | | |
| 27) | 32.358 | d27 | | | | | |
| 28) | 520.111 | 3.315 | 1.786942 | 48.44 | | | |
| 29) | −71.011 | d29 | | | | | |
| 30) | −27.595 | 1.000 | 1.456000 | 91.38 | | N | |
| 31) | 102.771 | Bf | | | | | |

[Aspherical surface data]

| m | K | A4 | A6 | A8 | A10 |
|---|---|---|---|---|---|
| 3) | 0.0000 | 5.62E−06 | −2.41E−09 | 1.96E−12 | 3.09E−15 |
| 9) | 0.0000 | 3.88E−06 | −2.95E−09 | 1.22E−12 | |
| 17) | 0.0000 | −4.03E−06 | −5.75E−10 | −1.45E−11 | |
| 21) | 0.0000 | 1.68E−05 | 9.33E−09 | 2.56E−11 | |

[Focal length data of groups]

| Groups | Starting surfaces | Focal lengths |
|---|---|---|
| G1 | 1 | 138.79 |
| G2 | 3 | −25.57 |
| G3 | 11 | 86.31 |

TABLE 7-continued

| | | |
|---|---|---|
| G4 | 17 | 32.32 |
| G5 | 22 | −58.94 |
| G6 | 24 | 121.47 |
| G7 | 28 | 79.59 |
| G8 | 30 | −47.59 |

[Variable distance data]

| | Wide-angle end state | Telephoto end state |
|---|---|---|
| d2 | 1.500 | 45.179 |
| d9 | 25.296 | 1.850 |
| d16 | 11.979 | 1.400 |
| d21 | 4.517 | 2.000 |
| d23 | 3.091 | 27.107 |
| d27 | 4.991 | 12.096 |
| d29 | 5.275 | 4.684 |
| Bf | 12.055 | 29.388 |

Figure 14A:
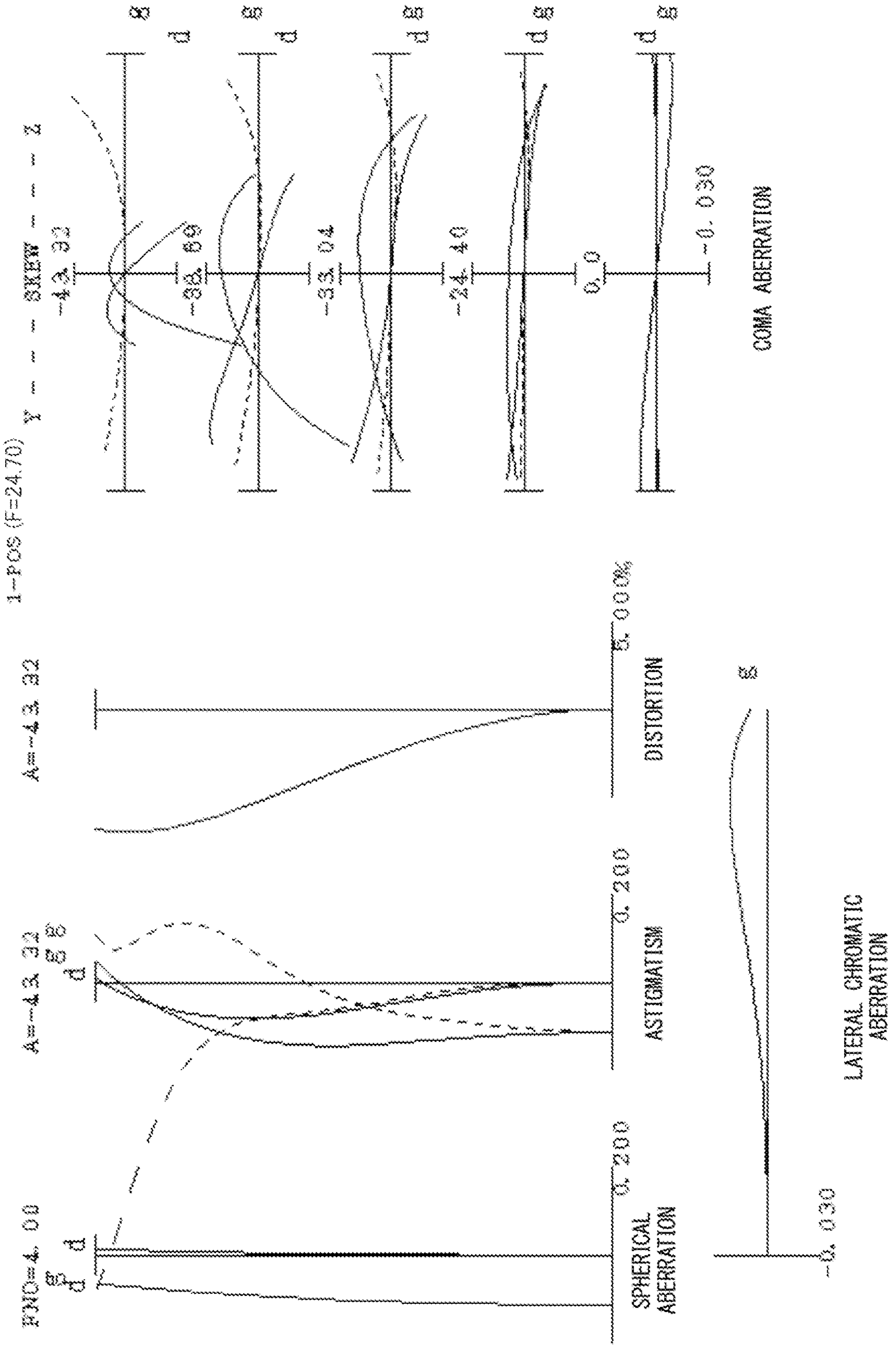
FIG. 14A shows aberrations of the variable magnification optical system of the seventh example focusing on an object at infinity in the wide-angle end state.
Figure 14B:
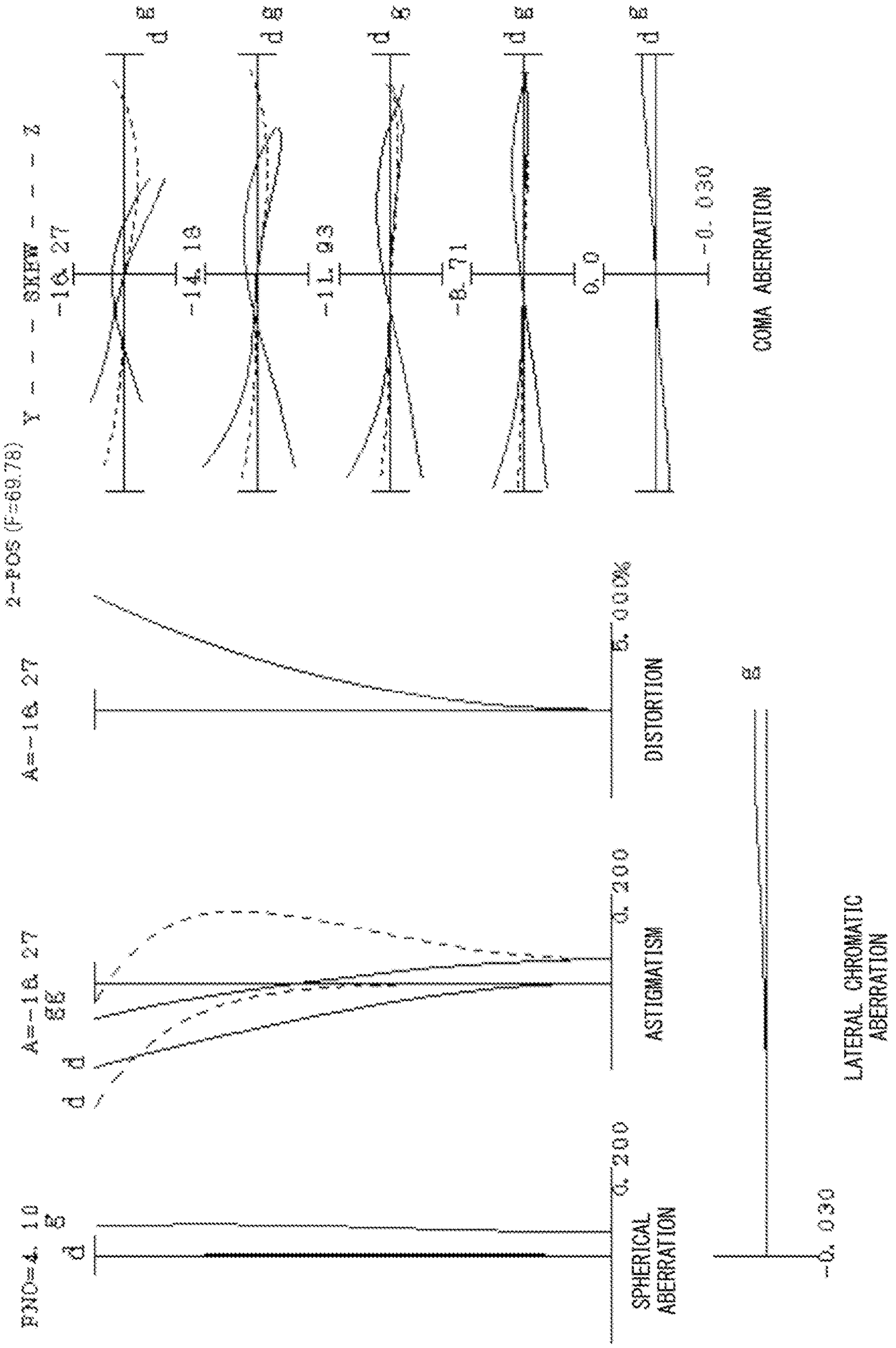
FIG. 14B shows aberrations of the variable magnification optical system of the seventh example focusing on an object at infinity in an intermediate focal length state.
Figure 14C:
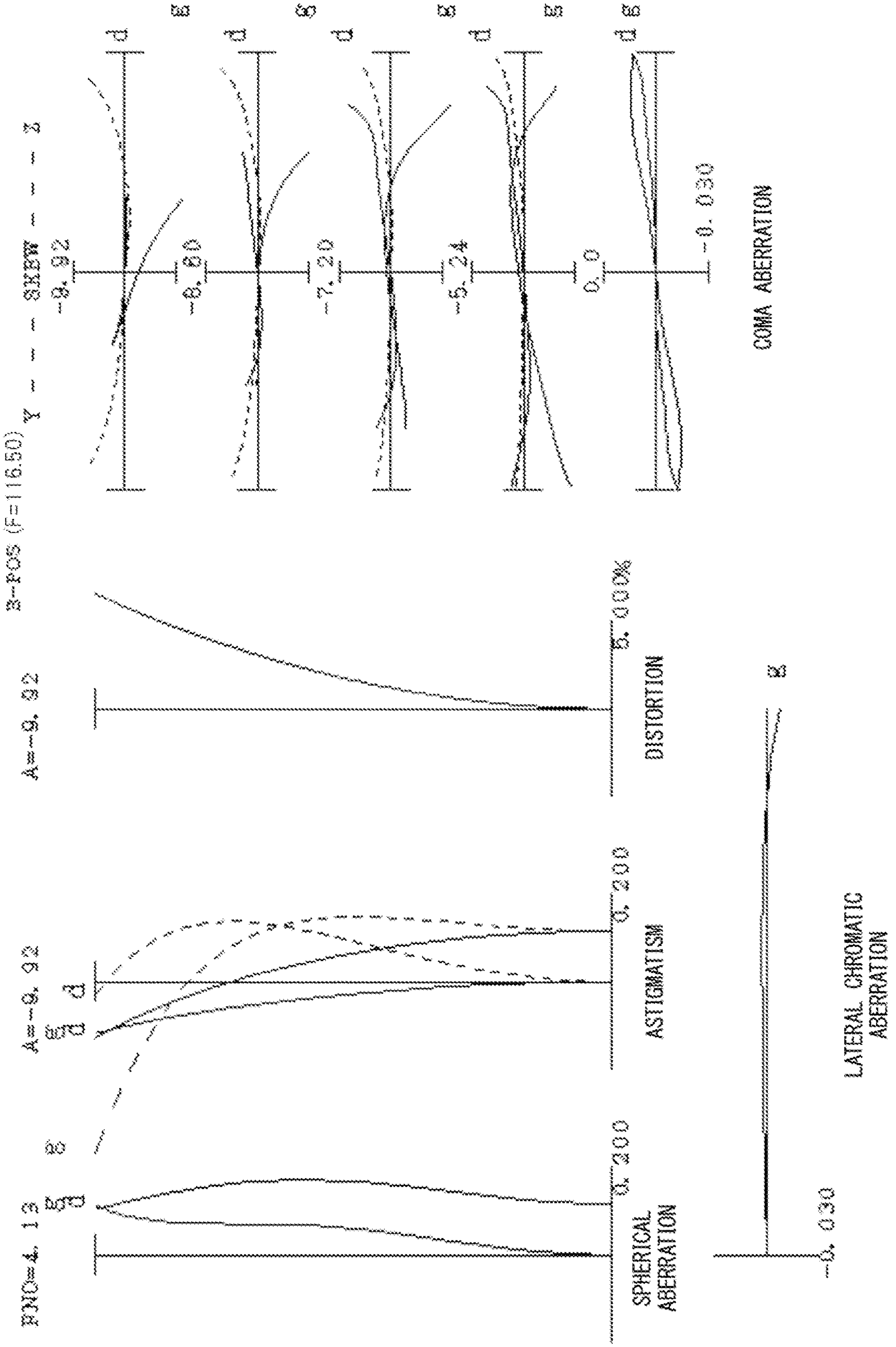
FIG. 14C shows aberrations of the variable magnification optical system of the seventh example focusing on an object at infinity in the telephoto end state.

FIG. 14A shows aberrations of the variable magnification optical system of the seventh example focusing on an object at infinity in the wide-angle end state. FIG. 14B shows aberrations of the variable magnification optical system of the seventh example focusing on an object at infinity in an intermediate focal length state. FIG. 14C shows aberrations of the variable magnification optical system of the seventh example focusing on an object at infinity in the telephoto end state.

The graphs of aberrations suggest that the variable magnification optical system of the present example effectively reduces variations in aberrations at focusing and at varying magnification and has high optical performance.

Eighth Example

Figure 15:
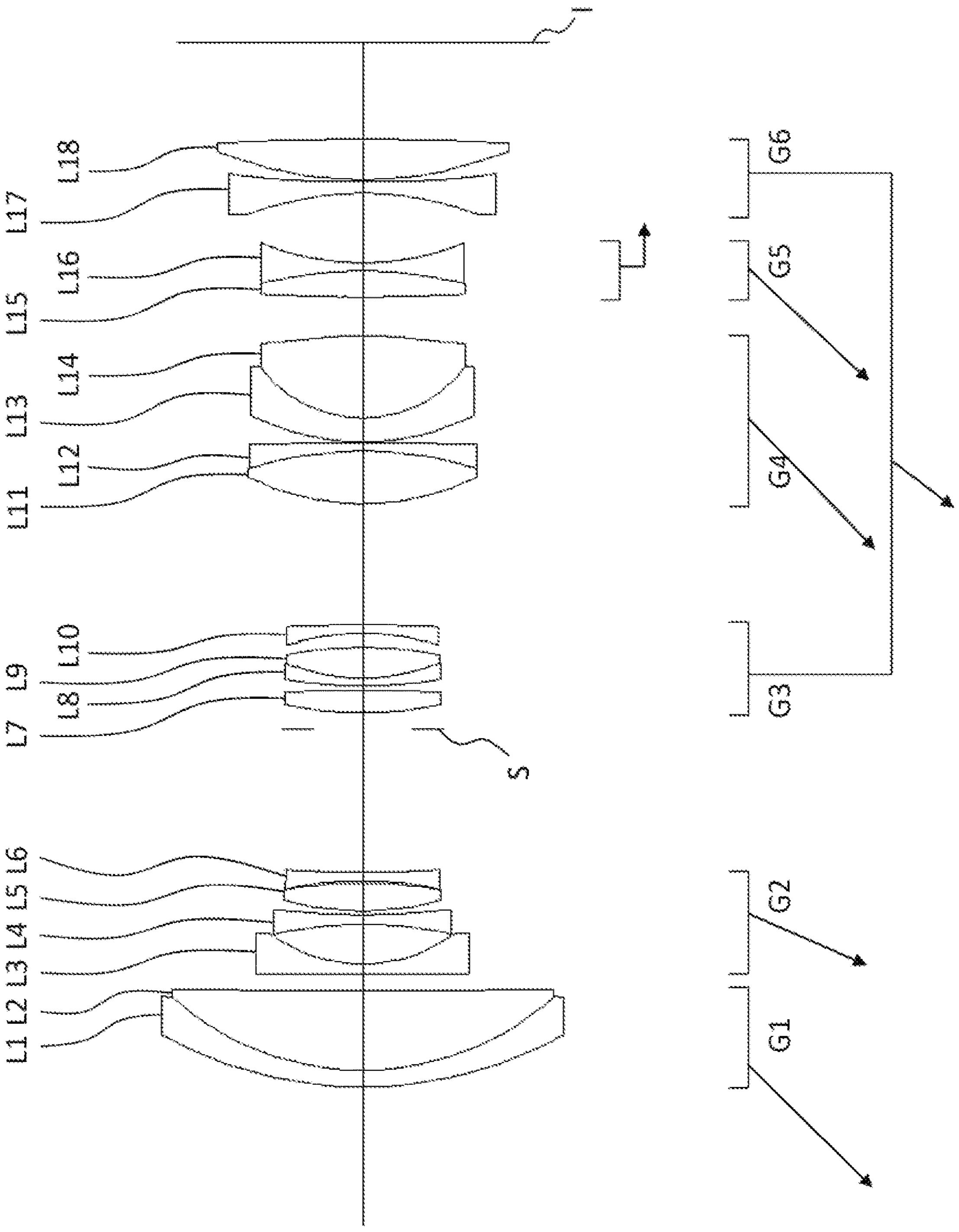
FIG. 15 is a cross-sectional view of a variable magnification optical system of an eighth example focusing on an object at infinity in the wide-angle end state.

FIG. 15 is a cross-sectional view of a variable magnification optical system of an eighth example focusing on an object at infinity in the wide-angle end state.

The variable magnification optical system of the present example includes, in order from the object side, a first lens group G1 having positive refractive power, a second lens group G2 having negative refractive power, an aperture stop S, a third lens group G3 having positive refractive power, a fourth lens group G4 having positive refractive power, a fifth lens group G5 having negative refractive power, and a sixth lens group G6 having negative refractive power.

The first lens group G1 consists of a positive cemented lens composed of, in order from the object side, a negative meniscus lens L1 convex on the object side and a positive meniscus lens L2 convex on the object side.

The second lens group G2 consists of, in order from the object side, a negative meniscus lens L3 convex on the object side, a biconcave negative lens L4, a biconvex positive lens L5, and a biconcave negative lens L6.

The third lens group G3 consists of, in order from the object side, a biconvex positive lens L7, a positive cemented lens composed of a negative meniscus lens L8 convex on the object side and a biconvex positive lens L9, and a negative meniscus lens L10 concave on the object side.

The fourth lens group G4 consists of, in order from the object side, a positive cemented lens composed of a biconvex positive lens L11 and a negative meniscus lens L12 concave on the object side as well as a positive cemented lens composed of a negative meniscus lens L13 convex on the object side and a biconvex positive lens L14.

The fifth lens group G5 consists of a negative cemented lens composed of, in order from the object side, a biconvex positive lens L15 and a biconcave negative lens L16.

The sixth lens group G6 consists of, in order from the object side, a biconcave negative lens L17 and a biconvex positive lens L18.

An imaging device (not shown) constructed from CCD, CMOS, or the like is disposed on an image plane I.

The variable magnification optical system of the present example focuses by moving the fifth lens group G5 along the optical axis. When focus is shifted from infinity to a nearby object, the fifth lens group G5 moves from the object side toward the image side.

In the variable magnification optical system of the present example, the second lens group G2, the third lens group G3, the fourth lens group G4, the fifth lens group G5, and the sixth lens group G6 correspond to the rear group, and the sixth lens group G6 to the final lens group. The second lens group G2 corresponds to the first negative lens group, the third lens group G3 to the first positive lens group, the fourth lens group G4 to the second positive lens group, and the fifth lens group G5 to the second negative lens group. The fifth lens group G5 corresponds to the negative focusing group.

Table 8 below shows specifications of the variable magnification optical system of the present example.

TABLE 8

[General specifications]

| | |
|---|---|
| fw | 24.75 |
| ft | 193.60 |
| Fnow | 4.00 |
| Fnot | 6.50 |

[Lens specifications]

| m | r | d | nd | vd | (23) | (25) |
|---|---|---|---|---|---|---|
| 1) | 50.215 | 2.000 | 1.903660 | 31.27 | | |
| 2) | 34.572 | 9.588 | 1.603000 | 65.44 | | |
| 3) | 1311.519 | d3 | | | | |

TABLE 8-continued

| | | | | | | |
|---|---|---|---|---|---|---|
| 4) | 734.769 | 1.307 | 1.953750 | 32.33 | | |
| 5) | 18.756 | 4.799 | | | | |
| 6) | −48.834 | 1.129 | 1.755000 | 52.33 | | |
| 7) | 82.569 | 0.451 | | | | |
| 8) | 35.539 | 3.409 | 1.922860 | 20.88 | P1 | |
| 9) | −55.882 | 0.297 | | | | |
| 10) | −40.429 | 1.015 | 1.816000 | 46.59 | | |
| 11) | 149.588 | d11 | | | | |
| 12> | ∞ | 2.016 | (aperture stop) | | | |
| 13) | 45.792 | 2.740 | 1.902650 | 35.72 | P1 | |
| 14) | −158.052 | 0.500 | | | | |
| 15) | 51.626 | 1.000 | 2.001000 | 29.12 | | |
| 16) | 25.348 | 3.645 | 1.579570 | 53.74 | | |
| 17) | −47.120 | 1.756 | | | | |
| 18 | −28.990 | 1.043 | 1.953750 | 32.33 | | |
| 19) | −180.881 | d19 | | | | |
| 20) | 31.325 | 6.348 | 1.834810 | 42.73 | P1 | |
| 21) | −46.677 | 1.000 | 1.903660 | 31.27 | | |
| 22) | −434.420 | 0.175 | | | | |
| 23) | 31.122 | 2.824 | 1.953750 | 32.33 | | |
| 24) | 15.393 | 10.000 | 1.497100 | 81.49 | | P2 |
| *25) | −46.610 | d25 | | | | |
| 26) | 192.398 | 3.146 | 1.846660 | 23.80 | P1 | |
| 27) | −50.784 | 1.017 | 1.851350 | 40.13 | | |
| *28) | 33.031 | d28 | | | | |
| 29) | −39.648 | 1.400 | 1.820800 | 42.51 | | |
| *30) | 237.062 | 0.232 | | | | |
| 31) | 46.735 | 4.880 | 1.683760 | 37.57 | P1 | |
| 32) | −359.761 | Bf | | | | |

[Aspherical surface data]

| m | K | A4 | A6 | A8 | A10 | A12 |
|---|---|---|---|---|---|---|
| 5) | 0.0000 | 3.31E−05 | −5.07E−08 | 7.86E−10 | −4.83E−12 | 1.35E−14 |
| 28) | 0.0000 | −3.68E−06 | 5.73E−08 | −1.75E−10 | −8.02E−13 | 5.32E−15 |
| 30) | 0.0000 | 7.67E−06 | −1.25E−08 | 6.72E−11 | −1.62E−13 | |

[Focal length data of groups]

| Groups | Starting surfaces | Focal lengths |
|---|---|---|
| G1 | 1 | 110.64 |
| G2 | 4 | −16.88 |
| G3 | 13 | 59.63 |
| G4 | 20 | 27.13 |
| G5 | 26 | −47.14 |
| G6 | 29 | −137.34 |

[Variable distance data]

| | Wide-angle end state | Telephoto end state |
|---|---|---|
| d3 | 1.969 | 54.765 |
| d11 | 17.288 | 1.166 |
| d19 | 14.645 | 1.478 |
| d25 | 4.685 | 2.612 |
| d28 | 8.395 | 23.634 |
| Bf | 11.793 | 37.548 |

Figure 16A:
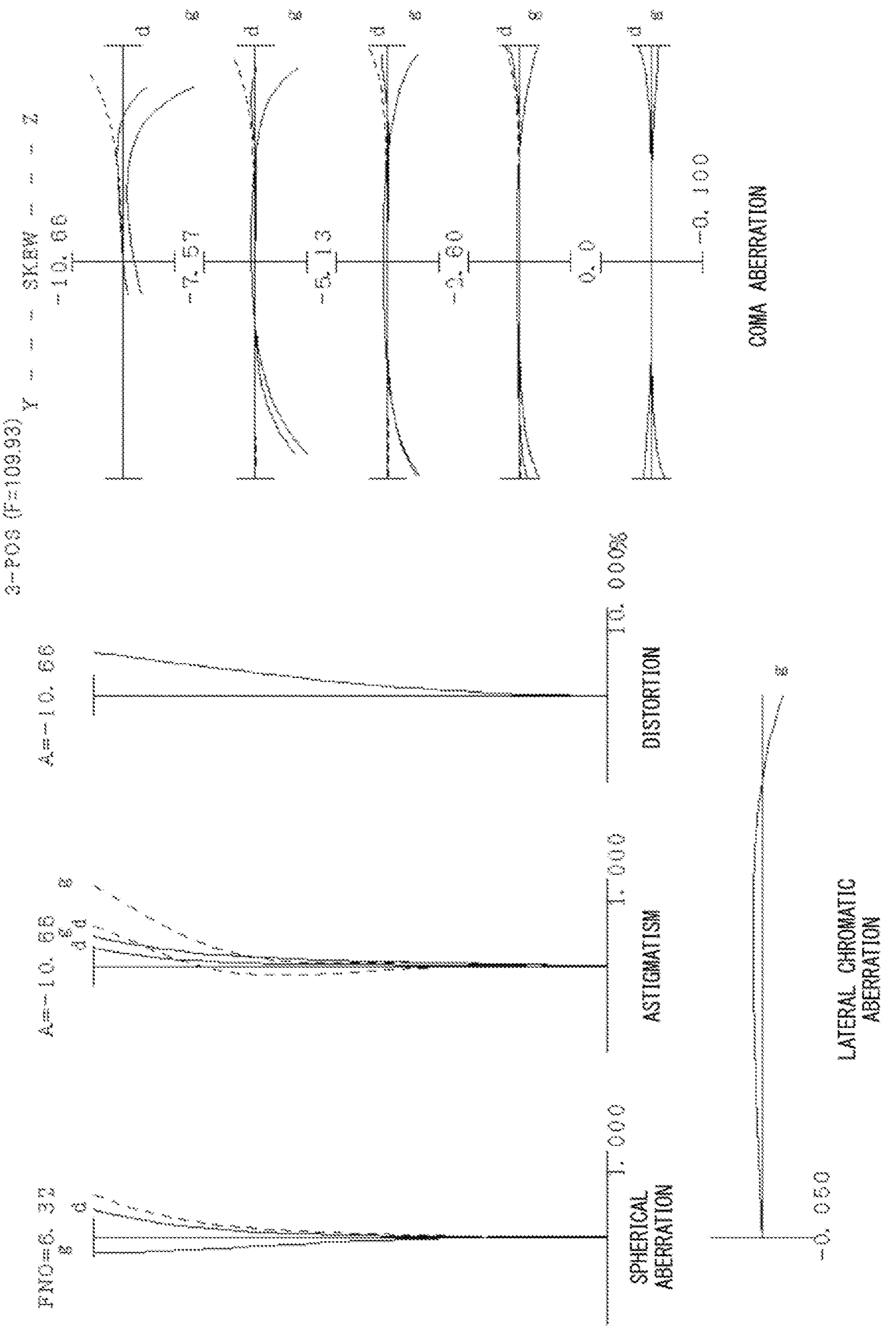
FIG. 16A shows aberrations of the variable magnification optical system of the eighth example focusing on an object at infinity in an intermediate focal length state.
Figure 16B:
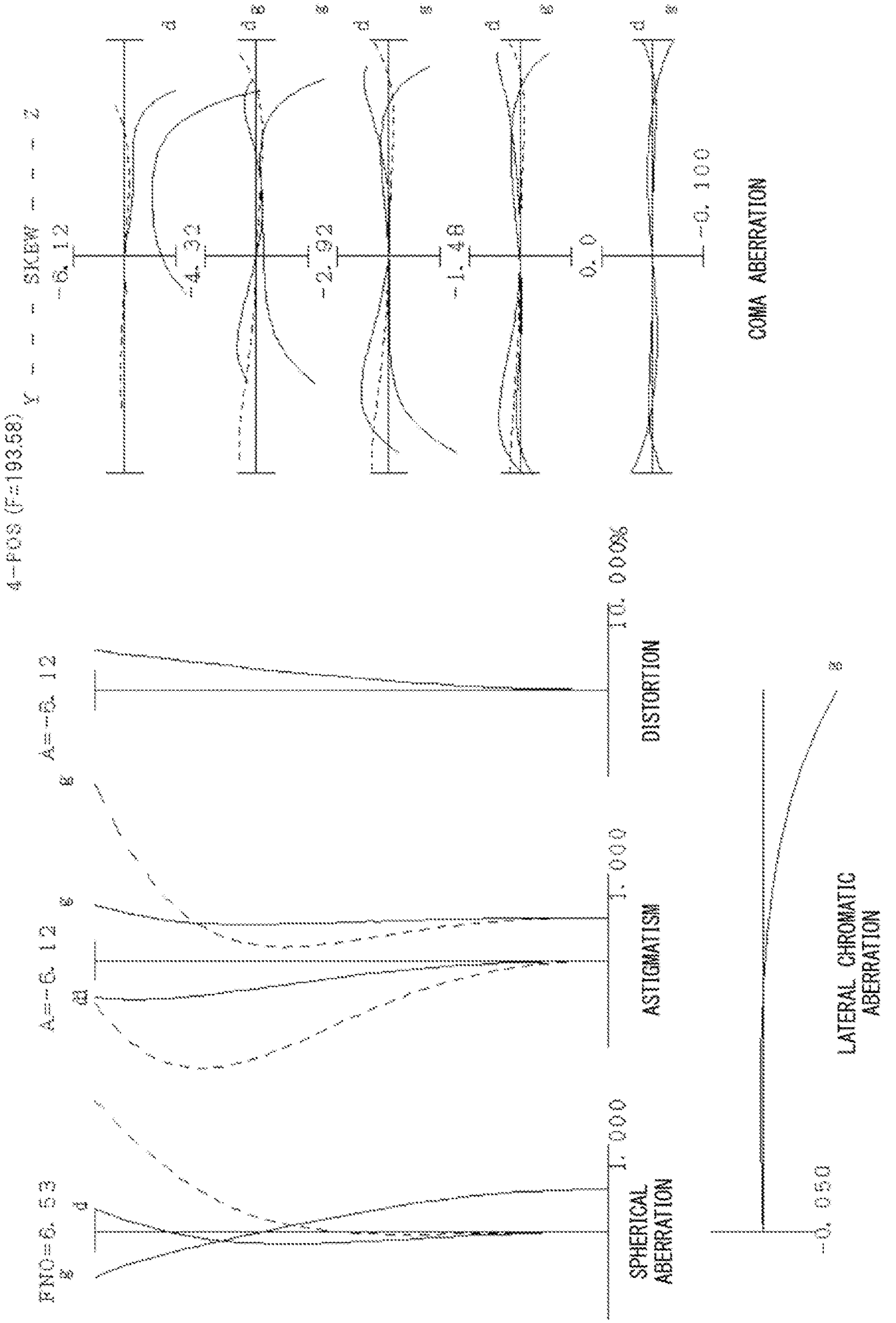
FIG. 16B shows aberrations of the variable magnification optical system of the eighth example focusing on an object at infinity in the telephoto end state.
Figure 16C:
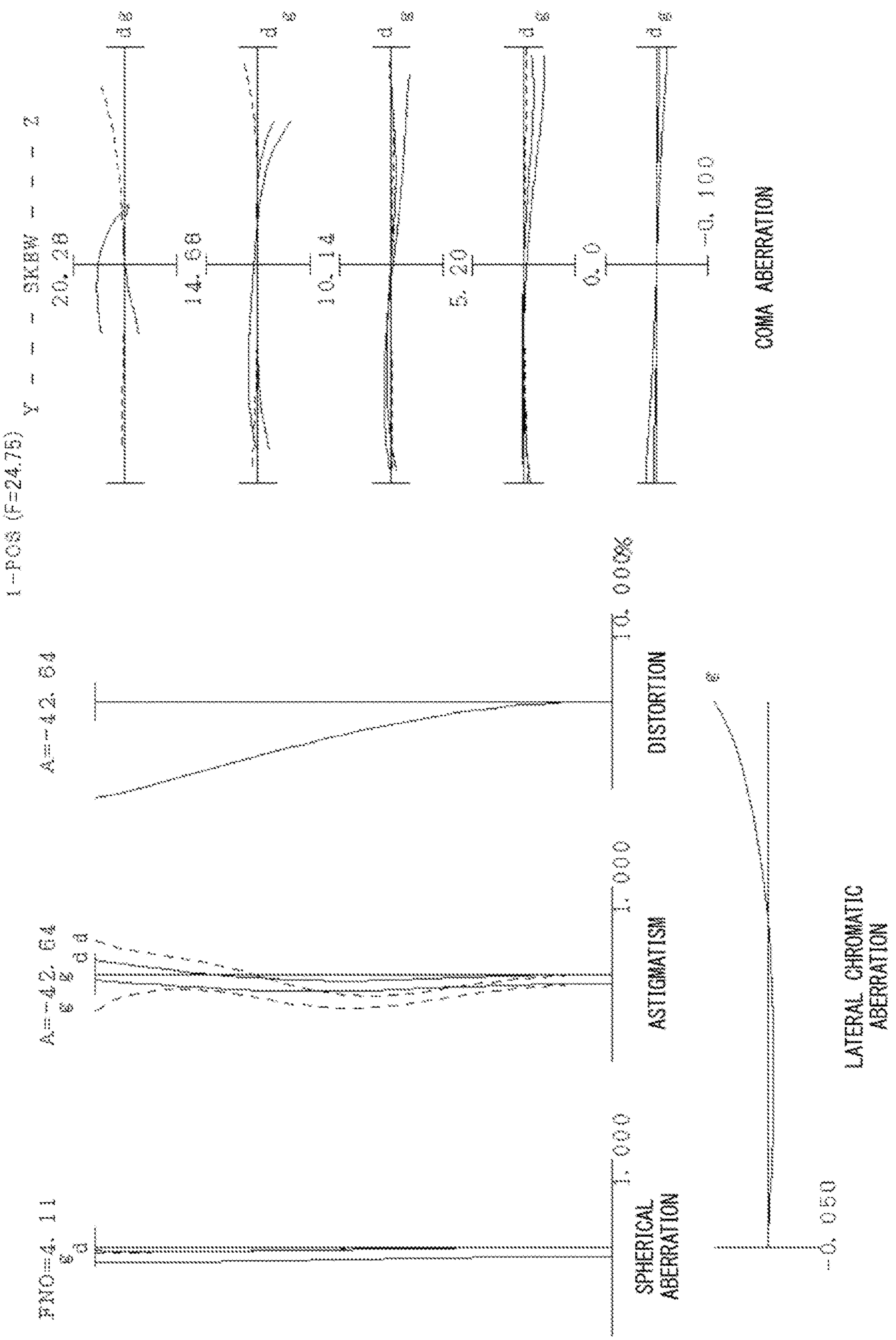
FIG. 16C shows aberrations of the variable magnification optical system of the eighth example focusing on an object at infinity in the wide-angle end state.

FIG. 16A shows aberrations of the variable magnification optical system of the eighth example focusing on an object at infinity in an intermediate focal length state. FIG. 16B shows aberrations of the variable magnification optical system of the eighth example focusing on an object at infinity in the telephoto end state. FIG. 16C shows aberrations of the variable magnification optical system of the eighth example focusing on an object at infinity in the wide-angle end state.

The graphs of aberrations suggest that the variable magnification optical system of the present example effectively reduces variations in aberrations at focusing and at varying magnification and has high optical performance.

Ninth Example

Figure 17:
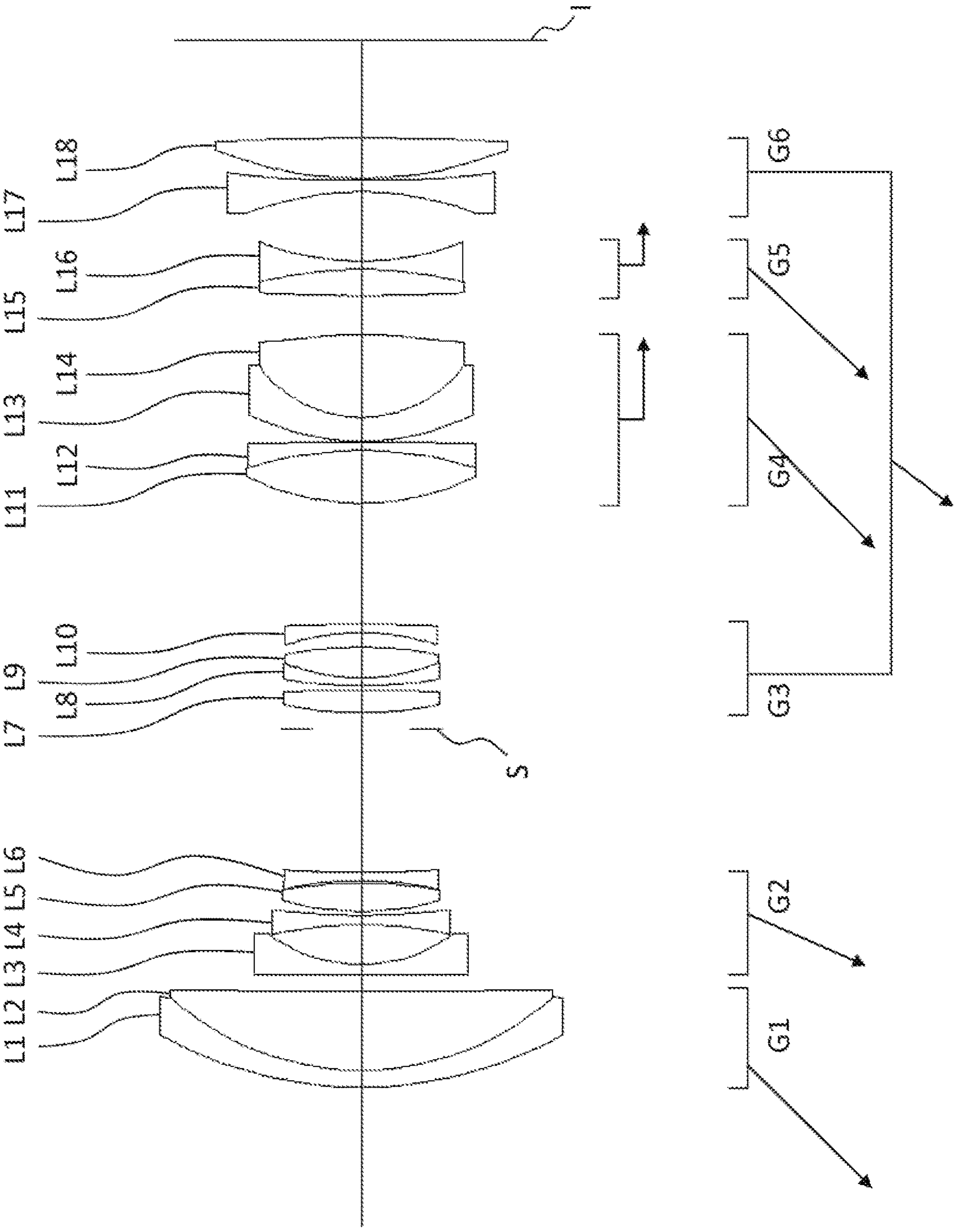
FIG. 17 is a cross-sectional view of a variable magnification optical system of a ninth example focusing on an object at infinity in the wide-angle end state.

FIG. 17 is a cross-sectional view of a variable magnification optical system of a ninth example focusing on an object at infinity in the wide-angle end state.

The variable magnification optical system of the present example includes, in order from the object side, a first lens group G1 having positive refractive power, a second lens group G2 having negative refractive power, an aperture stop S, a third lens group G3 having positive refractive power, a fourth lens group G4 having positive refractive power, a fifth lens group G5 having negative refractive power, and a sixth lens group G6 having negative refractive power.

The first lens group G1 consists of a positive cemented lens composed of, in order from the object side, a negative meniscus lens L1 convex on the object side and a positive meniscus lens L2 convex on the object side.

The second lens group G2 consists of, in order from the object side, a negative meniscus lens L3 convex on the object side, a biconcave negative lens L4, a biconvex positive lens L5, and a biconcave negative lens L6.

The third lens group G3 consists of, in order from the object side, a biconvex positive lens L7, a positive cemented lens composed of a negative meniscus lens L8 convex on the object side and a biconvex positive lens L9, and a negative meniscus lens L10 concave on the object side.

The fourth lens group G4 consists of, in order from the object side, a positive cemented lens composed of a biconvex positive lens L11 and a negative meniscus lens L12 concave on the object side as well as a positive cemented lens composed of a negative meniscus lens L13 convex on the object side and a biconvex positive lens L14.

The fifth lens group G5 consists of a negative cemented lens composed of, in order from the object side, a biconvex positive lens L15 and a biconcave negative lens L16.

The sixth lens group G6 consists of, in order from the object side, a biconcave negative lens L17 and a biconvex positive lens L18.

An imaging device (not shown) constructed from CCD, CMOS, or the like is disposed on an image plane I.

The variable magnification optical system of the present example focuses by moving the fourth lens group G4 and the fifth lens group G5 along the optical axis. When focus is shifted from infinity to a nearby object, the fourth lens group G4 and the fifth lens group G5 move from the object side toward the image side.

In the variable magnification optical system of the present example, the second lens group G2, the third lens group G3, the fourth lens group G4, the fifth lens group G5, and the sixth lens group G6 correspond to the rear group, and the sixth lens group G6 to the final lens group. The second lens group G2 corresponds to the first negative lens group, the third lens group G3 to the first positive lens group, the fourth lens group G4 to the second positive lens group, and the fifth lens group G5 to the second negative lens group. The fourth lens group G4 corresponds to the first focusing group and the positive focusing group, and the fifth lens group G5 to the second focusing group and the negative focusing group.

Table 9 below shows specifications of the variable magnification optical system of the present example.

TABLE 9

[General specifications]

| | |
|---|---|
| fw | 24.75 |
| ft | 193.60 |
| Fnow | 4.00 |
| Fnot | 6.50 |

[Lens specifications]

| m | r | d | nd | vd | (23) | (25) |
|---|---|---|---|---|---|---|
| 1) | 50.215 | 2.000 | 1.903660 | 31.27 | | |
| 2) | 34.572 | 9.588 | 1.603000 | 65.44 | | |
| 3) | 1311.519 | d3 | | | | |
| 4) | 734.769 | 1.307 | 1.953750 | 32.33 | | |
| 5) | 18.756 | 4.799 | | | | |
| 6) | −48.834 | 1.129 | 1.755000 | 52.33 | | |
| 7) | 82.569 | 0.451 | | | | |
| 8) | 35.539 | 3.409 | 1.922860 | 20.88 | P1 | |
| 9) | −55.882 | 0.297 | | | | |
| 10) | −40.429 | 1.015 | 1.816000 | 46.59 | | |
| 11) | 149.588 | d11 | | | | |
| 12> | ∞ | 2.016 | (aperture stop) | | | |
| 13) | 45.792 | 2.740 | 1.902650 | 35.72 | P1 | |
| 14) | −158.052 | 0.500 | | | | |
| 15) | 51.626 | 1.000 | 2.001000 | 29.12 | | |
| 16) | 25.348 | 3.645 | 1.579570 | 53.74 | | |
| 17) | −47.120 | 1.756 | | | | |
| 18) | −28.990 | 1.043 | 1.953750 | 32.33 | | |
| 19) | −180.881 | d19 | | | | |
| 20) | 31.325 | 6.348 | 1.834810 | 42.73 | P1 | |
| 21) | −46.677 | 1.000 | 1.903660 | 31.27 | | |
| 22) | −434.420 | 0.175 | | | | |
| 23) | 31.122 | 2.824 | 1.953750 | 32.33 | | |
| 24) | 15.393 | 10.000 | 1.497100 | 81.49 | | P2 |
| *25) | −46.610 | d25 | | | | |
| 26) | 192.398 | 3.146 | 1.846660 | 23.80 | P1 | |
| 27) | −50.784 | 1.017 | 1.851350 | 40.13 | | |
| *28) | 33.031 | d28 | | | | |
| 29) | −39.648 | 1.400 | 1.820800 | 42.51 | | |
| *30) | 237.062 | 0.232 | | | | |
| 31) | 46.735 | 4.880 | 1.683760 | 37.57 | P1 | |
| 32) | −359.761 | Bf | | | | |

TABLE 9-continued

[Aspherical surface data]

| m | K | A4 | A6 | A8 | A10 | A12 |
|---|---|---|---|---|---|---|
| 25) | 0.0000 | 3.31E−05 | −5.07E−08 | 7.86E−10 | −4.83E−12 | 1.35E−14 |
| 28) | 0.0000 | −3.68E−06 | 5.73E−08 | −1.75E−10 | −8.02E−13 | 5.32E−15 |
| 30) | 0.0000 | 7.67E−06 | −1.25E−08 | 6.72E−11 | −1.62E−13 | |

[Focal length data of groups]

| Groups | Starting surfaces | Focal lengths |
|---|---|---|
| G1 | 1 | 110.64 |
| G2 | 4 | −16.88 |
| G3 | 13 | 59.63 |
| G4 | 20 | 27.13 |
| G5 | 26 | −47.14 |
| G6 | 29 | −137.34 |

[Variable distance data]

| | Wide-angle end state | Telephoto end state |
|---|---|---|
| d3 | 1.969 | 54.765 |
| d11 | 17.288 | 1.166 |
| d19 | 14.645 | 1.478 |
| d25 | 4.685 | 2.612 |
| d28 | 8.395 | 23.634 |
| Bf | 11.793 | 37.548 |

Figure 18A:
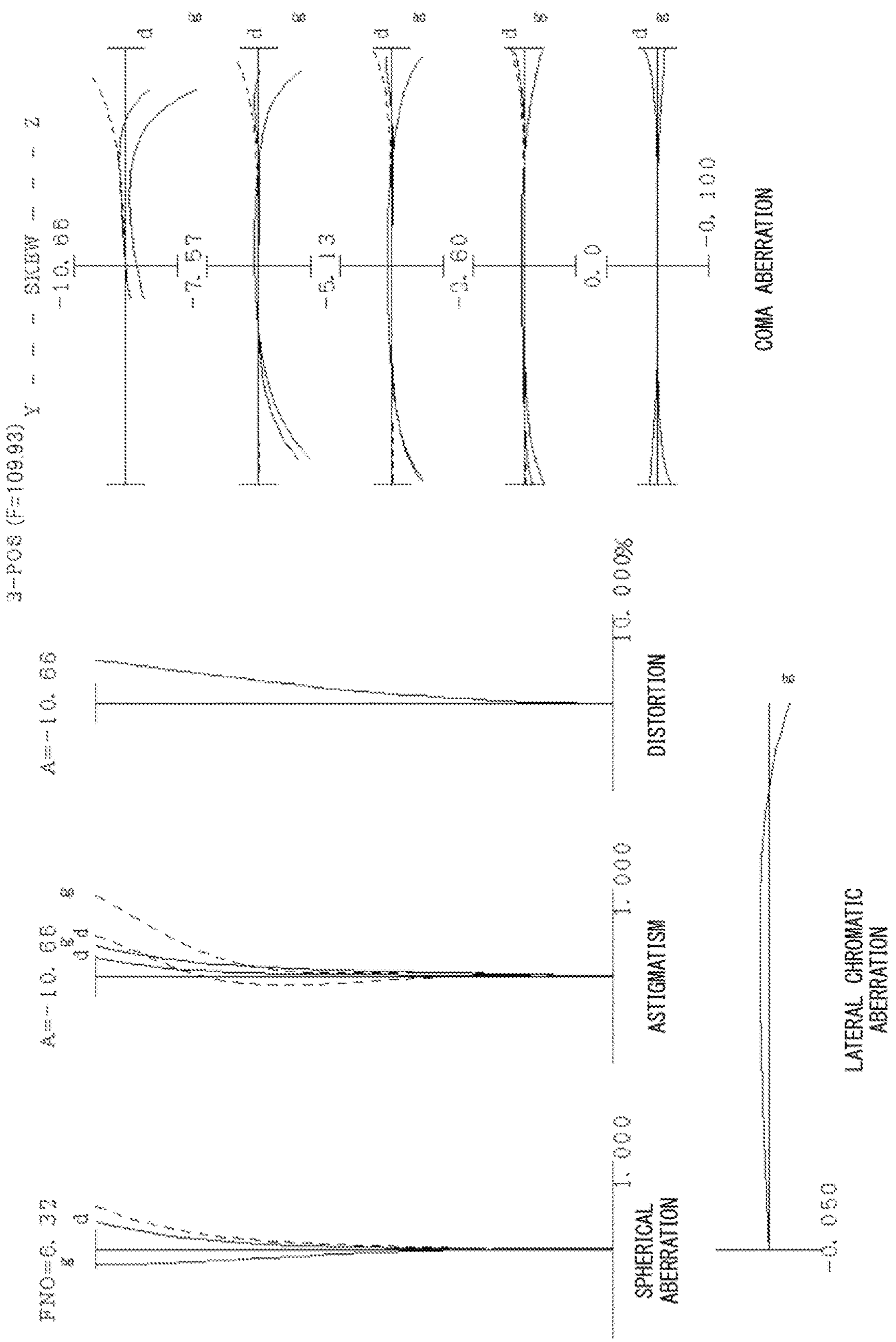
FIG. 18A shows aberrations of the variable magnification optical system of the ninth example focusing on an object at infinity in an intermediate focal length state.
Figure 18B:
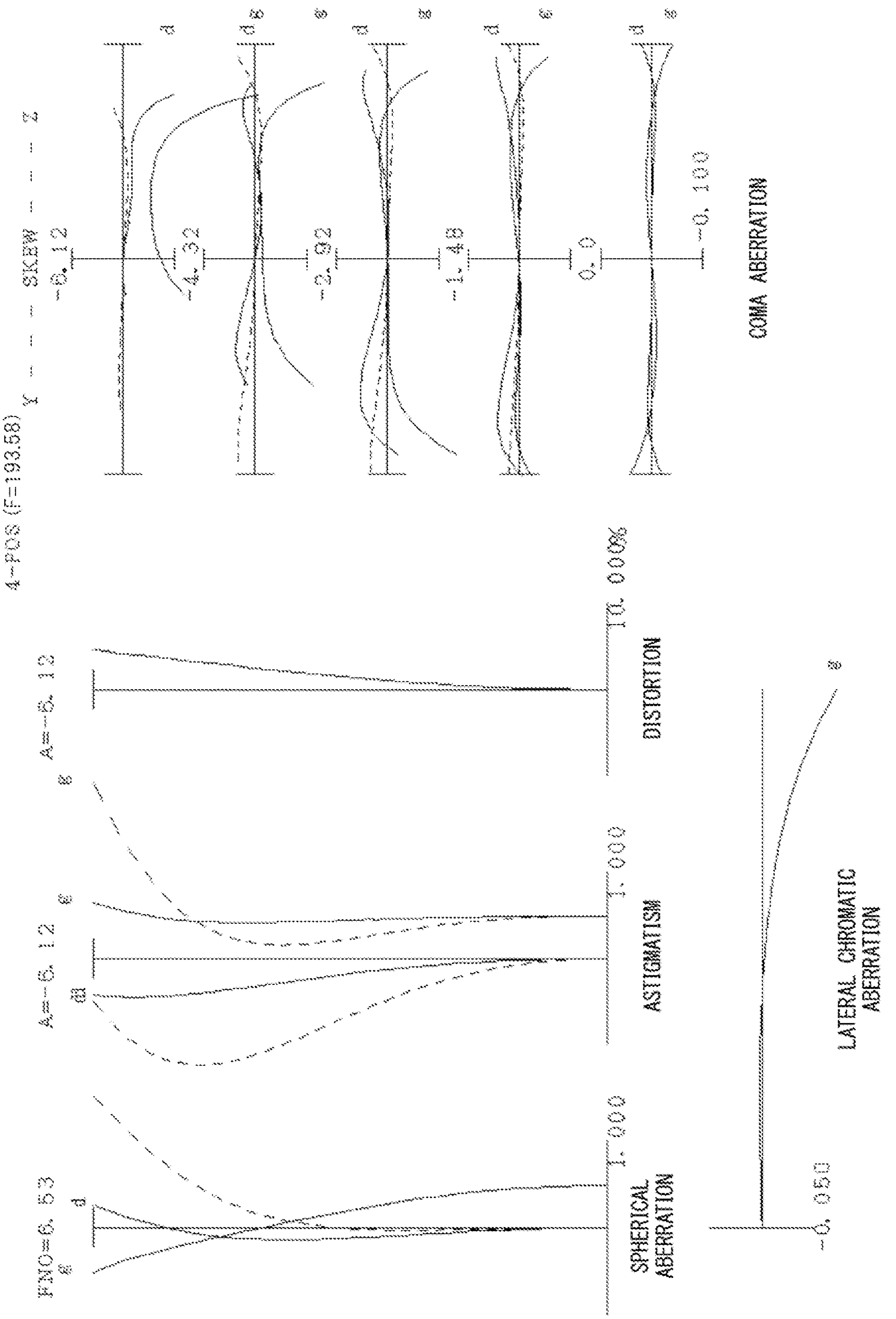
FIG. 18B shows aberrations of the variable magnification optical system of the ninth example focusing on an object at infinity in the telephoto end state.
Figure 18C:
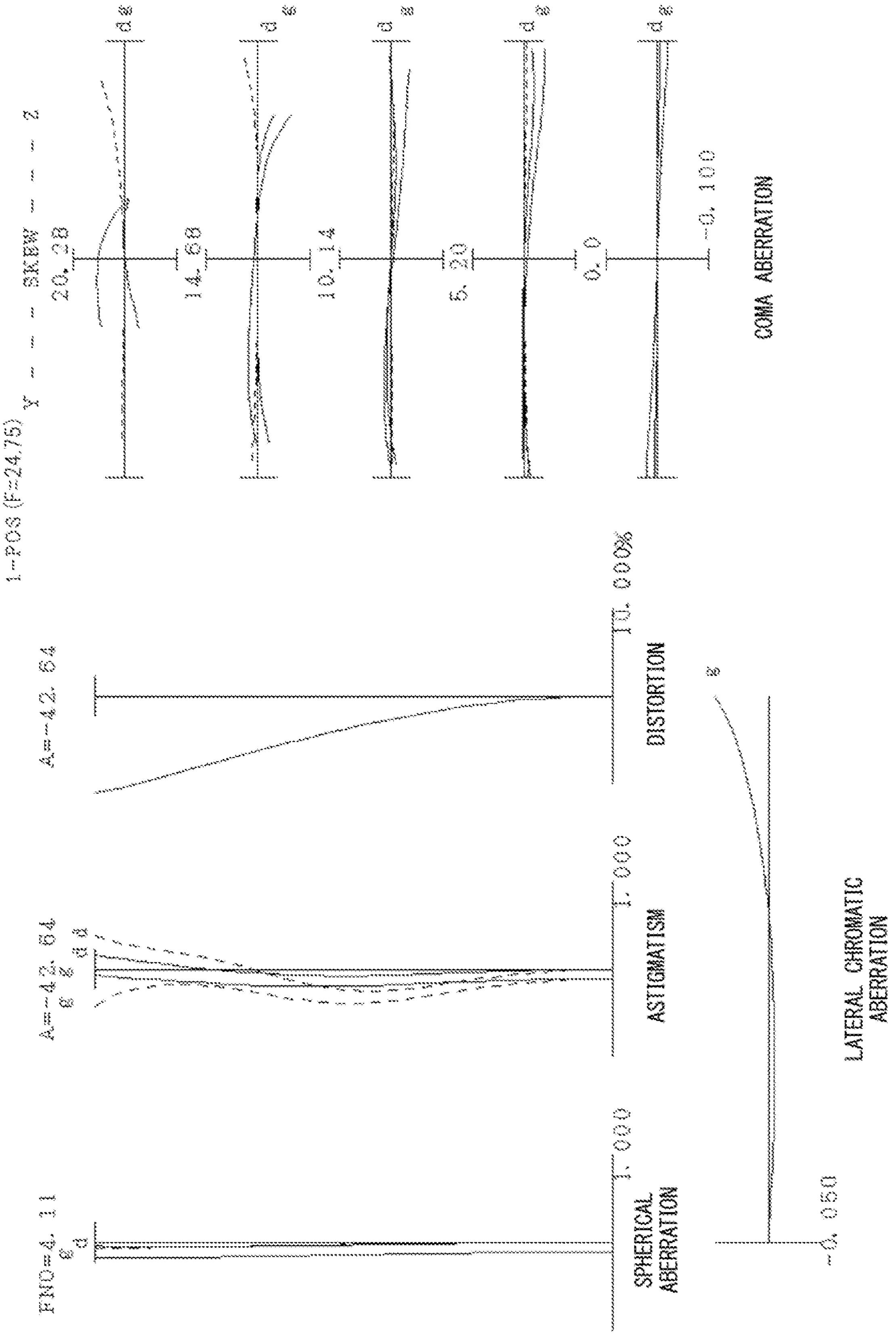
FIG. 18C shows aberrations of the variable magnification optical system of the ninth example focusing on an object at infinity in the wide-angle end state.

FIG. 18A shows aberrations of the variable magnification optical system of the ninth example focusing on an object at infinity in an intermediate focal length state. FIG. 18B shows aberrations of the variable magnification optical system of the ninth example focusing on an object at infinity in the telephoto end state. FIG. 18C shows aberrations of the variable magnification optical system of the ninth example focusing on an object at infinity in the wide-angle end state.

The graphs of aberrations suggest that the variable magnification optical system of the present example effectively reduces variations in aberrations at focusing and at varying magnification and has high optical performance.

Tenth Example

Figure 19:
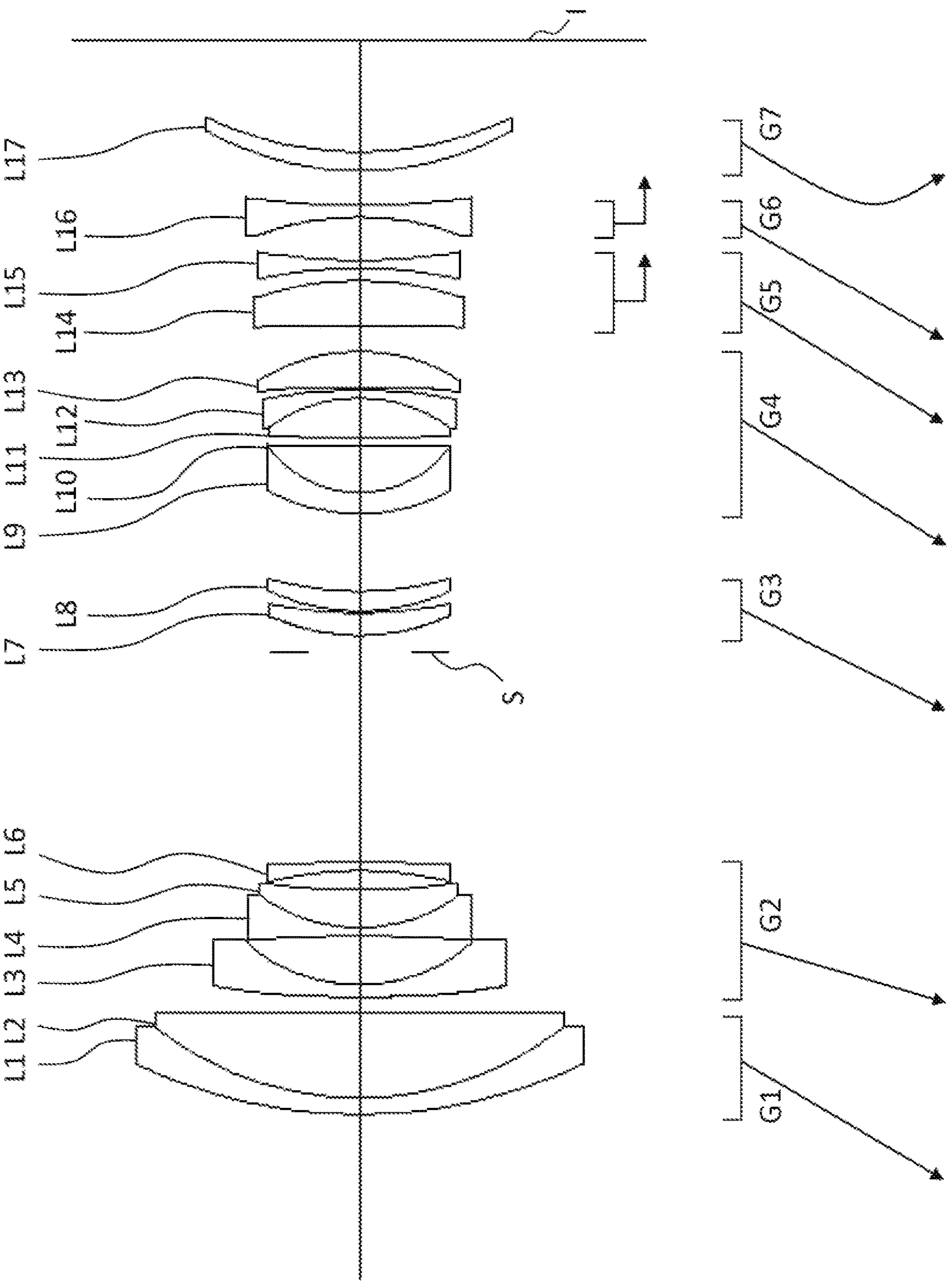
FIG. 19 is a cross-sectional view of a variable magnification optical system of a tenth example focusing on an object at infinity in the wide-angle end state.

FIG. 19 is a cross-sectional view of a variable magnification optical system of a tenth example focusing on an object at infinity in the wide-angle end state.

The variable magnification optical system of the present example includes, in order from the object side, a first lens group G1 having positive refractive power, a second lens group G2 having negative refractive power, an aperture stop S, a third lens group G3 having positive refractive power, a fourth lens group G4 having positive refractive power, a fifth lens group G5 having negative refractive power, a sixth lens group G6 having negative refractive power, and a seventh lens group G7 having positive refractive power.

The first lens group G1 consists of a positive cemented lens composed of, in order from the object side, a negative meniscus lens L1 convex on the object side and a positive meniscus lens L2 convex on the object side.

The second lens group G2 consists of, in order from the object side, a negative meniscus lens L3 convex on the object side, a positive cemented lens composed of a biconcave negative lens L4 and a positive meniscus lens L5 convex on the object side, and a negative meniscus lens L6 concave on the object side.

The third lens group G3 consists of, in order from the object side, a positive meniscus lens L7 convex on the object side and a positive meniscus lens L8 convex on the object side.

The fourth lens group G4 consists of, in order from the object side, a positive cemented lens composed of a negative meniscus lens L9 convex on the object side and a positive meniscus lens L10 convex on the object side, a negative cemented lens composed of a biconvex positive lens L11 and a negative meniscus lens L12 concave on the object side, and a biconvex positive lens L13.

The fifth lens group G5 consists of, in order from the object side, a positive meniscus lens L14 concave on the object side and a biconcave negative lens L15.

The sixth lens group G6 consists of a biconcave negative lens L16.

The seventh lens group G7 consists of a positive meniscus lens L17 convex on the object side.

An imaging device (not shown) constructed from CCD, CMOS, or the like is disposed on an image plane I.

The variable magnification optical system of the present example focuses by moving the fifth lens group G5 and the sixth lens group G6 along the optical axis. When focus is shifted from infinity to a nearby object, the fifth lens group G5 and the sixth lens group G6 move from the object side toward the image side.

In the variable magnification optical system of the present example, the second lens group G2, the third lens group G3, the fourth lens group G4, the fifth lens group G5, the sixth lens group G6, and the seventh lens group G7 correspond to the rear group, and the seventh lens group G7 to the final lens group. The second lens group G2 corresponds to the first negative lens group, the third lens group G3 to the first positive lens group, the fourth lens group G4 to the second positive lens group, and the fifth lens group G5 to the second negative lens group. The fifth lens group G5 corresponds to the first focusing group, the sixth lens group G6 to the second focusing group, and the fifth lens group G5 and the sixth lens group G6 to the negative focusing group.

Table 10 below shows specifications of the variable magnification optical system of the present example.

TABLE 10

[General specifications]

| | |
|---|---|
| fw | 28.00 |
| ft | 194.00 |
| Fnow | 4.37 |
| Fnot | 6.57 |

[Lens specifications]

| m | r | d | nd | vd | (23) | (24) | (25) |
|---|---|---|---|---|---|---|---|
| 1) | 63.743 | 2.000 | 1.749500 | 35.25 | | | |
| 2) | 40.141 | 10.350 | 1.593190 | 67.90 | | | |
| 3) | 9735.642 | d3 | | | | | |
| *4) | 158.701 | 1.500 | 1.773870 | 47.25 | | | |
| *5) | 22.089 | 5.915 | | | | | |
| 6) | −167.771 | 1.000 | 1.497820 | 82.57 | | N | |
| 7) | 20.719 | 4.566 | 1.850000 | 27.03 | P1 | | |
| 8) | 79.584 | 2.363 | | | | | |
| 9) | −46.857 | 1.834810 | 42.73 | | | | |
| 10) | −393.371 | d10 | | | | | |
| 11> | ∞ | 2.000 | (aperture stop) | | | | |
| *12) | 25.238 | 2.790 | 1.592450 | 66.92 | | | P2 |
| 13) | 59.114 | 0.200 | | | | | |
| 14) | 26.374 | 2.366 | 1.617720 | 49.81 | | | |
| 15) | 38.522 | d15 | | | | | |
| 16) | 23.189 | 2.580 | 1.902650 | 35.77 | | | |
| 17) | 13.857 | 5.703 | 1.497820 | 82.57 | | | P2 |
| 18) | 693.648 | 1.004 | | | | | |
| 19) | 752.104 | 4.789 | 1.517420 | 52.20 | | | |
| 20) | −18.856 | 1.000 | 2.000690 | 25.46 | | | |
| 21) | −60.570 | 0.200 | | | | | |
| *22) | 443.772 | 4.473 | 1.517420 | 52.20 | | | |
| 23) | −23.063 | d23 | | | | | |
| 24) | −308.609 | 5.485 | 1.945944 | 17.98 | | | |
| 25) | −37.228 | 1.504 | | | | | |
| 26) | −58.034 | 1.000 | 1.834000 | 37.18 | | | |
| 27) | 84.476 | d27 | | | | | |
| *28) | −39.484 | 1.500 | 1.773870 | 47.25 | | | |
| 29) | 108.384 | d29 | | | | | |
| 30) | 38.120 | 2.261 | 1.834000 | 37.18 | | | |
| 31) | 43.033 | Bf | | | | | |

[Aspherical surface data]

| m | K | A4 | A6 | A8 | A10 |
|---|---|---|---|---|---|
| 4) | 0.0000 | 7.29E−07 | 2.06E−08 | −4.49E−11 | 2.79E−14 |
| 5) | 0.0000 | 2.28E−06 | 3.23E−08 | 4.83E−11 | 2.02E−13 |
| 12) | 0.0000 | −9.41E−06 | −1.09E−09 | 4.05E−11 | −1.20E−13 |
| 22) | 0.0000 | −3.09E−05 | 2.57E−08 | −7.88E−12 | 3.97E−13 |
| 28) | 0.0000 | −6.15E−06 | −1.61E−08 | 3.82E−11 | −1.85E−14 |

[Focal length data of groups]

| Groups | Starting surfaces | Focal lengths |
|---|---|---|
| G1 | 1 | 127.24 |
| G2 | 4 | −21.51 |
| G3 | 12 | 45.92 |
| G4 | 16 | 42.44 |
| G5 | 24 | −980.13 |
| G6 | 28 | −37.23 |
| G7 | 30 | 331.08 |

[Variable distance data]

| | Wide-angle end state | Telephoto end state |
|---|---|---|
| d3 | 2.000 | 51.261 |
| d10 | 25.674 | 2.000 |
| d15 | 9.525 | 2.000 |
| d23 | 3.205 | 2.269 |
| d27 | 5.176 | 5.639 |
| d29 | 4.174 | 37.020 |
| Bf | 13.579 | 36.718 |

Figure 20A:
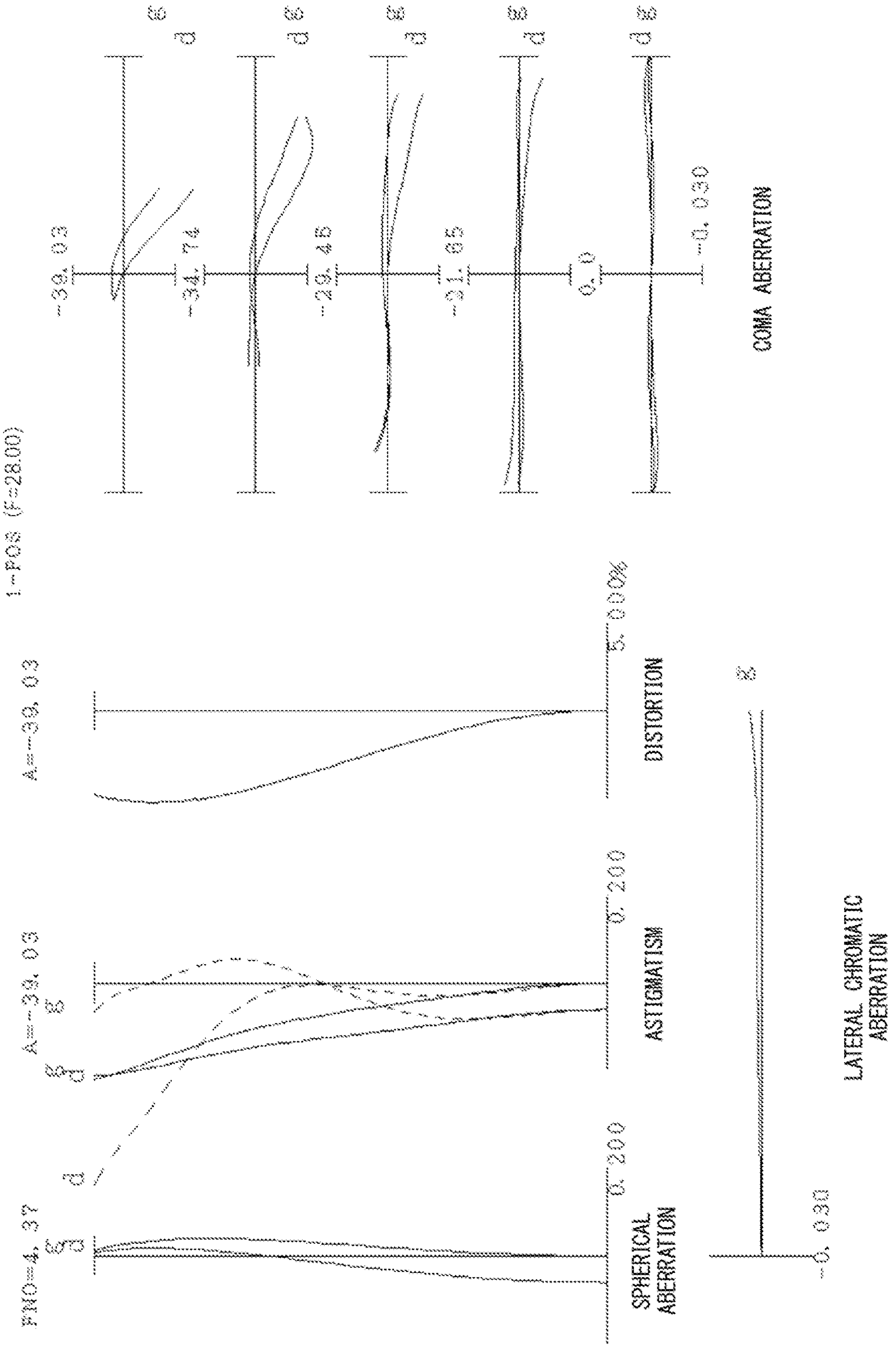
FIG. 20A shows aberrations of the variable magnification optical system of the tenth example focusing on an object at infinity in the wide-angle end state.
Figure 20B:
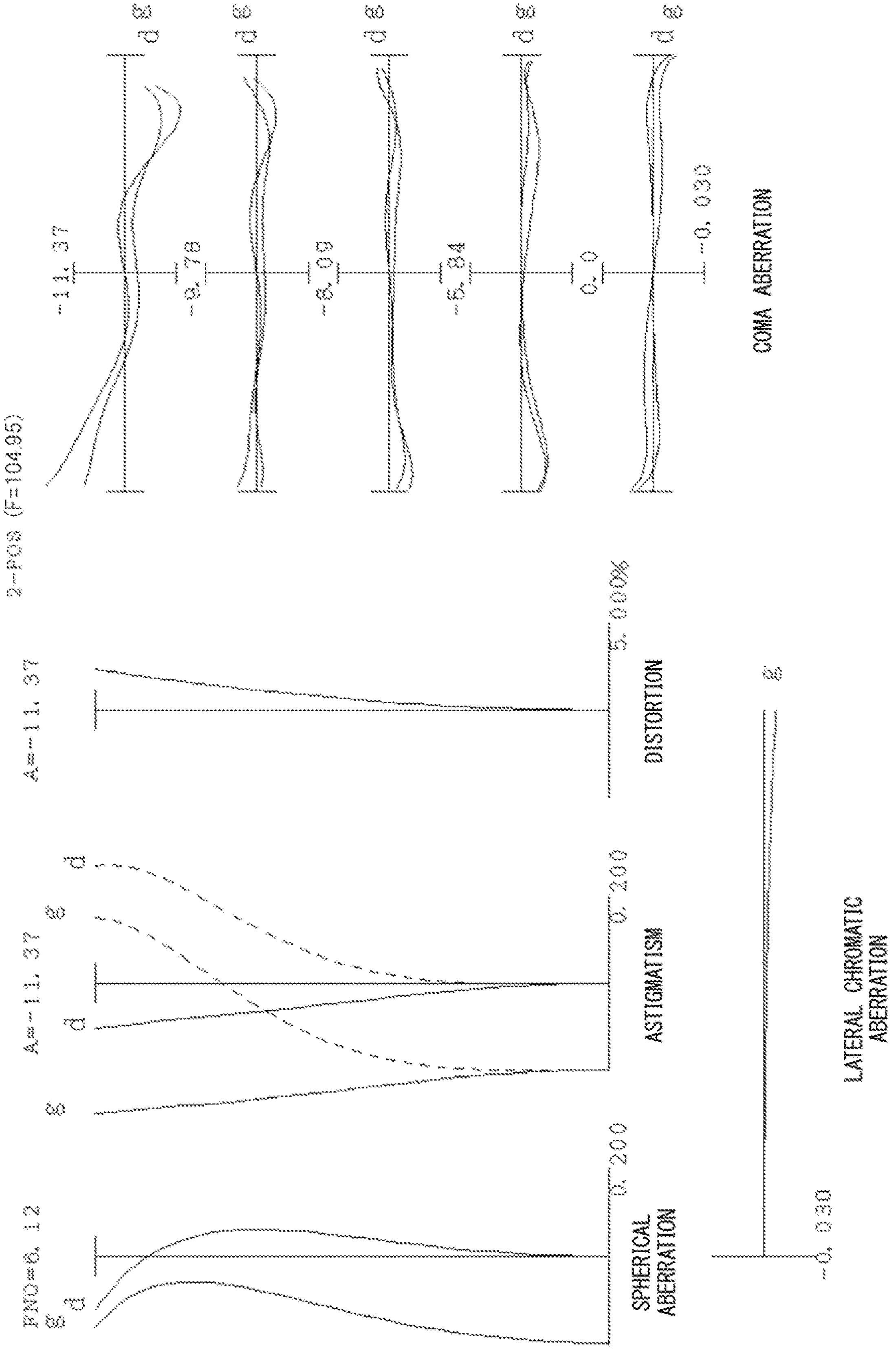
FIG. 20B shows aberrations of the variable magnification optical system of the tenth example focusing on an object at infinity in an intermediate focal length state.
Figure 20C:
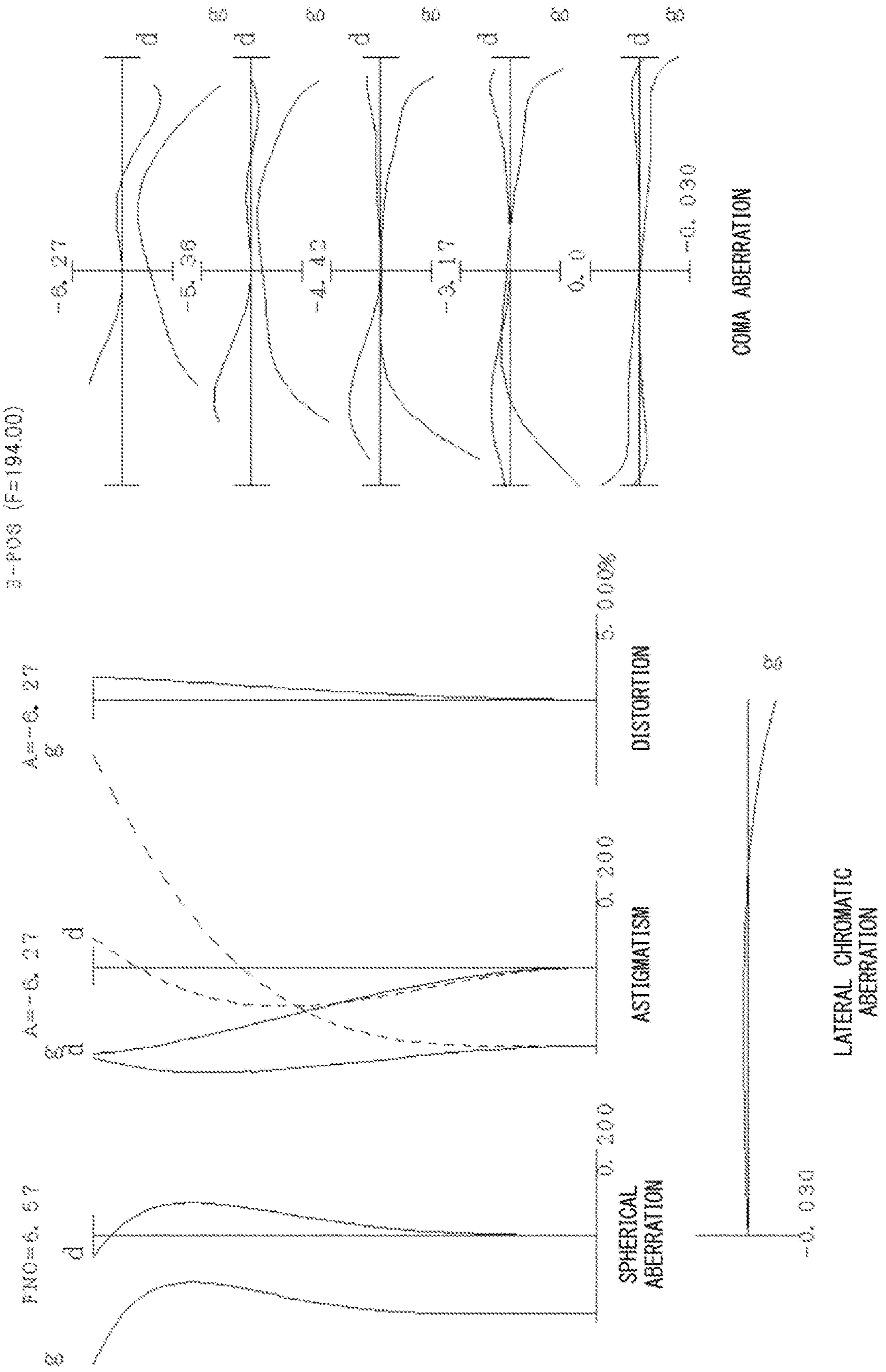
FIG. 20C shows aberrations of the variable magnification optical system of the tenth example focusing on an object at infinity in the telephoto end state.

FIG. 20A shows aberrations of the variable magnification optical system of the tenth example focusing on an object at infinity in the wide-angle end state. FIG. 20B shows aberrations of the variable magnification optical system of the tenth example focusing on an object at infinity in an intermediate focal length state. FIG. 20C shows aberrations of the variable magnification optical system of the tenth example focusing on an object at infinity in the telephoto end state.

The graphs of aberrations suggest that the variable magnification optical system of the present example effectively reduces variations in aberrations at focusing and at varying magnification and has high optical performance.

Eleventh Example

Figure 21:
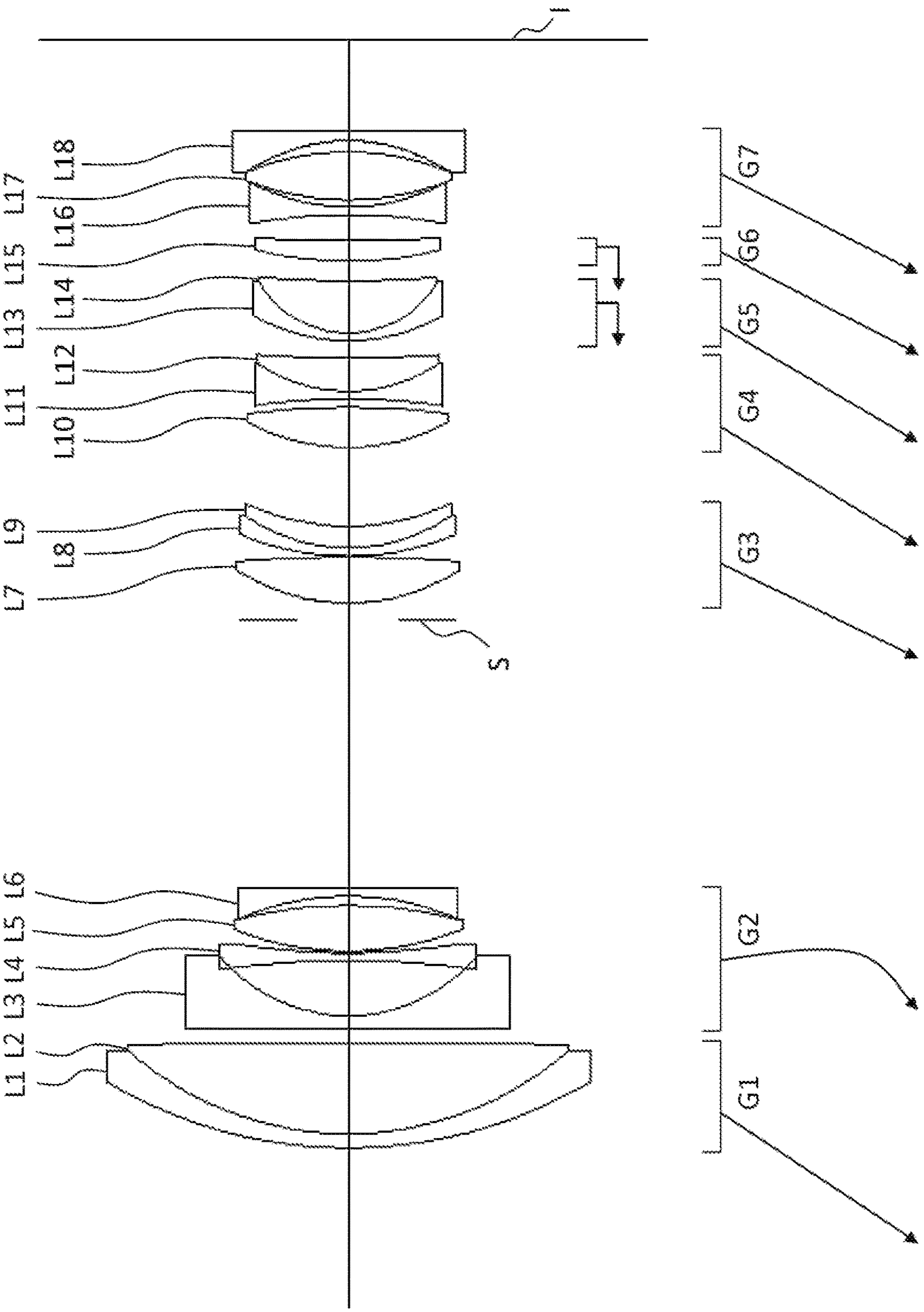
FIG. 21 is a cross-sectional view of a variable magnification optical system of an eleventh example focusing on an object at infinity in the wide-angle end state.

FIG. 21 is a cross-sectional view of a variable magnification optical system of an eleventh example focusing on an object at infinity in the wide-angle end state.

The variable magnification optical system of the present example includes, in order from the object side, a first lens group G1 having positive refractive power, a second lens group G2 having negative refractive power, an aperture stop S, a third lens group G3 having positive refractive power, a fourth lens group G4 having negative refractive power, a fifth lens group G5 having positive refractive power, a sixth lens group G6 having positive refractive power, and a seventh lens group G7 having negative refractive power.

The first lens group G1 consists of a positive cemented lens composed of, in order from the object side, a negative meniscus lens L1 convex on the object side and a biconvex positive lens L2.

The second lens group G2 consists of, in order from the object side, a biconcave negative lens L3, a biconcave negative lens L4, a biconvex positive lens L5, and a biconcave negative lens L6.

The third lens group G3 consists of, in order from the object side, a biconvex positive lens L7 and a negative cemented lens composed of a negative meniscus lens L8 convex on the object side and a positive meniscus lens L9 convex on the object side.

The fourth lens group G4 consists of, in order from the object side, a biconvex positive lens L10 and a negative cemented lens composed of a biconcave negative lens L11 and a positive meniscus lens L12 convex on the object side.

The fifth lens group G5 consists of a positive cemented lens composed of, in order from the object side, a negative meniscus lens L13 convex on the object side and a positive meniscus lens L14 convex on the object side.

The sixth lens group G6 consists of a biconvex positive lens L15.

The seventh lens group G7 consists of, in order from the object side, a biconcave negative lens L16, a biconvex positive lens L17, and a planoconcave negative lens L18 concave on the object side.

An imaging device (not shown) constructed from CCD, CMOS, or the like is disposed on an image plane I.

The variable magnification optical system of the present example focuses by moving the fifth lens group G5 and the sixth lens group G6 along the optical axis. When focus is shifted from infinity to a nearby object, the fifth lens group G5 and the sixth lens group G6 move from the image side toward the object side.

In the variable magnification optical system of the present example, the second lens group G2, the third lens group G3, the fourth lens group G4, the fifth lens group G5, the sixth lens group G6, and the seventh lens group G7 correspond to the rear group, and the seventh lens group G7 to the final lens group. The second lens group G2 corresponds to the first negative lens group, the third lens group G3 to the first positive lens group, the fourth lens group G4 to the second negative lens group, and the fifth lens group G5 to the second positive lens group. The fifth lens group G5 corresponds to the first focusing group, the sixth lens group G6 to the second focusing group, and the fifth lens group G5 and the sixth lens group G6 to the positive focusing group. Table 11 below shows specifications of the variable magnification optical system of the present example.

TABLE 11

| [General specifications] | |
|---|---|
| fw | 24.70 |
| ft | 233.00 |
| Fnow | 4.50 |
| Fnot | 6.57 |

[Lens specifications]

| m | r | d | nd | vd | (23) | (25) |
|---|---|---|---|---|---|---|
| 1) | 59.540 | 1.800 | 1.902650 | 35.77 | | |
| 2) | 41.859 | 11.321 | 1.593190 | 67.90 | | |
| 3) | −1956.315 | d3 | | | | |
| *4) | −379.614 | 1.500 | 1.773870 | 47.25 | | |
| 5) | 21.088 | 6.883 | | | | |
| 6) | −118.229 | 1.000 | 1.950000 | 29.37 | | |
| 7) | 89.211 | 0.200 | | | | |
| 8) | 38.887 | 5.729 | 1.860740 | 23.08 | P1 | |
| 9) | −55.015 | 1.189 | | | | |
| 10) | −34.049 | 1.000 | 1.816000 | 46.59 | | |
| 11) | 19309.949 | d11 | | | | |
| 12> | ∞ | 2.000 | (aperture stop) | | | |
| *13) | 23.950 | 5.797 | 1.592450 | 66.92 | | P2 |
| 14) | −162.098 | 0.200 | | | | |
| 15) | 35.893 | 1.000 | 1.834810 | 42.73 | | |
| 16) | 22.737 | 2.714 | 1.592700 | 35.27 | P1 | |
| 17) | 30.251 | d17 | | | | |
| 18) | 26.148 | 5.048 | 1.593190 | 67.90 | | P2 |
| 19) | −98.728 | 1.059 | | | | |

TABLE 11-continued

| | | | | | |
|---|---|---|---|---|---|
| 20) | −84.013 | 1.000 | 2.000690 | 25.46 | |
| 21) | 20.844 | 4.119 | 1.593190 | 67.90 | |
| 22) | 163.041 | d22 | | | |
| 23) | 23.630 | 1.000 | 1.902650 | 35.77 | |
| 24) | 12.909 | 6.589 | 1.728250 | 28.38 | |
| 25) | 150.766 | d25 | | | |
| 26) | 48.329 | 2.746 | 1.548141 | 45.78 | P1 |
| *27) | −404.148 | d27 | | | |
| 28) | −65.371 | 1.000 | 1.816000 | 46.59 | |
| 29) | 26.189 | 0.850 | | | |
| 30) | 34.959 | 6.023 | 1.688930 | 31.16 | P1 |
| 31) | −33.122 | 1.371 | | | |
| *32) | −22.123 | 1.300 | 1.773870 | 47.25 | |
| 33) | ∞ | Bf | | | |

[Aspherical surface data]

| m | K | A4 | A6 | A8 | A10 |
|---|---|---|---|---|---|
| 4) | 0.0000 | 2.64E−06 | −1.77E−09 | 5.14E−12 | −3.69E−15 |
| 13) | 0.0000 | −1.00E−05 | −3.09E−09 | −1.67E−11 | −9.99E−15 |
| 27) | 0.0000 | 2.31E−05 | −1.32E−09 | −3.88E−11 | −1.96E−12 |
| 32) | 0.0000 | 6.59E−06 | 1.96E−08 | −1.08E−10 | 5.11E−13 |

[Focal length data of groups]

| Groups | Starting surfaces | Focal lengths |
|---|---|---|
| G1 | 1 | 122.62 |
| G2 | 4 | −21.74 |
| G3 | 13 | 41.87 |
| G4 | 18 | −326.91 |
| G5 | 23 | 48.34 |
| G6 | 26 | 78.92 |
| G7 | 28 | −25.48 |

[Variable distance data]

| | Wide-angle end state | Telephoto end state |
|---|---|---|
| d3 | 2.000 | 51.859 |
| d11 | 33.722 | 2.003 |
| d17 | 9.826 | 2.000 |
| d22 | 2.157 | 3.750 |
| d25 | 2.446 | 6.907 |
| d27 | 3.087 | 2.700 |
| Bf | 11.455 | 67.126 |

Figure 22A:
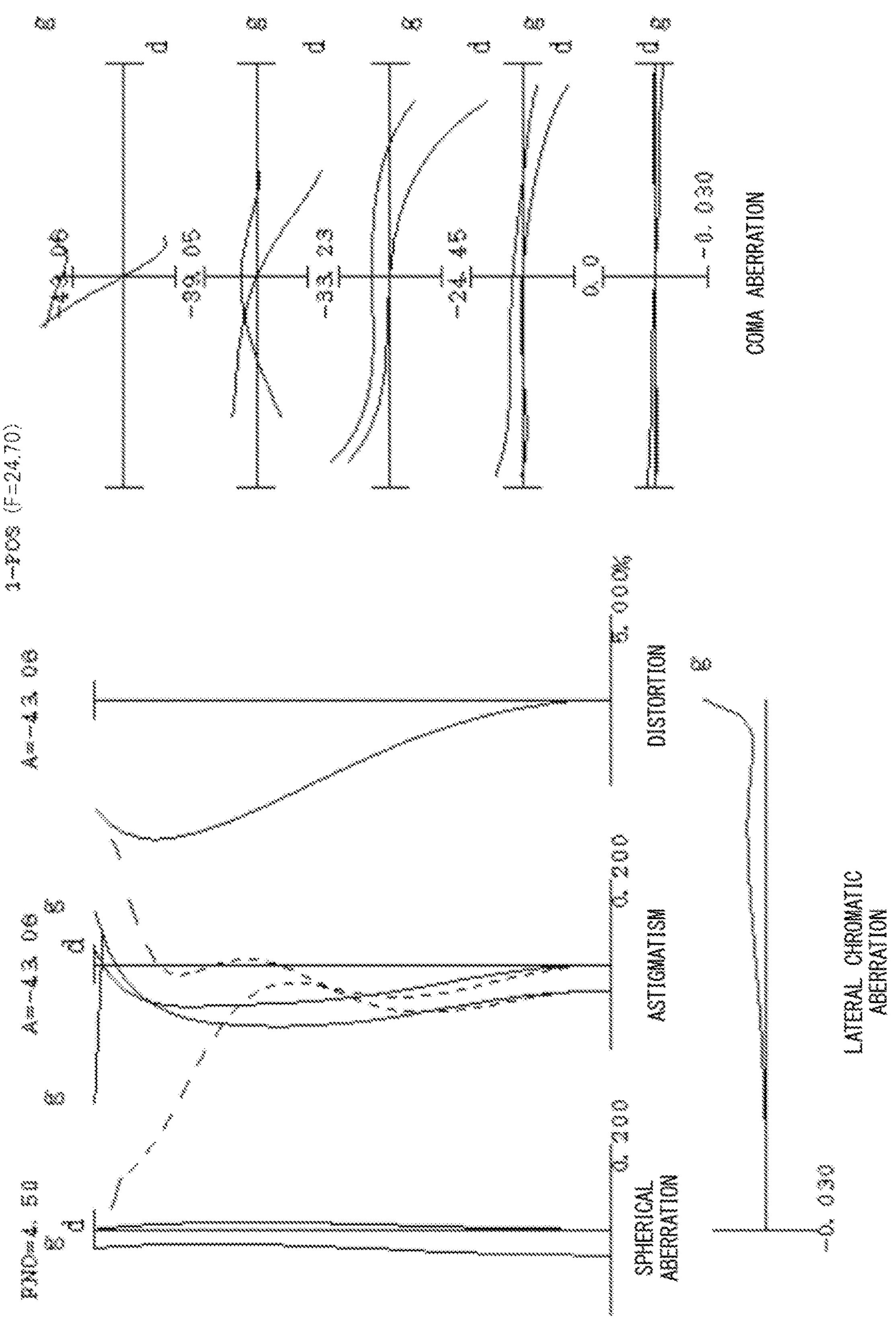
FIG. 22A shows aberrations of the variable magnification optical system of the eleventh example focusing on an object at infinity in the wide-angle end state.
Figure 22B:
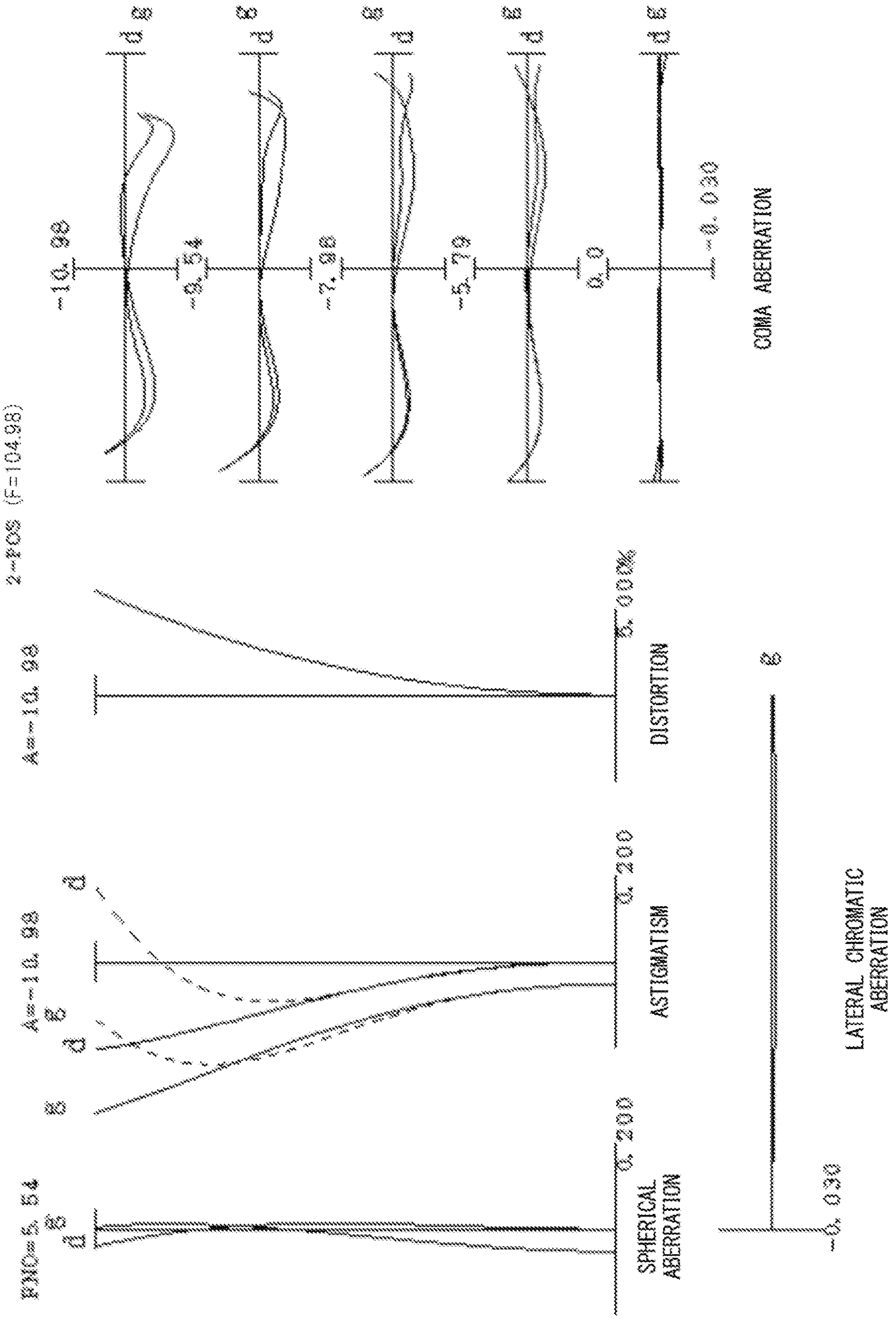
FIG. 22B shows aberrations of the variable magnification optical system of the eleventh example focusing on an object at infinity in an intermediate focal length state.
Figure 22C:
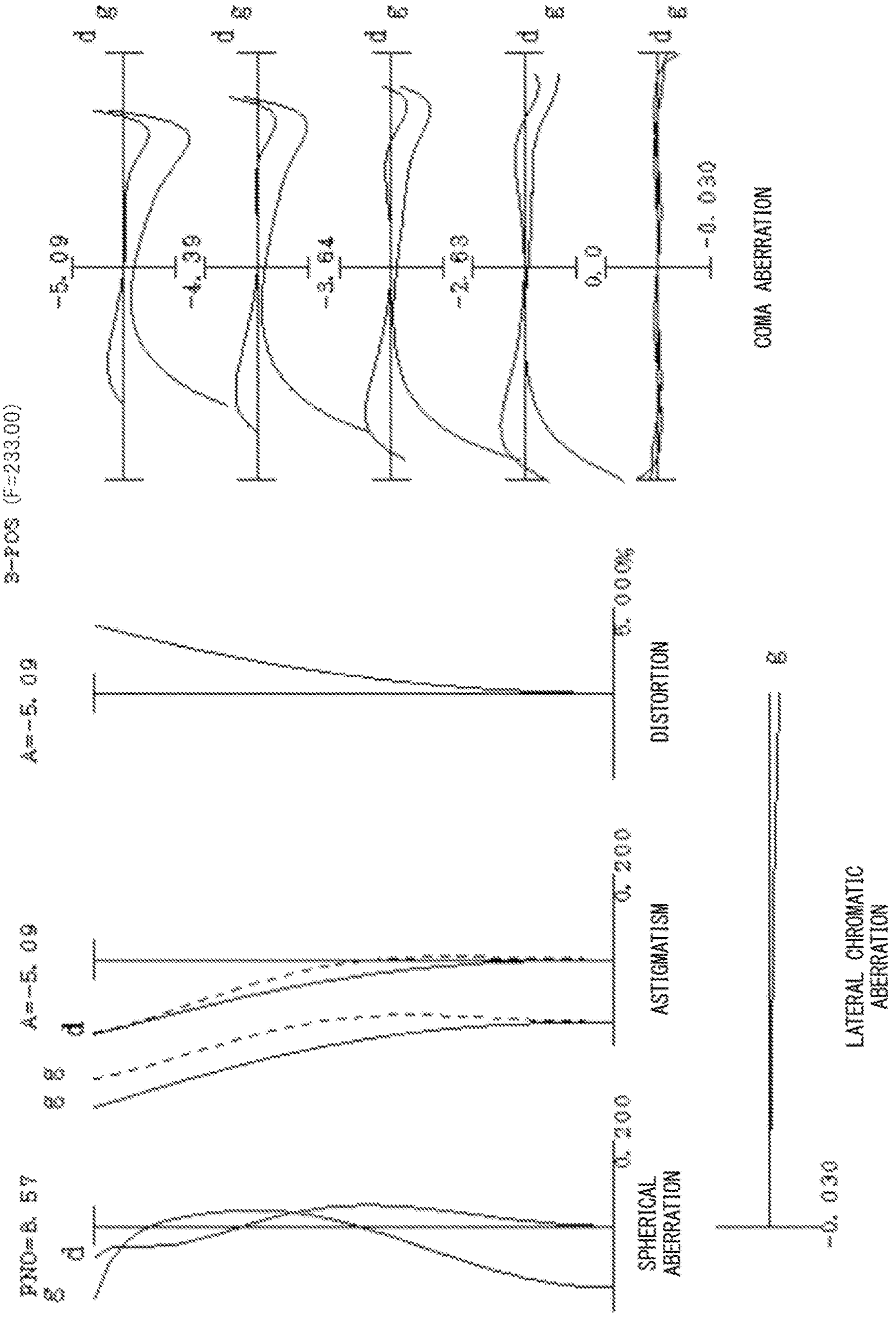
FIG. 22C shows aberrations of the variable magnification optical system of the eleventh example focusing on an object at infinity in the telephoto end state.

FIG. 22A shows aberrations of the variable magnification optical system of the eleventh example focusing on an object at infinity in the wide-angle end state. FIG. 22B shows aberrations of the variable magnification optical system of the eleventh example focusing on an object at infinity in an intermediate focal length state. FIG. 22C shows aberrations of the variable magnification optical system of the eleventh example focusing on an object at infinity in the telephoto end state.

The graphs of aberrations suggest that the variable magnification optical system of the present example effectively reduces variations in aberrations at focusing and at varying magnification and has high optical performance.

A variable magnification optical system of favorable optical performance can be achieved according to the above examples.

Values for the conditional expressions of the examples are listed below.

f1 is the focal length of the first lens group, D1 is the thickness of the first lens group on an optical axis, and M1 is the amount of movement of the first lens group at varying magnification from a wide-angle end state to a telephoto end state. IN1, IN2, fP1, and fP2 are the focal lengths of the first negative lens group, the second negative lens group, the first positive lens group, and the second positive lens group, respectively. MP1 is the amount of movement of the first positive lens group at varying magnification from the wide-angle end state to the telephoto end state, and MN1 is the amount of movement of the first negative lens group at varying magnification from the wide-angle end state to the telephoto end state. fFP is the focal length of the positive focusing group, and fRPw is a combined focal length in the wide-angle end state of one or more lens groups disposed closer to the image side than the positive focusing group. IFN is the focal length of the negative focusing group, and fRNw is a combined focal length in the wide-angle end state of one or more lens groups disposed closer to the image side than the negative focusing group. fR is the focal length of the final lens group. nd1 is the refractive index for d-line of the lens in the first lens group, and vd1 is the Abbe number for d-line of the lens in the first lens group. r1 is the radius of curvature of an object-side lens surface of the lens disposed closest to the image side, and r2 is the radius of curvature of an image-side lens surface of the lens disposed closest to the image side. fN is the focal length of a lens group having the weakest refractive power of lens groups having negative refractive power in the rear group, and Fnot is the f-number of the variable magnification optical system in the telephoto end state. Bfw is the back focus of the variable magnification optical system in the wide-angle end state, and fw is the focal length of the variable magnification optical system in the wide-angle end state. fF1 is the focal length of the first focusing group, and fF2 is the focal length of the second focusing group. κdP1 is the Abbe number for d-line of the positive lens in the rear group, κdN is the Abbe number for d-line of the negative lens in the rear group, and κdP2 is the Abbe number for d-line of the positive lens in the rear group.

Values for Conditional Expressions

| | Examples | | | | | |
|---|---|---|---|---|---|---|
| Conditional expressions | 1st | 2nd | 3rd | 4th | 5th | 6th |
| (1) f1/D1 | 13.049 | 11.997 | 19.776 | 23.460 | 12.316 | 11.866 |
| (2) M1/D1 | 2.757 | 2.946 | 9.731 | 10.557 | 4.959 | 4.745 |
| (3) f1/(−fN1) | 5.679 | 3.777 | 4.645 | 4.878 | 5.677 | 5.938 |
| (4) f1/(−fN2) | 2.898 | 1.512 | 2.208 | 2.809 | 3.508 | 2.399 |
| (5) fN1/fN2 | 0.510 | 0.400 | 0.475 | 0.576 | 0.618 | 0.404 |
| (6) f1/fP1 | 3.178 | 3.116 | 1.502 | 1.284 | 2.298 | 4.379 |
| (7) fP1/(−fN1) | 1.787 | 1.212 | 3.092 | 3.798 | 2.470 | 1.356 |
| (8) MP1/MN1 | 16.793 | 5.337 | 2.278 | 2.641 | 3.218 | 3.280 |
| (9) fP1/fP2 | 0.391 | 0.922 | 1.977 | 3.173 | 0.881 | 0.817 |
| (10) f1/fFP | 1.117<br>1.418 | 2.873 | — | 1.453 | 1.006<br>1.715 | — |
| (11) fFP/fRPw | −1.109<br>−2.043 | −1.200 | — | −0.719 | −1.361<br>−2.046 | — |
| (12) f1/(−fFN) | — | 1.512 | 2.208 | 2.809 | — | 3.751 |
| (13) (−fFN)/fRNw | — | −1.171 | 0.474 | 0.215 | — | 0.269 |
| (14) f1/(−fR) | 2.898 | 1.770 | 2.094 | 2.457 | 3.508 | — |
| (15) f1/fR | — | — | — | — | — | 1.009 |
| (16) nd1 | 1.855<br>1.816 | 1.847<br>1.755 | 1.752 | 1.727 | 1.904<br>1.618 | 1.954<br>1.618 |
| (17) vd1 | 25.15<br>46.59 | 23.70<br>52.30 | 52.47 | 53.67 | 31.27<br>63.34 | 32.33<br>63.34 |
| (18) (r2 − r1)/(r2 + r1) | 0.337 | −2.218 | −1.507 | −11.160 | 0.373 | 0.752 |
| (19) fN/fFN | — | 1.000 | 1.054 | 1.143 | — | 1.564 |
| (20) Fnot | 2.920 | 4.100 | 4.120 | 4.120 | 4.120 | 4.100 |
| (21) Bfw/fw | 0.479 | 0.492 | 0.731 | 0.637 | 0.549 | 0.589 |
| (22) \|fF1\|/\|fF2\| | 1.269 | 0.526 | — | 0.517 | 1.705 | — |
| (23) vdP1 | 42.73<br>42.50 | 25.46<br>34.92 | 25.66<br>24.07<br>24.40 | 24.50<br>23.90<br>23.80 | 25.15<br>20.88 | 30.05<br>23.80<br>27.03<br>32.19<br>23.80 |
| (24) vdN | 67.00 | 61.25<br>63.34 | 80.93<br>91.38 | 82.34<br>70.00 | 82.57 | 63.34 |
| (25) vdP2 | 67.90<br>82.57<br>67.00 | 71.68<br>63.34<br>67.90 | 62.63<br>76.49<br>64.15 | 60.92<br>74.04<br>64.20 | 66.97<br>63.34<br>82.57<br>82.57<br>71.67 | 82.57<br>67.90<br>67.90<br>70.31 |

| | Examples | | | | |
|---|---|---|---|---|---|
| Conditional expressions | 7th | 8th | 9th | 10th | 11th |
| (1) f1/D1 | 26.049 | 9.548 | 9.548 | 10.302 | 9.345 |
| (2) M1/D1 | 10.323 | 5.387 | 5.387 | 5.957 | 5.461 |
| (3) f1/(−fN1) | 5.429 | 6.554 | 6.554 | 5.914 | 5.639 |
| (4) f1/(−fN2) | 2.355 | 2.347 | 2.347 | 0.130 | 0.375 |
| (5) fN1/fN2 | 0.434 | 0.358 | 0.358 | 0.022 | 0.067 |
| (6) f1/fP1 | 1.608 | 1.855 | 1.855 | 2.771 | 2.929 |
| (7) fP1/(−fN1) | 3.376 | 3.532 | 3.532 | 2.134 | 1.926 |
| (8) MP1/MN1 | 3.071 | 2.674 | 2.674 | 1.974 | 2.455 |
| (9) fP1/fP2 | 2.670 | 2.198 | 2.198 | 1.082 | 0.866 |
| (10) f1/fFP | 1.744 | — | 4.078 | — | 2.537<br>1.554 |
| (11) fFP/fRPw | −1.672 | — | −0.795 | — | −1.110<br>−3.098 |
| (12) f1/(−fFN) | 2.355 | 2.347 | 2.347 | 0.130<br>3.417 | — |
| (13) (−fFN)/fRNw | 0.180 | −0.343 | −0.343 | −23.612<br>0.112 | — |
| (14) f1/(−fR) | 2.916 | 0.806 | 0.806 | — | 4.813 |
| (15) f1/fR | — | | | 0.384 | — |
| (16) nd1 | 1.610 | 1.603 | 1.603 | 1.750<br>1.593 | 1.903<br>1.593 |
| (17) vd1 | 61.93 | 65.44 | 65.44 | 35.25<br>67.90 | 35.77<br>67.90 |
| (18) (r2 − r1)/(r2 + r1) | 1.734 | 1.299 | 1.299 | 0.061 | −1.000 |
| (19) fN/fFN | 1.000 | 2.913 | 2.913 | 1.000<br>26.324 | — |
| (20) Fnot | 4.120 | 6.480 | 6.480 | 6.569 | 6.574 |
| (21) Bfw/fw | 0.488 | 0.476 | 0.476 | 0.485 | 0.464 |

-continued

| | | | | | |
|---|---|---|---|---|---|
| (22) \|fF1\|/\|fF2\| | 0.740 | — | 0.575 | — | 0.612 |
| (23) νdP1 | 25.58 | 20.88 | 20.88 | 27.03 | 23.08 |
| | 26.67 | 35.72 | 35.72 | | 35.27 |
| | 23.80 | 42.73 | 42.73 | | 45.78 |
| | | 23.80 | 23.80 | | 31.16 |
| | | 37.57 | 37.57 | | |
| (24) νdN | 81.23 | — | — | 82.57 | — |
| | 91.38 | | | | |
| (25) νdP2 | 61.07 | 81.49 | 81.49 | 66.92 | 66.92 |
| | 72.77 | | | 82.57 | 67.90 |
| | 63.96 | | | | |

The above examples are specific examples of the present invention, and the present invention is not limited thereto. The following details can be appropriately employed unless the optical performance of the variable magnification optical system of the embodiment of the present application is compromised.

The lens surfaces of the lenses constituting any of the variable magnification optical systems of the above examples may be covered with antireflection coating having high transmittance in a wide wavelength range. This reduces flares and ghosts and enables achieving optical performance with high contrast.

Next, a camera including the variable magnification optical system of the present embodiment will be described with reference to FIG. 23.

Figure 23:
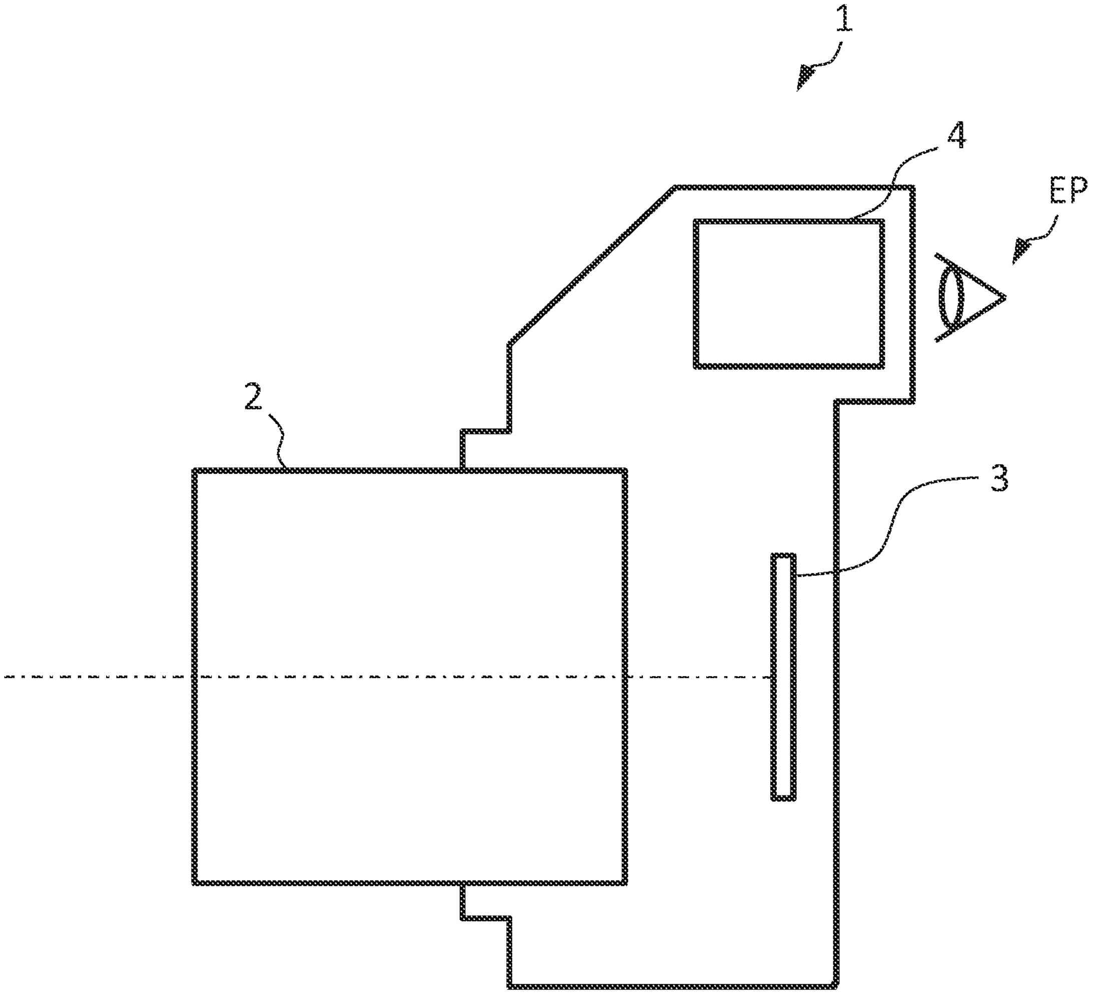
FIG. 23 schematically shows a camera including a variable magnification optical system of the embodiment.

FIG. 23 schematically shows a camera including the variable magnification optical system of the present embodiment.

The camera 1 is a "mirror-less camera" of an interchangeable lens type including the variable magnification optical system according to the first example as an imaging lens 2.

In the camera 1, light from an object (subject) (not shown) is condensed by the imaging lens 2 and reaches an imaging device 3. The imaging device 3 converts the light from the subject to image data. The image data is displayed on an electronic view finder 4. This enables a photographer who positions his/her eye at an eye point EP to observe the subject.

When a release button (not shown) is pressed by the photographer, the image data is stored in a memory (not shown). In this way, the photographer can take a picture of the subject with the camera 1.

The variable magnification optical system of the first example included in the camera 1 as the imaging lens 2 is a variable magnification optical system of favorable optical performance. Thus, the camera 1 can achieve favorable optical performance. A camera configured by including any of the variable magnification optical systems of the second to eleventh examples as the imaging lens 2 can have the same effect as the camera 1.

Figure 24:
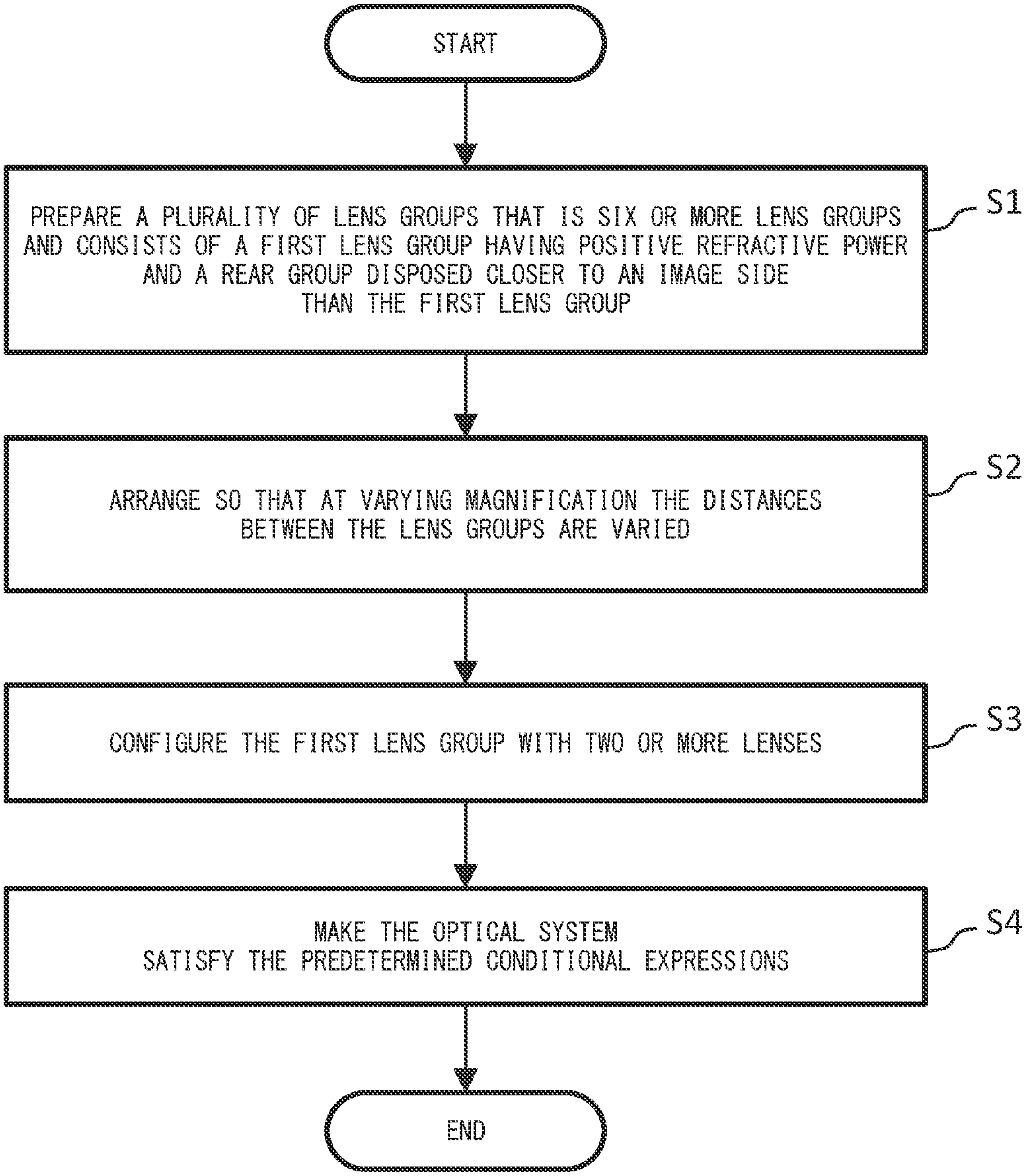
FIG. 24 is a flowchart outlining a method for manufacturing a variable magnification optical system of the embodiment.

Finally, a method for manufacturing a variable magnification optical system of the present embodiment will be outlined with reference to FIG. 24. FIG. 24 is a flowchart outlining a method for manufacturing a variable magnification optical system of the present embodiment.

The method for manufacturing a variable magnification optical system of the present embodiment shown in FIG. 24 includes the following steps S1 to S4:

Step S1: preparing a plurality of lens groups that is six or more lens groups and comprises a first lens group having positive refractive power and a rear group disposed closer to an image side than the first lens group;

Step S2: arranging so that at varying magnification the distances between the lens groups are varied;

Step S3: configuring the first lens group with two or fewer lenses; and

Step S4: making the variable magnification optical system satisfy all of the following conditional expressions:

$$8.00 < f1/D1 < 27.00 \qquad (1)$$

$$1.00 < M1/D1 < 12.00 \qquad (2)$$

where f1 is the focal length of the first lens group,

D1 is the thickness of the first lens group on an optical axis, and

M1 is the amount of movement of the first lens group at varying magnification from a wide-angle end state to a telephoto end state.

A variable magnification optical system of favorable imaging performance can be manufactured by the method for manufacturing a variable magnification optical system of the present embodiment.

It should be noted that those skilled in the art can make various changes, substitutions, and modifications without departing from the spirit and scope of the present invention.

REFERENCE SIGNS LIST

S aperture stop

I image plane

1 camera

2 imaging lens

3 imaging device

The invention claimed is:

1. A variable magnification optical system comprising a plurality of lens groups, the plurality of lens groups being six or more lens groups and comprising a first lens group having positive refractive power and a rear group disposed closer to an image side than the first lens group, at varying magnification the distances between the lens groups being varied, the first lens group consisting of two or fewer lenses, the rear group comprises a first positive lens group having positive refractive power, and a first negative lens group having negative refractive power and disposed closer to the image side than the first positive lens group, and all of the following conditional expressions being satisfied:

$$8.00 < f1/D1 < 27.00$$

$$1.00 < M1/D1 < 12.00$$

$$1.00 < MP1/MN1 < 20.00$$

where f1 is the focal length of the first lens group,

D1 is the thickness of the first lens group on an optical axis,

M1 is the amount of movement of the first lens group at varying magnification from a wide-angle end state to a telephoto end state, MP1 is the amount of movement of the first positive lens group at varying magnification from the wide-angle end state to the telephoto end state, and MN1 is the amount of movement of the first negative lens group at varying magnification from the wide-angle end state to the telephoto end state.

2. The variable magnification optical system according to claim 1, wherein the following conditional expression is satisfied:

$$1.00 < f1/(-fN1) < 8.00$$

where fN1 is the focal length of the first negative lens group.

3. The variable magnification optical system according to claim 2, wherein the first negative lens group is a lens group disposed closest to an object side of lens groups having negative refractive power in the rear group.

4. The variable magnification optical system according to claim 1, wherein the rear group comprises a second negative lens group having negative refractive power and disposed closer to the image side than the first negative lens group, and the following expression is satisfied:

$$0.10 < f1/(-fN2) < 5.00$$

where fN2 is the focal length of the second negative lens group.

5. The variable magnification optical system according to claim 1, wherein the rear group comprises a second negative lens group having negative refractive power and disposed closer to the image side than the first negative lens group, and the following expression is satisfied:

$$0.01 < fN1/fN2 < 1.00$$

where fN1 is the focal length of the first negative lens group, and fN2 is the focal length of the second negative lens group.

6. The variable magnification optical system according to claim 1, wherein the following conditional expression is satisfied:

$$0.75 < f1/fP1 < 5.00$$

where fP1 is the focal length of the first positive lens group.

7. The variable magnification optical system according to claim 6, wherein the first positive lens group is a lens group disposed closest to an object side of lens groups having positive refractive power in the rear group.

8. The variable magnification optical system according to claim 1, wherein the following conditional expression is satisfied:

$$0.75 < fP1/(-fN1) < 4.50$$

where fP1 is the focal length of the first positive lens group, and fN1 is the focal length of the first negative lens group.

9. The variable magnification optical system according to claim 1, wherein the rear group comprises a second positive lens group having positive refractive power and disposed closer to the image side than the first positive lens group.

10. The variable magnification optical system according to claim 9, wherein the following conditional expression is satisfied:

$$0.25 < fP1/fP2 < 3.50$$

where fP1 is the focal length of the first positive lens group, and fP2 is the focal length of the second positive lens group.

11. The variable magnification optical system according to claim 1, wherein the rear group comprises a positive focusing group having positive refractive power and configured to move along the optical axis at focusing, and the following conditional expression is satisfied:

$$0.75 < f1/fFP < 4.50$$

where fFP is the focal length of the positive focusing group.

12. The variable magnification optical system according to claim 1, wherein the rear group comprises a positive focusing group having positive refractive power and configured to move along the optical axis at focusing, and the following conditional expression is satisfied:

$$-3.50 < fFP/fRPw < -0.50$$

where fFP is the focal length of the positive focusing group, and fRPw is a combined focal length in the wide-angle end state of one or more lens groups disposed closer to the image side than the positive focusing group.

13. The variable magnification optical system according to claim 1, wherein the rear group comprises a negative focusing group having negative refractive power and configured to move along the optical axis at focusing, and the following conditional expression is satisfied:

$$0.10 < f1/(-fFN) < 4.00$$

where fFN is the focal length of the negative focusing group.

14. The variable magnification optical system according to claim 1, wherein the rear group comprises a negative focusing group having negative refractive power and configured to move along the optical axis at focusing, and the following conditional expression is satisfied:

$$-25.00 < (-fFN)/fRNw < 1.00$$

where fFN is the focal length of the negative focusing group, and fRNw is a combined focal length in the wide-angle end state of one or more lens groups disposed closer to the image side than the negative focusing group.

15. The variable magnification optical system according to claim 1, wherein a final lens group disposed closest to the image side of lens groups in the rear group has negative refractive power, and the following conditional expression is satisfied:

$$0.10 < f1/(-fR) < 5.00$$

where fR is the focal length of the final lens group.

16. The variable magnification optical system according to claim 1, wherein a final lens group disposed closest to the image side of lens groups in the rear group has positive refractive power, and the following conditional expression is satisfied:

$$0.10 < f1/fR < 1.50$$

where fR is the focal length of the final lens group.

17. The variable magnification optical system according to claim 1, wherein the first lens group comprises at least one lens satisfying both the following conditional expressions:

$$1.45 < nd1 < 2.10$$

$$20.00 < vd1 < 75.00$$

where nd1 is the refractive index for d-line of the lens in the first lens group, and vd1 is the Abbe number for d-line of the lens in the first lens group.

18. The variable magnification optical system according to claim 1, wherein a lens disposed closest to the image side satisfies the following conditional expression:

$$-12.00 < (r2 - r1)/(r2 + r1) < 2.00$$

where r1 is the radius of curvature of an object-side lens surface of the lens disposed closest to the image side, and r2 is the radius of curvature of an image-side lens surface of the lens disposed closest to the image side.

19. The variable magnification optical system according to claim 1, wherein the rear group comprises a negative focusing group having negative refractive power and configured to move along the optical axis at focusing, and the following conditional expression is satisfied:

$$0.75 < fN/fFN < 30.00$$

where fN is the focal length of a lens group having the weakest refractive power of lens groups having negative refractive power in the rear group, and fFN is the focal length of the negative focusing group.

20. The variable magnification optical system according to claim 1, wherein the following conditional expression is satisfied:

$$Fnot < 7.00$$

where

Fnot is the f-number of the variable magnification optical system in the telephoto end state.

21. The variable magnification optical system according to claim 1, wherein a lens group that is second closest to the image side of lens groups in the rear group moves along the optical axis at focusing.

22. The variable magnification optical system according to claim 1, wherein the following conditional expression is satisfied:

$$0.10 < Bfw/fw < 0.95$$

where

Bfw is the back focus of the variable magnification optical system in the wide-angle end state, and fw is the focal length of the variable magnification optical system in the wide-angle end state.

23. The variable magnification optical system according to claim 1, wherein the first lens group moves toward an object side at varying magnification from the wide-angle end state to the telephoto end state.

24. The variable magnification optical system according to claim 1, wherein the first lens group consists of, in order from an object side, a negative lens and a positive lens.

25. The variable magnification optical system according to claim 1, wherein the first lens group consists of a positive lens.

26. The variable magnification optical system according to claim 1, wherein the rear group comprises a first focusing group and a second focusing group that move along the optical axis at focusing.

27. The variable magnification optical system according to claim 26, wherein the following conditional expression is satisfied:

$$0.20 < |fF1|/|fF2| < 30.00$$

where fF1 is the focal length of the first focusing group, and fF2 is the focal length of the second focusing group.

28. The variable magnification optical system according to claim 1, wherein at least one positive lens in the rear group satisfies the following first conditional expression for dispersion:

$$vdP1 < 45.00$$

where vdP1 is the Abbe number for d-line of the positive lens in the rear group.

29. The variable magnification optical system according to claim 28, wherein the positive lens satisfying the first conditional expression for dispersion is included in a negative lens group having negative refractive power of lens groups in the rear group.

30. The variable magnification optical system according to claim 1, wherein at least one negative lens in the rear group satisfies the following second conditional expression for dispersion:

$$60.00 < vdN$$

where vdN is the Abbe number for d-line of the negative lens in the rear group.

31. The variable magnification optical system according to claim 30, wherein the negative lens satisfying the second conditional expression for dispersion is included in a final lens group disposed closest to the image side of lens groups in the rear group.

32. The variable magnification optical system according to claim 1, wherein at least one lens group having positive refractive power of lens groups in the rear group comprises a positive lens satisfying the following third conditional expression for dispersion:

$$60.00 < vdP2$$

where vdP2 is the Abbe number for d-line of the positive lens in the rear group.

33. An optical apparatus comprising the variable magnification optical system according to claim 1.

34. A method for manufacturing a variable magnification optical system comprising a plurality of lens groups, the plurality of lens groups being six or more lens groups and comprising a first lens group having positive refractive power and a rear group disposed closer to an image side than the first lens group, the method comprising arranging so that at varying magnification the distances between the lens groups are varied, the rear group comprises a first positive lens group having positive refractive power, and a first negative lens group having negative refractive power and disposed closer to the image side than the first positive lens group, and the first lens group consists of two or fewer lenses, wherein the method further comprises one of the following features A or B, the feature A comprising arranging so that:

all of the following conditional expressions are satisfied:

$$8.00 < f1/D1 < 27.00$$

$$1.00 < M1/D1 < 12.00$$

$$1.00 < MP1/MN1 < 20.00$$

where f1 is the focal length of the first lens group,

D1 is the thickness of the first lens group on an optical axis,

M1 is the amount of movement of the first lens group at varying magnification from a wide-angle end state to a telephoto end state, MP1 is the amount of movement of the first positive lens group at varying magnification from the wide-angle end state to the telephoto end state, and MN1 is the amount of movement of the first negative lens group at varying magnification from the wide-angle end state to the telephoto end state, and the feature B comprising arranging so that:

the rear group comprises a positive focusing group having positive refractive power and configured to move along the optical axis at focusing, and all of the following conditional expressions are satisfied:

$$8.00 < f1/D1 < 14.00$$

$$1.00 < M1/D1 < 12.00$$

$$0.75 < f1/fP1 < 4.75$$

$$0.75 < fP1/(-fN1) < 4.50$$

where f1 is the focal length of the first lens group,

D1 is the thickness of the first lens group on an optical axis,

M1 is the amount of movement of the first lens group at varying magnification from a wide-angle end state to a telephoto end state, fP1 is the focal length of the first positive lens group, and fN1 is the focal length of the first negative lens group.

35. A variable magnification optical system comprising a plurality of lens groups, the plurality of lens groups being six or more lens groups and comprising a first lens group having positive refractive power and a rear group disposed closer to an image side than the first lens group, at varying magnification the distances between the lens groups being varied, the first lens group consisting of two or fewer lenses, the rear group comprising a first positive lens group having positive refractive power, and a first negative lens group having negative refractive power and disposed closer to the image side than the first positive lens group, the rear group comprising a positive focusing group having positive refractive power and configured to move along the optical axis at focusing, and all of the following conditional expressions being satisfied:

$$8.00 < f1/D1 < 14.00$$

$$1.00 < M1/D1 < 12.00$$

$$0.75 < f1/fP1 < 4.75$$

$$0.75 < fP1/(-fN1) < 4.50$$

where f1 is the focal length of the first lens group,

D1 is the thickness of the first lens group on an optical axis,

M1 is the amount of movement of the first lens group at varying magnification from a wide-angle end state to a telephoto end state, fP1 is the focal length of the first positive lens group, and fN1 is the focal length of the first negative lens group.

36. The variable magnification optical system according to claim 35, wherein the following conditional expressions is satisfied:

$$1.00 < MP1/MN1 < 20.00$$

where

MP1 is the amount of movement of the first positive lens group at varying magnification from the wide-angle end state to the telephoto end state, and MN1 is the amount of movement of the first negative lens group at varying magnification from the wide-angle end state to the telephoto end state.

* * * * *